(12) United States Patent
Hosaka et al.

(10) Patent No.: US 11,669,203 B2
(45) Date of Patent: Jun. 6, 2023

(54) DETECTION DEVICE

(71) Applicant: Japan Display Inc., Tokyo (JP)

(72) Inventors: Shota Hosaka, Tokyo (JP); Takayuki Nakanishi, Tokyo (JP); Naoki Takada, Tokyo (JP); Fumitaka Gotoh, Tokyo (JP)

(73) Assignee: Japan Display Inc., Tokyo (JP)

( * ) Notice: Subject to any disclaimer, the term of this patent is extended or adjusted under 35 U.S.C. 154(b) by 55 days.

(21) Appl. No.: 17/514,725

(22) Filed: Oct. 29, 2021

(65) Prior Publication Data

US 2022/0050549 A1 Feb. 17, 2022

Related U.S. Application Data

(63) Continuation of application No. 17/012,988, filed on Sep. 4, 2020, now Pat. No. 11,175,777, which is a (Continued)

(30) Foreign Application Priority Data

Mar. 5, 2018 (JP) .............................. JP2018-038780

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05); *G06F 3/04166* (2019.05); *G06F 2203/04108* (2013.01)

(58) Field of Classification Search
CPC .. G06F 3/0418; G06F 3/04166; G06F 3/0446; G06F 2203/04108; G06F 3/0412
See application file for complete search history.

(56) References Cited

U.S. PATENT DOCUMENTS 9,606,667 B2 * 3/2017 Noguchi .............. G09G 3/3614
9,927,925 B2 * 3/2018 Teranishi .............. G06F 3/0412
(Continued)

FOREIGN PATENT DOCUMENTS

| JP | 2012-533122 | 12/2012 |
|----|-------------|---------|
| JP | 2017-174013 | 9/2017 |
| JP | 2017-174352 | 9/2017 |

OTHER PUBLICATIONS

Japanese Office Action dated Jun. 7, 2022 in corresponding Japanese Application No. 2021-075290.

*Primary Examiner* — Amy Onyekaba
(74) *Attorney, Agent, or Firm* — K&L Gates LLP

(57) ABSTRACT

Detection device is provided and includes first and second electrodes disposed facing or close to first electrodes; first drive circuit configured to supply first drive signal; second driver circuit configured to supply second drive signal; and detector configured to detect detection signal output from first electrodes, wherein detection device has first period in which detector detects first detection signal output from first electrodes in response to supply of second drive signal to second electrodes, if first detection signal detected in first period is equal to or higher than predetermined threshold, detector is configured to output an output signal including panel coordinates generated based on first detection signal, if first detection signal detected in first period is lower than predetermined threshold, detection device is transitioned to a second period in which detector detects second detection signal output from first electrodes in response to supply of first drive signal to first electrodes and supply of guard signal synchronized with first drive signal to second electrodes, and detector is configured to output an output signal including panel coordinates generated based on second detection signal.

4 Claims, 57 Drawing Sheets

Related U.S. Application Data continuation of application No. PCT/JP2019/007665, filed on Feb. 27, 2019.

(56) References Cited

U.S. PATENT DOCUMENTS

| | | | |
|---|---|---|---|
| 10,353,513 B2* | 7/2019 | Mizuhashi | G06V 40/1306 |
| 10,429,981 B2* | 10/2019 | Noguchi | G06F 3/0446 |
| 10,664,085 B2* | 5/2020 | Kakinoki | G06F 3/04166 |
| 2011/0007021 A1 | 1/2011 | Bernstein et al. | |
| 2011/0167391 A1* | 7/2011 | Momeyer | G06F 3/038 |
| | | | 715/863 |
| 2011/0267295 A1* | 11/2011 | Noguchi | G09G 5/18 |
| | | | 345/173 |
| 2012/0050217 A1* | 3/2012 | Noguchi | G06F 3/04166 |
| | | | 345/173 |
| 2012/0075240 A1* | 3/2012 | Kida | G06F 3/0446 |
| | | | 345/174 |
| 2013/0069905 A1* | 3/2013 | Krah | G06F 3/04182 |
| | | | 345/174 |
| 2013/0155007 A1 | 6/2013 | Huang et al. | |
| 2013/0271396 A1* | 10/2013 | Chen | G06F 3/04166 |
| | | | 345/173 |
| 2013/0342498 A1 | 12/2013 | Kim et al. | |
| 2014/0049486 A1 | 2/2014 | Kim et al. | |
| 2014/0049508 A1 | 2/2014 | Kim et al. | |
| 2014/0168152 A1* | 6/2014 | Ishizaki | G06F 3/0446 |
| | | | 445/25 |
| 2014/0176496 A1* | 6/2014 | Azumi | G06F 3/0445 |
| | | | 345/174 |
| 2015/0002466 A1* | 1/2015 | Takeuchi | G06F 3/0418 |
| | | | 345/174 |
| 2015/0084911 A1* | 3/2015 | Stronks | G09G 3/20 |
| | | | 345/174 |
| 2015/0220204 A1* | 8/2015 | Noguchi | G06F 3/044 |
| | | | 345/174 |
| 2015/0317008 A1* | 11/2015 | Chandran | G06F 3/0448 |
| | | | 345/174 |
| 2016/0178974 A1* | 6/2016 | Li | G06F 3/0412 |
| | | | 349/12 |
| 2016/0209953 A1* | 7/2016 | Kim | G09G 5/003 |
| 2016/0357320 A1* | 12/2016 | Ito | G06F 3/038 |
| 2017/0010738 A1* | 1/2017 | Kurasawa | G06F 3/04166 |
| 2017/0010739 A1* | 1/2017 | Ito | G06F 3/0446 |
| 2017/0153749 A1* | 6/2017 | Noguchi | G06F 3/04164 |
| 2017/0220185 A1* | 8/2017 | Kurasawa | G06F 3/044 |
| 2017/0262093 A1* | 9/2017 | Noguchi | G06F 3/04164 |
| 2017/0262112 A1* | 9/2017 | Noguchi | G02F 1/13338 |
| 2017/0277300 A1* | 9/2017 | Kurasawa | G06F 3/0446 |
| 2017/0277328 A1* | 9/2017 | Kurasawa | G06F 3/0412 |
| 2017/0285799 A1* | 10/2017 | Iuchi | G06F 3/0412 |
| 2017/0285814 A1* | 10/2017 | Katsuta | G06F 3/0443 |
| 2017/0285846 A1* | 10/2017 | Mizuhashi | G06V 10/143 |
| 2017/0285847 A1* | 10/2017 | Uehara | G06F 3/04166 |
| 2017/0285865 A1* | 10/2017 | Uehara | G06F 3/04184 |
| 2017/0371447 A1* | 12/2017 | Fukushima | G06F 3/0446 |
| 2018/0032209 A1* | 2/2018 | Suzuki | G06F 3/04184 |
| 2018/0039367 A1* | 2/2018 | Suzuki | G06F 3/0445 |
| 2018/0059859 A1* | 3/2018 | Fukushima | G06F 3/0412 |
| 2018/0059871 A1* | 3/2018 | Fukushima | G06F 3/0446 |

* cited by examiner

FIG.36

| DETECTION ELECTRODE E1 | E11 | E12 | E13 | ... | E1n |
|---|---|---|---|---|---|
| REFERENCE DETECTION VALUE Dref | Dref1 | Dref2 | Dref3 | ... | Drefn |

FIG.37

| DETECTION ELECTRODE E1 | E11 | E12 | E13 | ... | E1n |
|---|---|---|---|---|---|
| TEMPERATURE CORRECTION COEFFICIENT k | k1 | k2 | k3 | ... | kn |

DETECTION DEVICE

CROSS-REFERENCE TO RELATED APPLICATION

This application is a continuation of U.S. application Ser. No. 17/012,988, filed on Sep. 4, 2020, which is a continuation of PCT International Application No. PCT/JP2019/007665, filed on Feb. 27, 2019, which designates the United States, incorporated herein by reference, and which claims the benefit of priority from Japanese Application No. 2018-038780, filed on Mar. 5, 2018, incorporated herein by reference.

BACKGROUND

1. Technical Field

The present disclosure relates to a detection device and a display device.

2. Description of the Related Art

In recent years, touch detection devices commonly called touchscreen panels that are capable of detecting an external proximate object have been attracting attention. Each of the touchscreen panels is mounted on or integrated with a display device, such as a liquid crystal display device, and is used as a display device. Known functions of such a display device include a touch detection function to detect contact of a finger of an operator with a screen, and in addition, a hover detection (proximity detection) function to detect, for example, a proximate state or a gesture of the finger in a state where the finger does not touch a screen.

The touch detection greatly differs from the hover detection in distance between a detection target object, such as a finger serving as a detection target, and a detection electrode, and in required resolution of the detection. Therefore, if the electrode and a driving configuration for touch detection are employed without modification in the hover detection, the hover detection may be difficult to be satisfactorily performed. Increasing the area of the detection electrode is effective in increasing the detection sensitivity of the hover detection. In this case, however, the detection accuracy of the touch detection may decrease.

It is an object of the present disclosure to provide a detection device and a display device capable of satisfactorily performing the hover detection while using an electrode for both the touch detection and the hover detection.

SUMMARY

A detection device according to one embodiment of the present disclosure includes: a plurality of first electrodes; a plurality of second electrodes facing or being close to the first electrodes; a first drive circuit configured to supply a first drive signal to the first electrodes; a second drive circuit configured to supply a second drive signal to the second electrodes, the second drive signal having a same waveform as that of the first drive signal and in synchronization with the first drive signal; and a detector configured to detect a first detection signal output from the first electrodes in response to a supply of the second drive signal to the second electrodes, a second detection signal output from the first electrodes in response to a supply of the first drive signal to the first electrodes and a supply of the second drive signal to the second electrodes, and a third detection signal output from the first electrodes in response to a supply of the second drive signal to the second electrodes. The detector is configured to detect the second detection signal and the third detection signal when a detection value of the first detection signal is lower than a threshold, and to correct a detection value of the second detection signal on a basis of the detection value of the third detection signal.

BRIEF DESCRIPTION OF THE DRAWINGS

FIG. 36 is a chart illustrating an example of reference detection value information including a reference detection value for each of the detection electrodes;

FIG. 37 is a chart illustrating an example of temperature correction coefficient information including the temperature correction coefficient for each of the detection electrodes;

DETAILED DESCRIPTION

Figure 1:
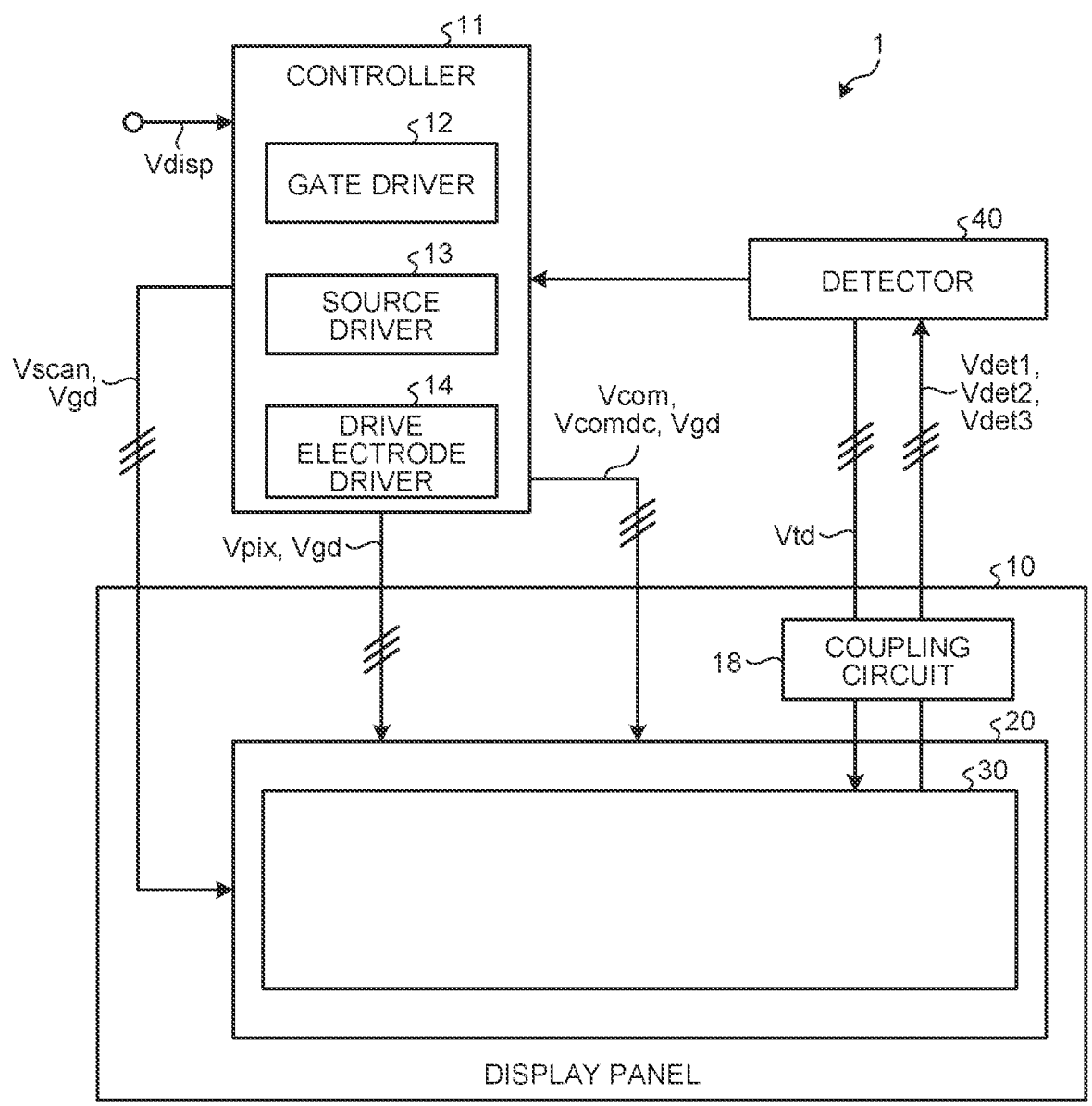
FIG. 1 is a block diagram illustrating a configuration example of a display device according to a first embodiment of the present disclosure.

The following describes modes (embodiments) for carrying out the present disclosure in detail with reference to the drawings. The present disclosure is not limited to the description of the embodiments given below. Components to be described below include those easily conceivable by those skilled in the art or those substantially identical thereto. Furthermore, the components to be described below can be combined as appropriate. The disclosure is merely an example, and the present disclosure naturally encompasses appropriate modifications easily conceivable by those skilled in the art while maintaining the gist of the disclosure. To further clarify the description, widths, thicknesses, shapes, and the like of various parts may be schematically illustrated in the drawings as compared with actual aspects thereof. However, they are merely examples, and the interpretation of the present disclosure is not limited thereto. The same component as that described with reference to an already mentioned drawing is denoted by the same reference numeral through the description and the drawings, and detailed description thereof may not be repeated where appropriate.

First Embodiment

Figure 2:
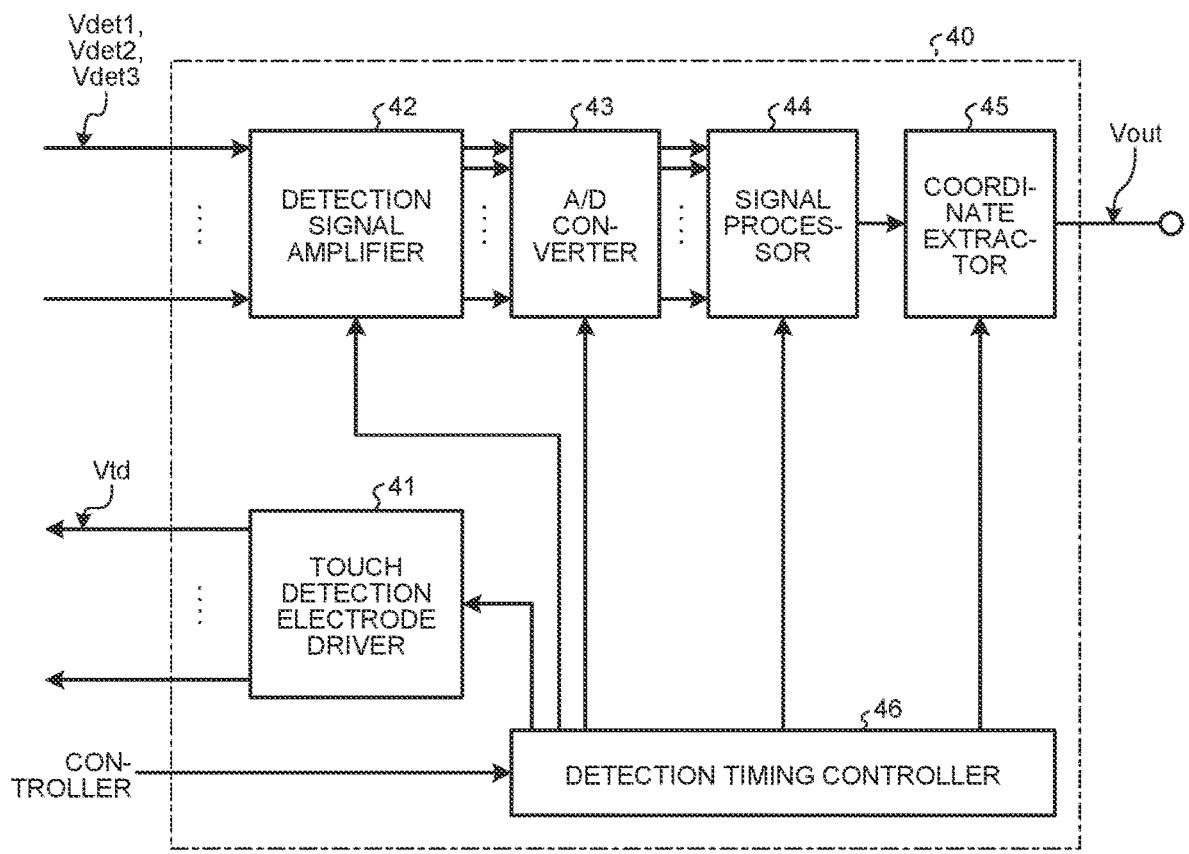
FIG. 2 is a block diagram illustrating a configuration example of a detector of the display device according to the first embodiment.

FIG. 1 is a block diagram illustrating a configuration example of a display device according to a first embodiment of the present disclosure. FIG. 2 is a block diagram illustrating a configuration example of a detector of the display device according to the first embodiment. As illustrated in FIG. 1, a display device 1 includes a display panel 10, a controller 11, and a detector 40. The display panel 10 includes a display unit 20 for displaying an image and a touch sensor 30 serving as a detection device for detecting a detection target object such as a finger of an operator on a display surface of the display unit 20.

The display panel 10 is a display device in which the display unit 20 is integrated with the touch sensor 30. Specifically, the display panel 10 is what is called an in-cell device or a hybrid device obtained by incorporating and integrating the capacitive touch sensor 30 into the display unit 20. The expression "incorporating and integrating the capacitive touch sensor 30 into the display unit 20" includes, for example, using some members such as substrates and electrodes used as the display unit 20 also as some members such as substrates and electrodes used as the touch sensor 30. The display panel 10 may be what is called an on-cell device obtained by mounting the touch sensor 30 on the display unit 20. In the case of the on-cell device, the touch sensor 30 may be provided directly on the display unit 20, or may be provided not directly on, but above the display unit 20 with another layer interposed therebetween.

This configuration example employs a liquid crystal display device using liquid crystal display elements as the display unit 20. However, the display unit 20 may have a configuration using an organic electroluminescent (organic EL) element. In this case, either one of an anode and a cathode forming the organic EL element may be used as a drive electrode COML to be described later.

The display unit 20 includes a plurality of pixels including the display elements, and includes the display surface facing the pixels. As will be described later, the display unit 20 performs display by sequentially scanning one horizontal line at a time according to a scan signal Vscan supplied from a gate driver 12.

The controller 11 includes the gate driver 12, a source driver 13, and a drive electrode driver 14. The controller 11 is a circuit that controls display operation and detection operation by supplying control signals to the gate driver 12, a coupling circuit 18, and the detector 40 based on an externally supplied video signal Vdisp.

The controller 11 has two detection modes for touch detection and hover detection as detection modes by the touch sensor 30. In the present specification, the term "touch detection" refers to detecting a position and a movement of the detection target object in a state where the detection target object is in contact with the display surface, or a state where the detection target object is so proximate to the display surface as to be treatable as in contact therewith (hereinafter, called "contact state"). The term "hover detection" refers to detecting the position and the movement of the detection target object in a state where the detection target object is not in contact with the display surface, or a state where the detection target object is not so proximate to the display surface as to be treatable as in contact therewith (hereinafter, called "non-contact state"). A state where the detection target object is not present in a position facing the display surface, or a state where the detection target object is so distant from the display surface as to be undetectable in the hover detection is called "non-present state".

The controller 11 has a correction value detection mode for correcting a detection value during the hover detection by the touch sensor 30. In the present specification, the correction value detection is performed in the non-contact state or the non-present state.

The gate driver 12 is a circuit having a function to sequentially select one horizontal line as a target of display driving of the display panel 10 by supplying the scan signal Vscan to a gate line GCL to be described later (refer to FIG. 15) of the display unit 20 based on a control signal supplied from the controller 11. The gate driver 12 has a function to set the gate line GCL to a fixed potential (GND) or a high-impedance state, or to supply a guard signal Vgd to be described later to the gate line GCL during the touch detection, the hover detection, and the correction value detection.

The source driver 13 is a circuit that supplies a pixel signal Vpix to each sub-pixel SPix through a data line SGL to be described later (refer to FIG. 15) of the display unit 20.

The source driver 13 has a function to set the data line SGL to the fixed potential (GND) or the high-impedance state, or to supply the guard signal Vgd to the data line SGL during the touch detection, the hover detection, and the correction value detection. A part of the function of the source driver 13 may be provided in the display panel 10. In this case, the controller 11 may generate the pixel signal Vpix and the guard signal Vgd, and supply the pixel signal Vpix and the guard signal Vgd to the source driver 13.

The drive electrode driver 14 is a circuit that supplies a drive signal Vcomdc for display or a drive signal Vcom for touch detection to the drive electrode COML, to be described later, of the display unit 20. The drive electrode driver 14 has a function to set the drive electrode COML to the fixed potential (GND) or the high-impedance state, or to supply the guard signal Vgd to the drive electrode COML during the hover detection and the correction value detection. In the present embodiment, the drive signal Vcom for touch detection may be substantially the same signal as the guard signal Vgd.

The touch sensor 30 has a touch detection function to detect the position of the detection target object touching the display surface of the display panel 10 based on the basic principle of the touch detection using a mutual-capacitance method. When the touch sensor 30 has detected the touch of the detection target object in the mutual-capacitive touch detection, the touch sensor 30 outputs a detection signal Vdet1 to the detector 40. The touch sensor 30 also has a hover detection function to detect the position of the detection target object hovering over the display surface of the display panel 10 based on the basic principle of the touch detection using a self-capacitance method. When the touch sensor 30 has detected the hovering of the detection target object in the self-capacitive hover detection, the touch sensor 30 outputs a detection signal Vdet2 to the detector 40.

The touch sensor 30 also has a correction value detection function to detect the correction value for correcting the detection value during the hover detection based on the basic principle of the touch detection using the self-capacitance method or the mutual-capacitance method. The touch sensor 30 outputs a detection signal Vdet3 detected in the correction value detection to the detector 40.

The coupling circuit 18 couples a plurality of touch detection electrodes TDL to one another through wiring 51 (refer to FIG. 14 to be described later). With this configuration, a touch detection electrode block TDLA to be described later is formed as a detection electrode in the touch detection, and a touch detection electrode block TDLB to be described later is formed as the detection electrode in the hover detection and the correction value detection. The detection signal Vdet1 output from the touch detection electrode block TDLA and the detection signals Vdet2 and Vdet3 output from the touch detection electrode block TDLB are supplied through the coupling circuit 18 to the detector 40.

The detector 40 is a circuit that detects whether the detection target object touches the display surface of the display panel 10 based on the control signal supplied from the controller 11 and the detection signal Vdet1 output from the display panel 10 in the mutual-capacitive touch detection. The detector 40 is also a circuit that supplies a drive signal Vtd in the self-capacitive hover detection, and detects whether the detection target object hovers over the display surface of the display panel 10 based on the control signal supplied from the controller 11 and the detection signals Vdet2 and Vdet3 output from the display panel 10. If the display surface is touched, the detector 40 obtains, for example, coordinates where the touch input is made. If the detection target object is detected in the hover detection, the detector 40 obtains, for example, coordinates where the hover input is made.

As illustrated in FIG. 2, the detector 40 includes a touch detection electrode driver 41, a detection signal amplifier 42, an analog-to-digital (A/D) converter 43, a signal processor 44, a coordinate extractor 45, and a detection timing controller 46. Based on the control signal supplied from the controller 11, the detection timing controller 46 controls the touch detection electrode driver 41, the detection signal amplifier 42, the A/D converter 43, the signal processor 44, and the coordinate extractor 45 so as to operate them in synchronization with one another.

The touch detection electrode driver 41 supplies the drive signal Vtd for hover detection or correction value detection using the self-capacitance method to the display panel 10.

The detection signal amplifier 42 amplifies the detection signals Vdet1, Vdet2, and Vdet3 supplied from the display panel 10. The A/D converter 43 samples analog signals output from the detection signal amplifier 42 and converts them into digital signals at times synchronized with the drive signals Vcom and Vtd.

The signal processor 44 is a logic circuit that detects whether the display panel 10 is touched and whether a hover is present based on the output signals from the A/D converter 43. For example, the signal processor 44 extracts a signal of difference (absolute value $|\Delta V|$) between the detection signals caused by the finger, performs predetermined detection value calculation processing such as mean value processing or maximum value processing within a predetermined period, and compares a detection value as the result of the detection value calculation processing with a predetermined threshold to determine whether the detection target object is in the contact state, the non-contact state, or the non-present state. In this way, the detector 40 can perform the touch detection and the hover detection. The method of the detection value calculation processing to calculate the detection value from the signal of difference (absolute value $|\Delta V|$) between the detection signals caused by the finger is not limited to the mean value processing or the maximum value processing, and the present disclosure is not limited by the method of the detection value calculation processing.

In the present embodiment, the signal processor 44 also has a function to correct the detection value in the hover detection. The function to correct the detection value in the hover detection will be described later.

The coordinate extractor 45 is a logic circuit that obtains panel coordinates of a position of the detected detection target object when the detection target object is detected in the touch detection or the hover detection by the signal processor 44. The coordinate extractor 45 outputs the obtained coordinates as an output signal Vout. The coordinate extractor 45 may output the output signal Vout to the controller 11. The controller 11 can perform a predetermined display operation or detection operation based on the output signal Vout.

The touch detection electrode driver 41, the detection signal amplifier 42, the A/D converter 43, the signal processor 44, the coordinate extractor 45, and the detection timing controller 46 of the detector 40 are incorporated in the display device 1. The present disclosure is, however, not limited to this configuration. All or some of the functions of the detector 40 may be incorporated in an external processor or the like. For example, the coordinate extractor 45 may be incorporated in the external processor separate from the display device 1, and the detector 40 may output the signal processed by the signal processor 44 as the output signal Vout.

Figure 3:
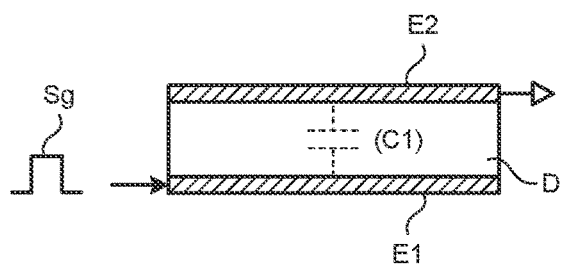
FIG. 3 is an explanatory diagram for explaining the basic principle of mutual-capacitive touch detection, illustrating a state where a finger does not touch a screen.
Figure 4:
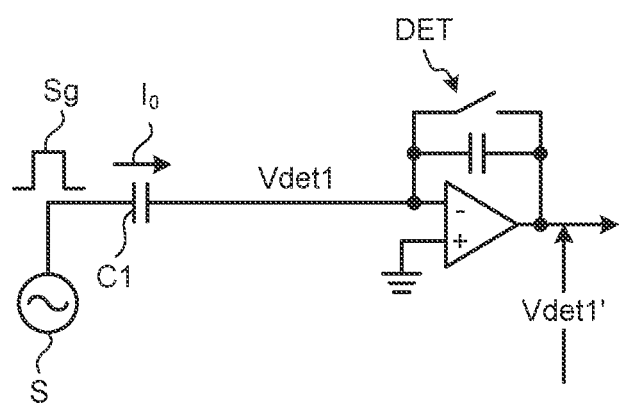
FIG. 4 is an explanatory diagram illustrating an example of an equivalent circuit in the state illustrated in FIG. 3 where the finger does not touch the screen.
Figure 5:
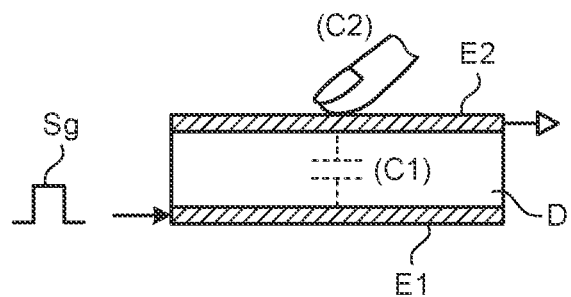
FIG. 5 is an explanatory diagram for explaining the basic principle of the mutual-capacitive touch detection, illustrating a state where the finger touches the screen.
Figure 6:
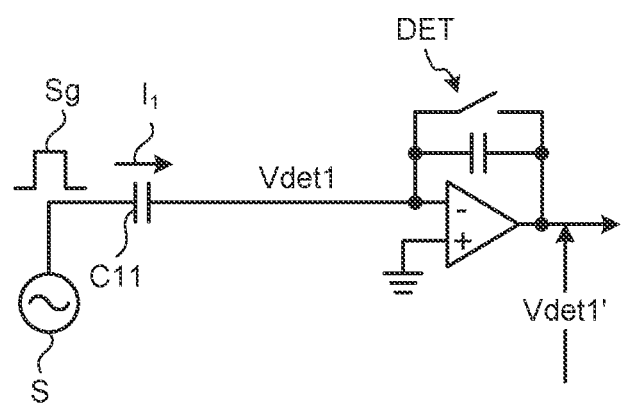
FIG. 6 is an explanatory diagram illustrating an example of an equivalent circuit in the state illustrated in FIG. 5 where the finger touches the screen.
Figure 7:
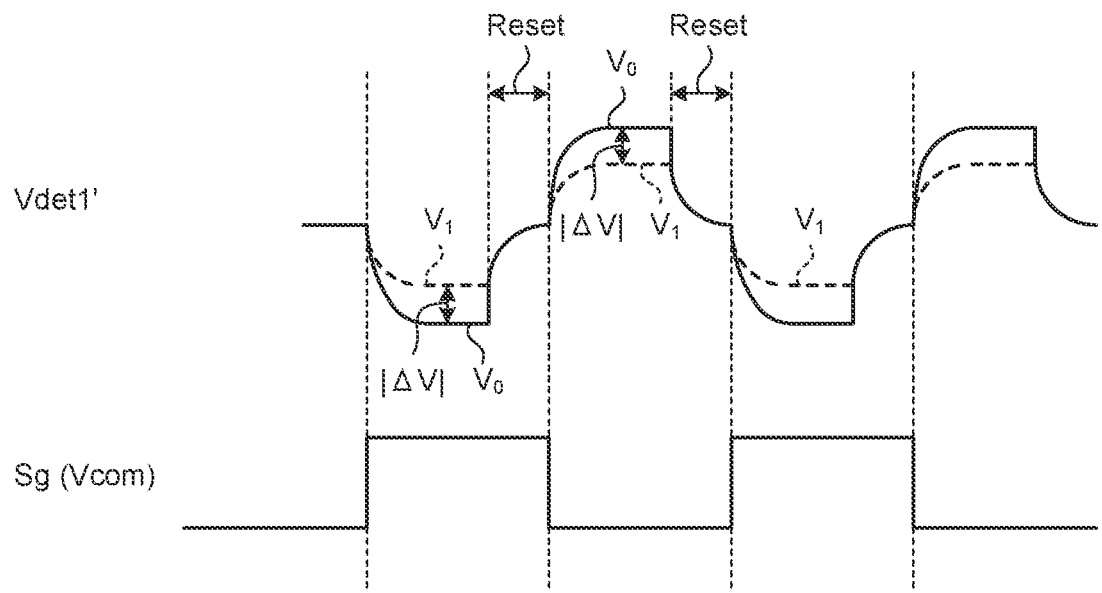
FIG. 7 is a diagram illustrating an example of waveforms of a drive signal and a detection signal of the mutual-capacitive touch detection.

The following describes the basic principle of the touch detection using the mutual-capacitance method performed by the display device 1 of the present embodiment, with reference to FIGS. 3 to 7. FIG. 3 is an explanatory diagram for explaining the basic principle of the mutual-capacitive touch detection, illustrating the state where the finger does not touch the display surface. FIG. 4 is an explanatory diagram illustrating an example of an equivalent circuit in the state illustrated in FIG. 3 where the finger does not touch the display surface. FIG. 5 is an explanatory diagram for explaining the basic principle of the mutual-capacitive touch detection, illustrating the state where the finger touches the display surface. FIG. 6 is an explanatory diagram illustrating an example of an equivalent circuit in the state illustrated in FIG. 5 where the finger touches the display surface. FIG. 7 is a diagram illustrating an example of waveforms of the drive signal and the detection signal of the mutual-capacitive touch detection. FIG. 6 illustrates also a detection circuit. Although the following describes the case where a finger serving as the detection target object touches the display surface, the detection target object is not limited to the finger, and may be an object including a conductor, such as a stylus pen.

For example, as illustrated in FIG. 3, a capacitive element C1 includes a pair of electrodes, that is, a drive electrode E1 and a detection electrode E2 that are disposed so as to face each other with a dielectric material D interposed therebetween. As illustrated in FIG. 4, the capacitive element C1 is coupled, at one end thereof, to an alternating-current signal source (drive signal source) S, and coupled, at the other end thereof, to a voltage detector DET. The voltage detector DET is, for example, an integration circuit included in the detection signal amplifier 42 illustrated in FIG. 2.

When an alternating-current (AC) rectangular wave Sg having a predetermined frequency (ranging, for example, roughly from several kilohertz to several hundred kilohertz) is applied from the alternating-current signal source S to the drive electrode E1 (at the one end of the capacitive element C1), an output waveform (of a detection signal Vdet1') illustrated in FIG. 7 appears through the voltage detector DET coupled to the detection electrode E2 side (the other end side of the capacitive element C1). The AC rectangular wave Sg corresponds to the drive signal Vcom supplied from the drive electrode driver 14.

When the finger is not present in the position facing the display surface, or in the state (non-present state) where the finger is so distant from the display surface as to be undetectable in the hover detection, a current $I_0$ corresponding to the capacitance value of the capacitive element C1 flows in association with charge and discharge of the capacitive element C1, as illustrated in FIGS. 3 and 4. The voltage detector DET illustrated in FIG. 4 converts a variation in the current $I_0$ corresponding to the AC rectangular wave Sg into a variation in voltage (waveform $V_0$ indicated by a solid line (refer to FIG. 7)).

In the state (contact state) where the finger is in contact with or in proximity to the display surface, as illustrated in FIG. 5, electrostatic capacitance C2 generated by the finger is in contact with or in proximity to the detection electrode E2, so that a fringe component of electrostatic capacitance present between the drive electrode E1 and the detection electrode E2 is interrupted. As a result, as illustrated in FIG. 6, the capacitive element C1 serves as a capacitive element C11 having a smaller capacitance value than that in the non-present state. In the equivalent circuit illustrated in FIG. 6, a current Ii flows in the capacitive element C11.

As illustrated in FIG. 7, the voltage detector DET converts a variation in the current corresponding to the AC rectangular wave Sg into a variation in voltage (waveform $V_1$ of indicated by a dotted line). In this case, the waveform $V_1$ has a smaller amplitude than that of the above-mentioned waveform $V_0$. As a result, the absolute value $|\Delta V|$ of a voltage difference between the waveforms $V_0$ and $V_1$ changes according to the influence of the conductor, such as a finger, contacting or approaching the display surface from the outside. To accurately detect the absolute value $|\Delta V|$ of the voltage difference between the waveforms $V_0$ and $V_1$, the voltage detector DET more preferably performs an operation including a period Reset during which the charge or discharge of the capacitor is reset by switching in the circuit in accordance with the frequency of the AC rectangular wave Sg.

The touch sensor 30 illustrated in FIG. 1 performs the touch detection using the mutual-capacitance method described above. In this operation, the touch sensor 30 outputs the detection signal Vdet1 from a plurality of the touch detection electrode blocks TDLA to be described later, on a detection block-by-detection block basis. The detection signal Vdet1 is supplied to the detection signal amplifier 42 of the detector 40 and is, for example, integrated by the voltage detector DET included in the detection signal amplifier 42, and the detection signal Vdet1' is output.

Figure 8:
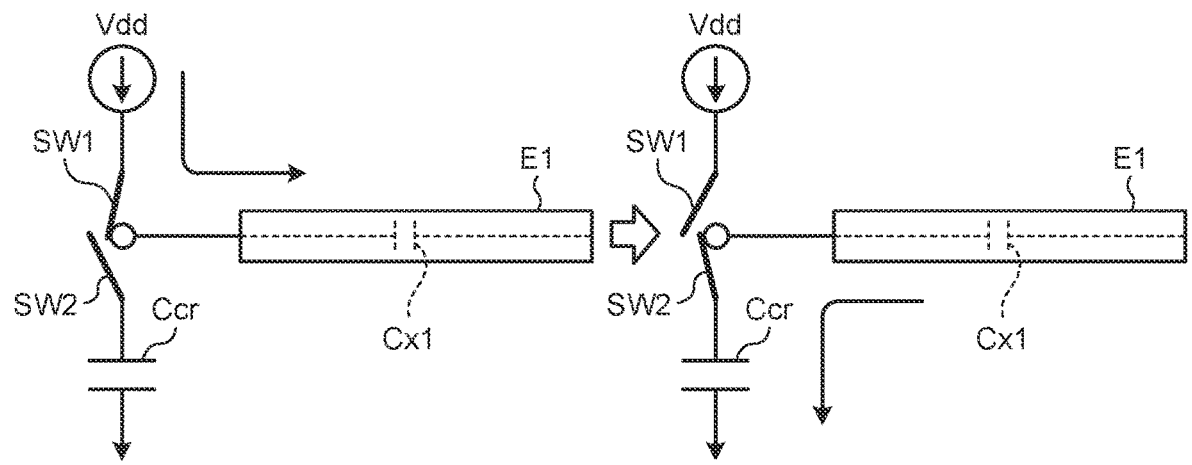
FIG. 8 is an explanatory diagram for explaining the basic principle of self-capacitive touch detection, illustrating the state where the finger does not touch the screen.
Figure 9:
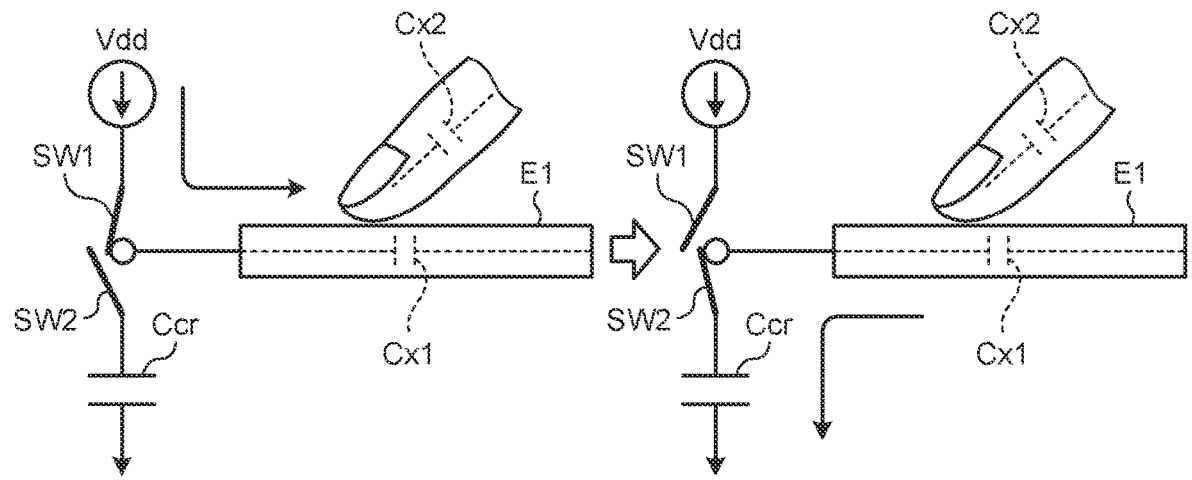
FIG. 9 is an explanatory diagram for explaining the basic principle of the self-capacitive touch detection, illustrating the state where the finger touches the screen.
Figure 10:
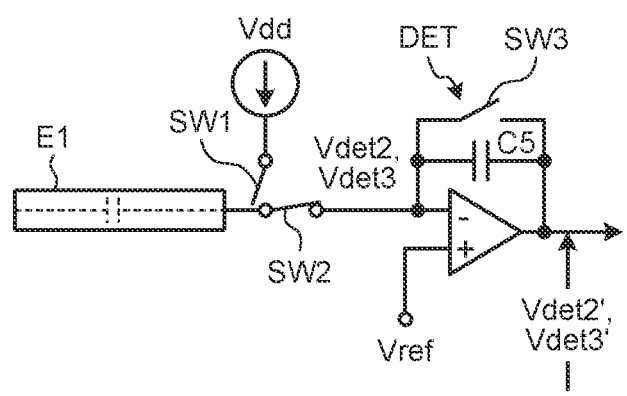
FIG. 10 is an explanatory diagram illustrating an example of an equivalent circuit of the self-capacitive touch detection.
Figure 11:
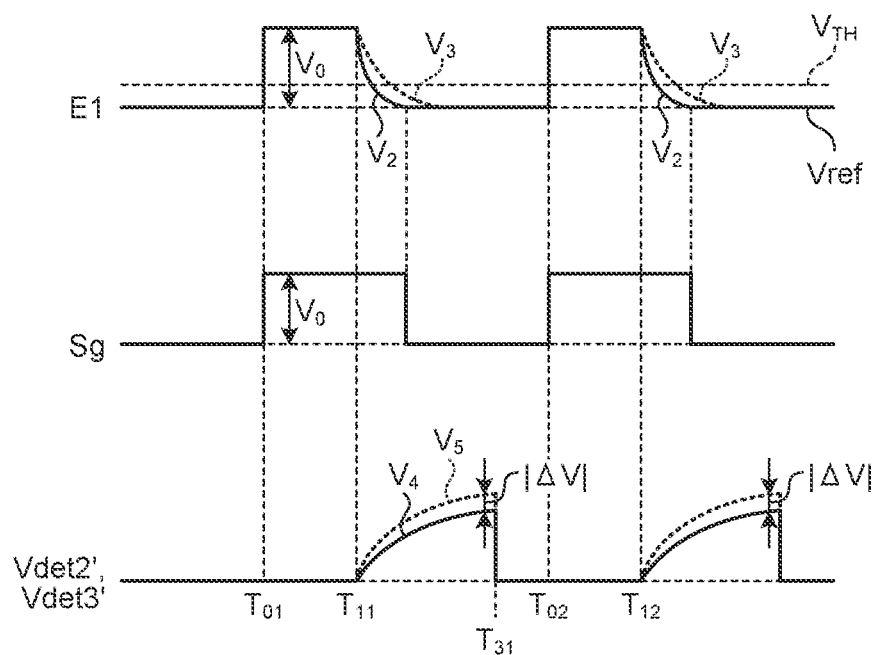
FIG. 11 is a diagram illustrating an example of waveforms of the drive signal and the detection signal of the self-capacitive touch detection.

The following describes the basic principle of the touch detection using the self-capacitance method, with reference to FIGS. 8 to 11. FIG. 8 is an explanatory diagram for explaining the basic principle of the self-capacitive touch detection, illustrating the state where the finger does not touch the display surface. FIG. 9 is an explanatory diagram for explaining the basic principle of the self-capacitive touch detection, illustrating the state where the finger touches the display surface. FIG. 10 is an explanatory diagram illustrating an example of an equivalent circuit of the self-capacitive touch detection. FIG. 11 is a diagram illustrating an example of waveforms of the drive signal and the detection signal of the self-capacitive touch detection.

In the self-capacitance method, the above-mentioned drive electrode E1 serves as the detection electrode. The left side diagram of FIG. 8 illustrates a state where a switching element SW1 couples a power supply Vdd to the detection electrode E1, and a switching element SW2 does not couple the detection electrode E1 to a capacitor Ccr, in the state where the finger does not touch the display surface. In this state, electrostatic capacitance Cx1 included in the detection electrode E1 is charged. The right side diagram of FIG. 8 illustrates a state where the switching element SW1 uncouples the power supply Vdd from the detection electrode E1, and the switching element SW2 couples the detection electrode E1 to the capacitor Ccr. In this state, the electrostatic capacitance Cx1 is discharged through the capacitor Ccr. The value of the electrostatic capacitance Cx1 is determined by a capacitance value between the detection electrode E1 and a peripheral conductor facing or close to the detection electrode E1.

The left side diagram of FIG. 9 illustrates the state where the switching element SW1 couples the power supply Vdd to the detection electrode E1, and the switching element SW2 does not couple the detection electrode E1 to the capacitor Ccr, in the state where the finger touches the display surface. In this state, the electrostatic capacitance Cx1 included in the detection electrode E1 and electrostatic capacitance Cx2 generated by the finger close to the detection electrode E1 are charged. The right side diagram of FIG. 9 illustrates the state where the switching element SW1 uncouples the power supply Vdd from the detection electrode E1, and the switching element SW2 couples the detection electrode E1 to the capacitor Ccr. In this state, the electrostatic capacitance Cx1 and the electrostatic capacitance Cx2 are discharged through the capacitor Ccr.

The voltage change characteristic of the capacitor Ccr clearly differs between during the discharge illustrated in the right side diagram of FIG. 8 (in the state where the finger does not touch the display surface) and during the discharge illustrated in the right side diagram of FIG. 9 (in the state where the finger touches the display surface) because the latter state includes the electrostatic capacitance Cx2. Accordingly, in the self-capacitance method, the difference in the voltage change characteristic of the capacitor Ccr caused by the presence or absence of the electrostatic capacitance Cx2 is used to determine whether an operational input is made by, for example, a finger.

Specifically, the AC rectangular wave Sg (refer to FIG. 11) having the predetermined frequency (ranging, for example, roughly from several kilohertz to several hundred kilohertz) is applied to the detection electrode E1. The voltage detector DET illustrated in FIG. 10 converts a variation in the current corresponding to the AC rectangular wave Sg into a variation in voltage (waveform $V_4$ or $V_5$).

As described above, the detection electrode E1 is configured to be disconnectable from the power supply Vdd and the capacitor Ccr by the switching element SW1 and the switching element SW2. In FIG. 11, the AC rectangular wave Sg increases to a voltage level corresponding to a voltage $V_0$ at time $T_{01}$. At this time, the switching element SW1 is on, and the switching element SW2 is off. As a result, the voltage of the detection electrode E1 also increases to the voltage $V_0$. Then, the switching element SW1 is turned off before time $T_{11}$. At this time, the detection electrode E1 is electrically not coupled to anywhere, but the potential of the detection electrode E1 is kept at $V_0$ by the electrostatic capacitance Cx1 of the detection electrode E1 (refer to FIG. 8), or by capacitance obtained by adding the electrostatic capacitance Cx2 generated by the touch of a finger or the like to the electrostatic capacitance Cx1 of the detection electrode E1 (Cx1+Cx2, refer to FIG. 9). In addition, a switching element SW3 is tuned on before time $T_{11}$, and turned off after a lapse of a predetermined time to reset the voltage detector DET. This reset operation sets an output voltage to a voltage substantially equal to a reference voltage Vref.

Subsequently, turning on the switching element SW2 at time $T_{11}$ sets the voltage at the inverting input part of the voltage detector DET to the voltage $V_0$ of the detection electrode E1. Then, the voltage of the inverting input part of the voltage detector DET drops to the reference voltage Vref according to a time constant of the electrostatic capacitance Cx1 (or Cx1+Cx2) of the detection electrode E1 and electrostatic capacitance C5 in the voltage detector DET. At this time, the electric charge stored in the electrostatic capacitance Cx1 (or Cx1+Cx2) of the detection electrode E1 moves to the electrostatic capacitance C5 in the voltage detector DET, and consequently, the output of the voltage detector DET increases (to Vdet2'). When a finger or the like does not touch the detection electrode E1, the output (Vdet2') of the voltage detector DET forms the waveform $V_4$ indicated by a solid line, and is given as Vdet2'=Cx1×$V_0$/C5. When capacitance is added by the influence of a finger or the like, the output Vdet2' forms the waveform $V_5$ indicated by a dotted line, and is given as Vdet2'=(Cx1+Cx2)×$V_0$/C5.

Then, at time $T_{31}$ after the electric charge in the electrostatic capacitance Cx1 (or Cx1+Cx2) of the detection electrode E1 has sufficiently moved to the electrostatic capacitance C5, the switching element SW2 is turned off, and the switching elements SW1 and SW3 are turned on so as to lower the potential of the detection electrode E1 to a low level potential equal to that of the AC rectangular wave Sg, and also to reset the voltage detector DET. In this operation, the switching element SW1 can be turned on at any time before time $T_{02}$ after the switching element SW2 is turned off. The voltage detector DET can be reset at any time before time $T_{12}$ after the switching element SW2 is turned off. The operation described above is repeated at the predetermined frequency (ranging, for example, roughly from several kilohertz to several hundred kilohertz). Whether the external proximate object is present (whether the touch is made) can be determined based on the absolute value |ΔV| of a difference between the waveforms $V_4$ and $V_5$. As illustrated in FIG. 11, the potential of the detection electrode E1 is represented by the waveform $V_2$ when a finger or the like does not touch the detection electrode E1, or represented by the waveform $V_3$ when the electrostatic capacitance Cx2 is added by the influence of a finger or the like. Whether the external proximate object is present (whether the touch is made) can also be determined by measuring a time until each of the waveforms $V_1$ and $V_2$ drops to a predetermined threshold voltage VTH.

The touch sensor 30 illustrated in FIG. 1 performs the hover detection using the self-capacitance method described above. In this operation, the touch sensor 30 outputs the detection signal Vdet2 from the touch detection electrode block TDLB to be described later. The detection signal Vdet2 is supplied to the detection signal amplifier 42 of the detector 40 and is, for example, integrated by the voltage detector DET included in the detection signal amplifier 42, and the detection signal Vdet2' is output. In the hover detection according to the present embodiment, the AC rectangular wave Sg is applied to the detection electrode E1 (touch detection electrode block TDLB) and the peripheral conductor (in the present embodiment, the drive electrode COML) facing or close to the detection electrode E1 (touch detection electrode block TDLB).

The touch sensor 30 illustrated in FIG. 1 also performs the correction value detection using the self-capacitance method or the mutual-capacitance method. In this operation, the touch sensor 30 outputs the detection signal Vdet3 from the touch detection electrode block TDLB to be described later. The detection signal Vdet3 is supplied to the detection signal amplifier 42 of the detector 40 and is, for example, integrated by the voltage detector DET included in the detection signal amplifier 42, and a detection signal Vdet3' is output. In the correction value detection according to the present embodiment, the AC rectangular wave Sg is applied to the peripheral conductor (in the present embodiment, the drive electrode COML) facing or close to the detection electrode E1 (touch detection electrode block TDLB).

Figure 12:
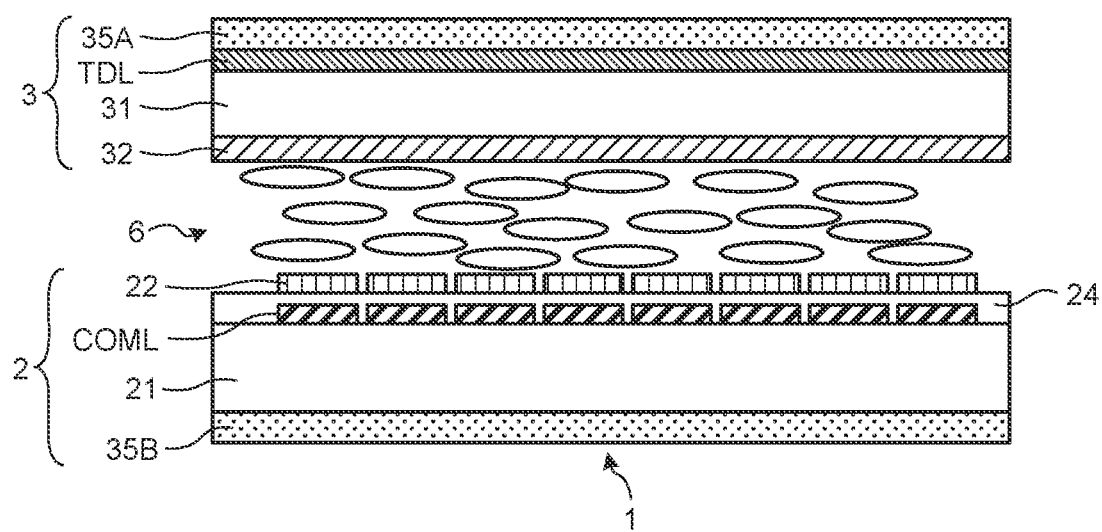
FIG. 12 is a sectional view illustrating a schematic sectional structure of the display device.
Figure 13:
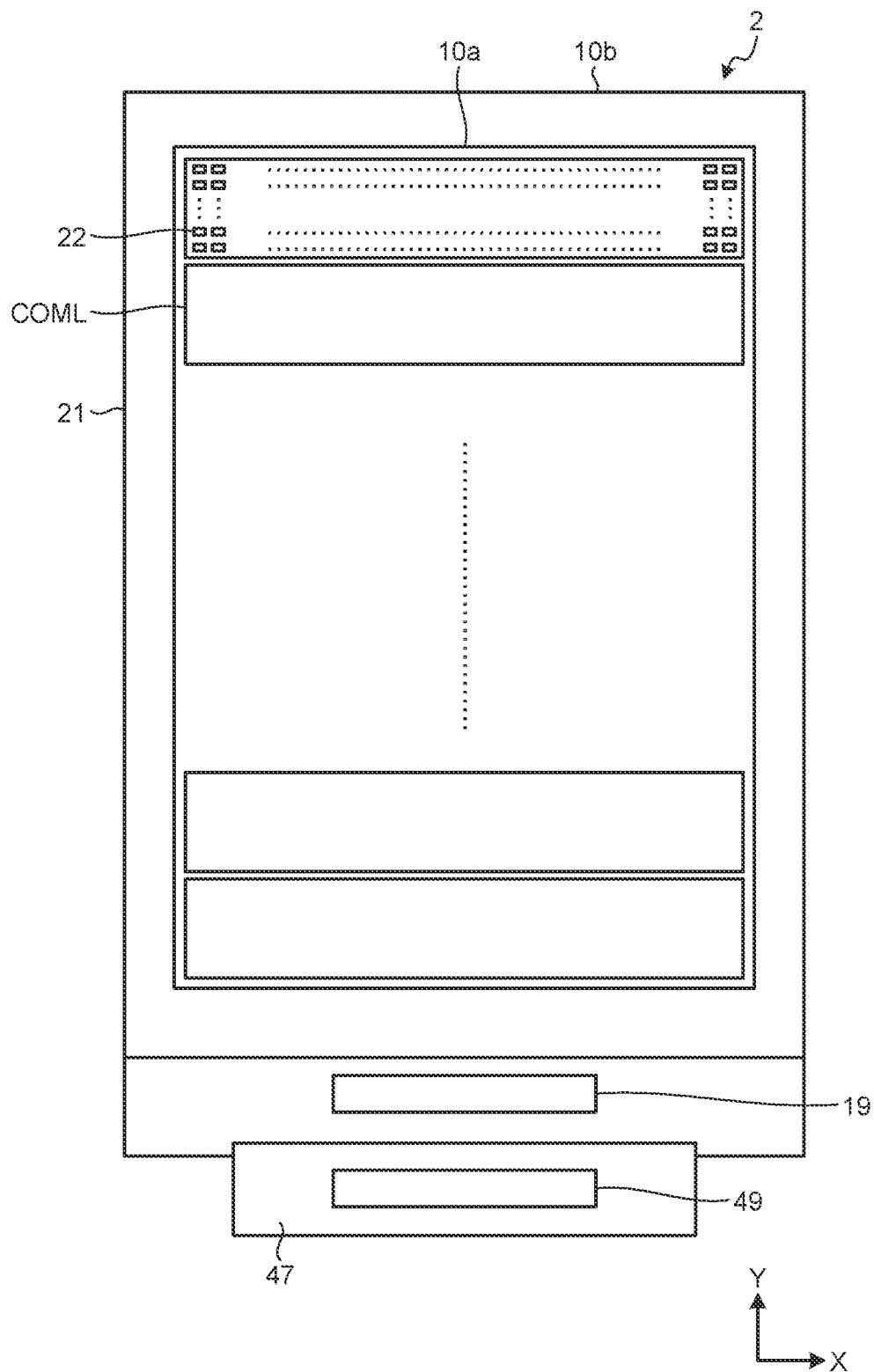
FIG. 13 is a plan view schematically illustrating a thin-film transistor (TFT) substrate included in the display device according to the first embodiment.

The following describes a configuration example of the display device 1 in detail. FIG. 12 is a sectional view illustrating a schematic sectional structure of the display device. FIG. 13 is a plan view schematically illustrating a TFT substrate included in the display device according to the first embodiment. FIG. 14 is a plan view schematically illustrating a counter substrate included in the display device according to the first embodiment.

As illustrated in FIG. 12, the display device 1 includes a pixel substrate 2, a counter substrate 3 disposed so as to face a surface of the pixel substrate 2 in a direction orthogonal thereto, and a liquid crystal layer 6 interposed between the pixel substrate 2 and the counter substrate 3.

As illustrated in FIG. 12, the pixel substrate 2 includes a thin-film transistor (TFT) substrate 21 serving as a circuit board, a plurality of pixel electrodes 22 arranged in a row-column configuration (in a matrix) above the TFT substrate 21, the drive electrodes COML provided between the TFT substrate 21 and the pixel electrodes 22, and an insulating layer 24 for insulating the pixel electrodes 22 from the drive electrodes COML. A polarizing plate 35B is provided on the lower side of the TFT substrate 21 with an adhesive layer (not illustrated) interposed therebetween. In the present specification, the term "upper side" denotes a direction from the TFT substrate 21 toward a counter substrate 31 in a direction orthogonal to the TFT substrate 21. The term "lower side" denotes a direction from the counter substrate 31 toward the TFT substrate 21.

Figure 14:
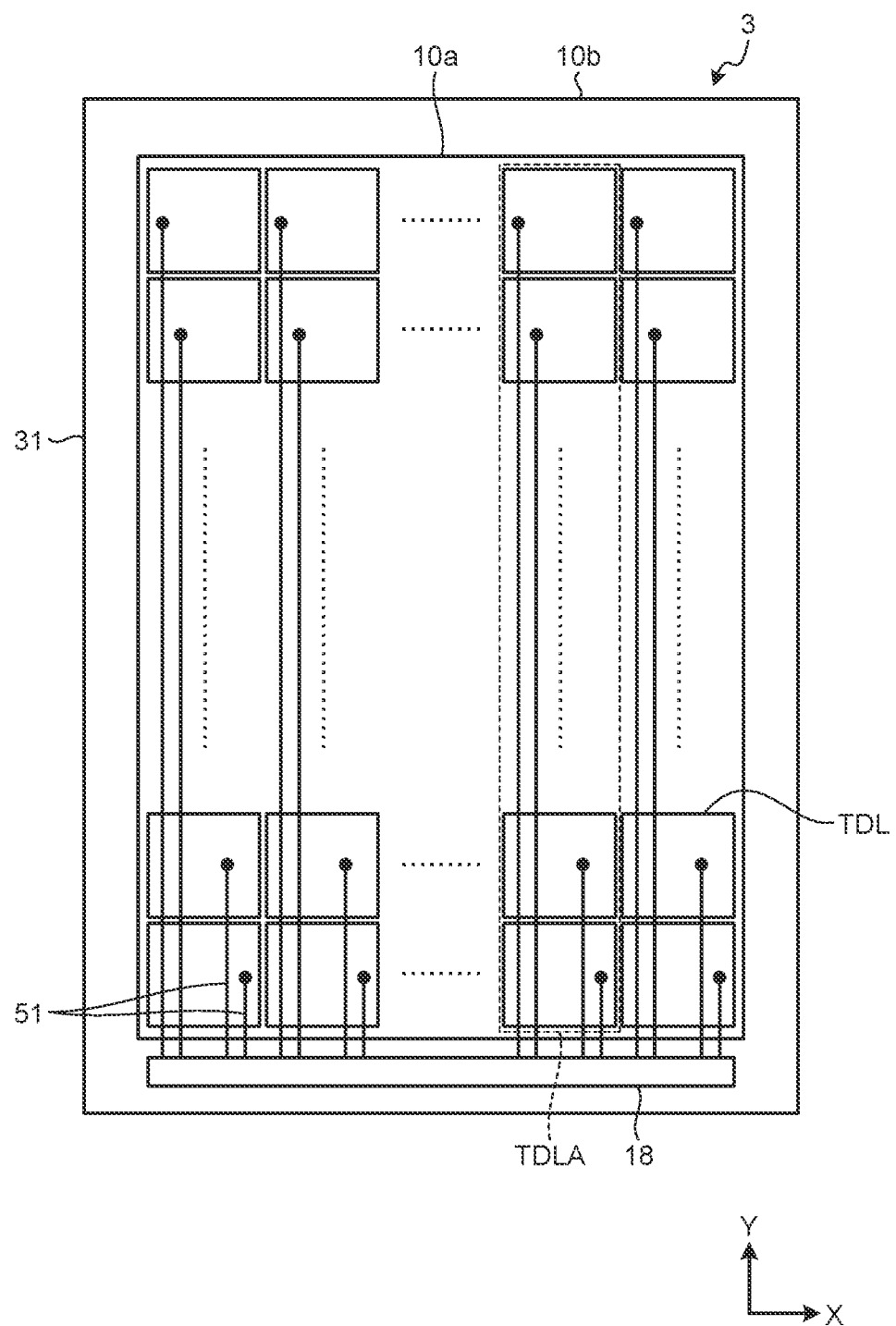
FIG. 14 is a plan view schematically illustrating a counter substrate included in the display device according to the first embodiment.

As illustrated in FIGS. 13 and 14, each of the TFT substrate 21 and the counter substrate 31 has a display region 10a for displaying an image and a frame region 10b provided around the display region 10a. The display region 10a has a rectangular shape having a pair of long edges and a pair of short edges. The frame region 10b has a frame shape surrounding the four edges of the display region 10a.

As illustrated in FIG. 13, the drive electrodes COML are provided in the display region 10a of the TFT substrate 21. More specifically, the drive electrodes COML extending in a direction (X-direction) along the short edges of the display region 10a are arranged side by side in a direction (Y-direction) along the long edges of the display region 10a. Each of the drive electrodes COML is rectangular in a plan view. The drive electrodes COML are made of a light-transmitting conductive material such as indium tin oxide (ITO). The pixel electrodes 22 are arranged in a matrix having a row-column configuration in positions corresponding to each of the drive electrodes COML. Each of the pixel electrodes 22 has an area smaller than that of the drive electrode COML. While FIG. 13 illustrates some of the drive electrodes COML and some of the pixel electrodes 22, the drive electrodes COML and the pixel electrodes 22 are arranged over the entire area of the display region 10a.

A display integrated circuit (IC) 19 is disposed in the frame region 10b of the TFT substrate 21. The display IC 19 is a chip mounted using a chip-on-glass (COG) technique on the TFT substrate 21. The display IC 19 incorporates, for example, the controller 11 (refer to FIG. 1). The display IC 19 outputs the control signals to, for example, the gate lines GCL and the data lines SGL to be described later based on the video signal Vdisp (refer to FIG. 1) supplied from an external host IC (not illustrated).

A flexible substrate 47 with a detection IC 49 disposed thereon is coupled to the frame region 10b of the TFT substrate 21. The detection IC 49 is a chip mounted on the flexible substrate 47. The detection IC 49 incorporates, for example, the detector 40 (refer to FIG. 1), and is coupled to the display IC 19 through the flexible substrate 47.

The display IC 19 may be disposed, for example, on a short-edge side of the frame region 10b, as illustrated in FIG. 13. This configuration eliminates the need for providing the display IC 19 on a long-edge side of the frame region 10b, and thus, can reduce the width along the long edge of the frame region 10b.

As illustrated in FIG. 12, the counter substrate 3 includes the counter substrate 31 and a color filter 32 provided on one surface of the counter substrate 31. The other surface of the counter substrate 31 is provided with the touch detection electrodes TDL of the touch sensor 30. A polarizing plate 35A is provided above the touch detection electrodes TDL with an adhesive layer (not illustrated) interposed therebetween. A flexible substrate (not illustrated) is coupled to the counter substrate 31. The flexible substrate is coupled to the touch detection electrodes TDL through frame wiring.

As illustrated in FIG. 12, the TFT substrate 21 and the counter substrate 31 are arranged so as to face each other with a predetermined gap interposed therebetween. A space between the TFT substrate 21 and the counter substrate 31 is provided with the liquid crystal layer 6 as a display functional layer. The liquid crystal layer 6 modulates light passing therethrough according to a state of an electric field, and is made using, for example, liquid crystals in a horizontal electric field mode, such as an in-plane switching (IPS) mode including a fringe field switching (FFS) mode. Orientation films may be provided between the liquid crystal layer 6 and the pixel substrate 2 and between the liquid crystal layer 6 and the counter substrate 3, which are illustrated in FIG. 12.

As illustrated in FIG. 14, the touch detection electrodes TDL are provided in the display region 10a of the counter substrate 31, and are arranged side by side in the row direction (X-direction) and the column direction (Y-direction), thus being arranged in a matrix having a row-column configuration. Each of the touch detection electrodes TDL is rectangular or square in the plan view. The touch detection electrodes TDL are made of a light-transmitting conductive material such as ITO. The touch detection electrodes TDL are not limited to being made of ITO, and may be made of, for example, thin metal wires using a metal material. In the present embodiment, during the touch detection using the mutual-capacitance method, the touch detection electrodes TDL arranged in the row direction are coupled to one another through the coupling circuit 18 to constitute the touch detection electrode block TDLA having a linear shape. While FIG. 14 illustrates some of the touch detection electrodes TDL, the touch detection electrodes TDL are arranged over the entire area of the display region 10a.

The wiring 51 is coupled to each of the touch detection electrodes TDL arranged in the display region 10a, and is drawn out to the frame region 10b. Ends of the touch detection electrodes TDL are coupled to the flexible substrate 47 provided on the short-edge side of the frame region 10b of the TFT substrate 21 (refer to FIG. 13). For example, the detector 40 (refer to FIG. 1) incorporated in the detection IC 49 (refer to FIG. 13) is coupled to each of the touch detection electrodes TDL through the flexible substrate 47, the TFT substrate 21, the coupling circuit 18 disposed in the frame region 10b of the counter substrate 31, and the wiring 51.

As illustrated in FIG. 12, the TFT substrate 21 and the counter substrate 31 are arranged so as to face each other with the predetermined gap interposed therebetween. The space between the TFT substrate 21 and the counter substrate 31 is provided with the liquid crystal layer 6 as the display functional layer. The liquid crystal layer 6 modulates the light passing therethrough according to the state of the electric field, and is made using, for example, the liquid crystals in the horizontal electric field mode, such as the in-plane switching (IPS) mode including the fringe field switching (FFS) mode. The orientation films may be provided between the liquid crystal layer 6 and the pixel substrate 2 and between the liquid crystal layer 6 and the counter substrate 3, which are illustrated in FIG. 12.

Figure 15:
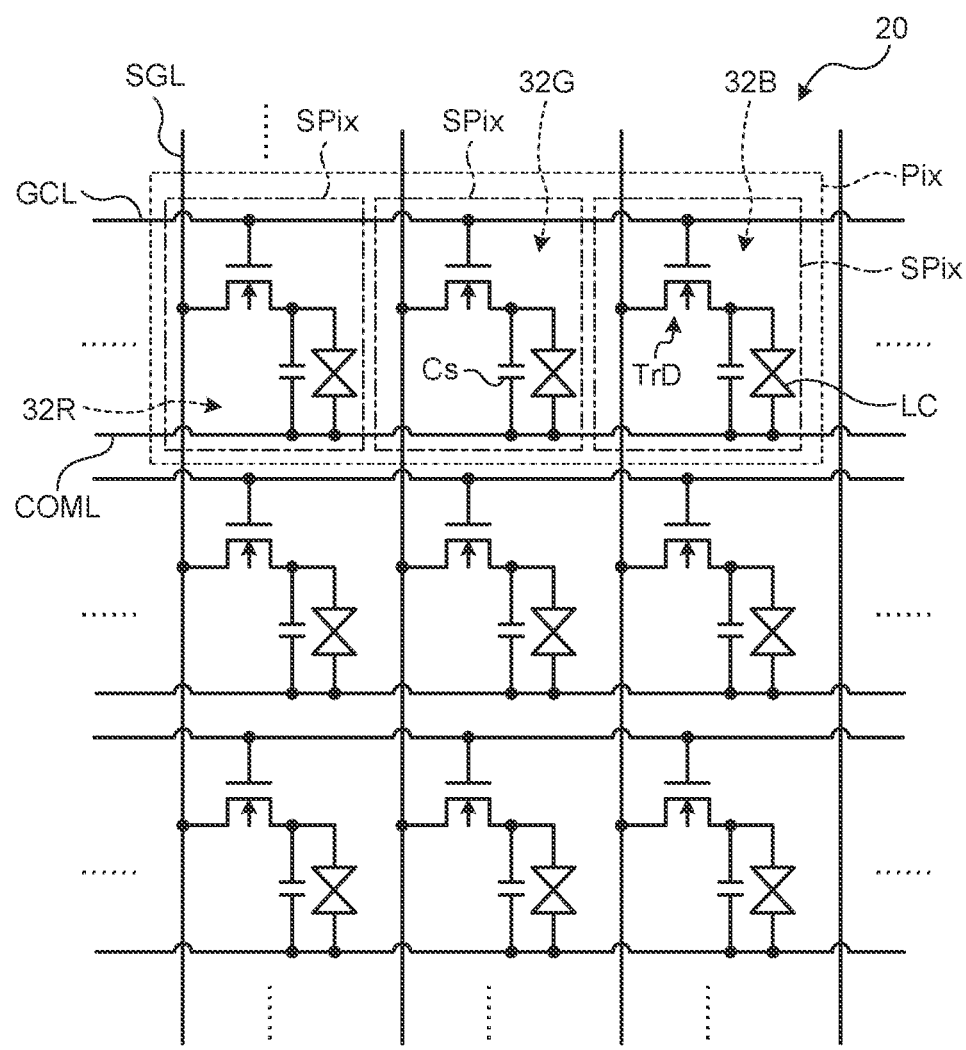
FIG. 15 is a circuit diagram illustrating a pixel array of a display unit according to the first embodiment.
Figure 16:
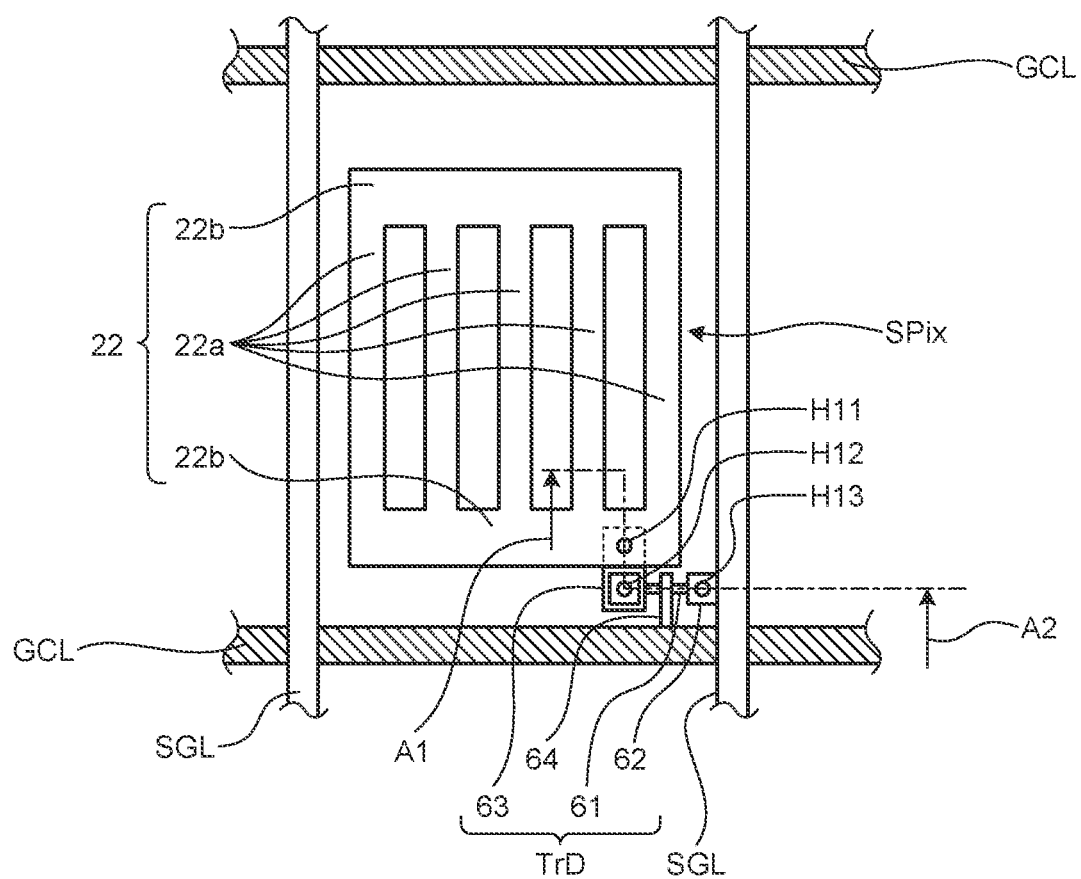
FIG. 16 is a plan view illustrating a configuration example of a sub-pixel.
Figure 17:
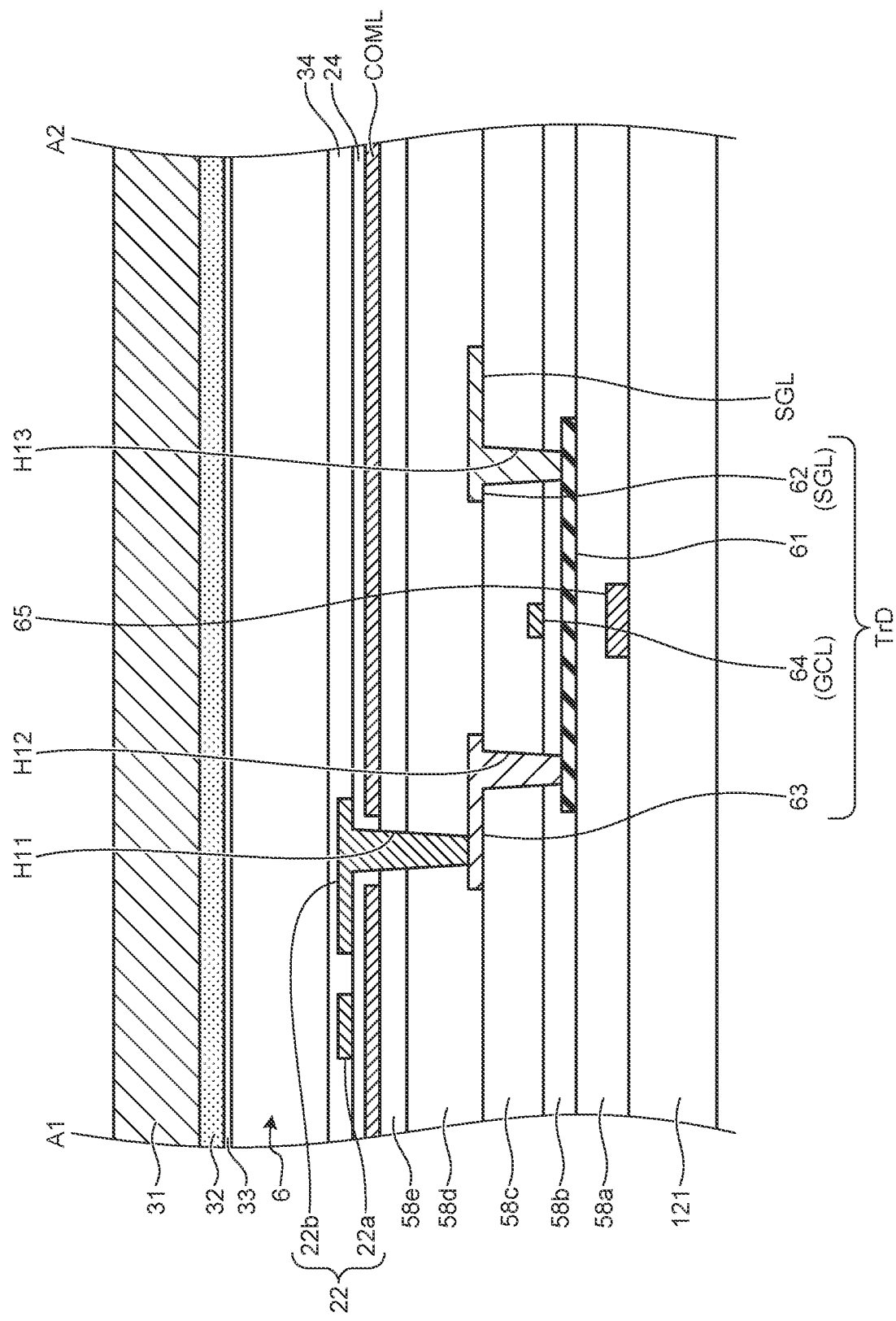
FIG. 17 is a sectional view along line A1-A2 in FIG. 16.

FIG. 15 is a circuit diagram illustrating a pixel array of the display unit according to the first embodiment. FIG. 16 is a plan view illustrating a configuration example of the sub-pixel. FIG. 17 is a sectional view along line A1-A2 in FIG. 16.

The TFT substrate 21 illustrated in FIG. 12 is provided with a switching element TrD in each of the sub-pixels SPix and wiring including, for example, the data lines SGL for supplying the pixel signal Vpix to the respective pixel electrodes 22 and the gate lines GCL for supplying the drive signal for driving the respective switching elements TrD, which are illustrated in FIG. 15. The data lines SGL and the gate lines GCL extend in a plane parallel to a surface of the TFT substrate 21.

The display unit 20 illustrated in FIG. 15 includes the sub-pixels SPix arranged in a matrix having a row-column configuration. Each of the sub-pixels SPix includes the switching element TrD and a liquid crystal element LC. The switching element TrD is constituted by a thin-film transistor, and is constituted by an n-channel metal-oxide-semiconductor (MOS) TFT in this example. The source of the switching element TrD is coupled to the data line SGL. The gate of the switching element TrD is coupled to the gate line GCL. The drain of the switching element TrD is coupled to one end of the liquid crystal element LC. The other end of the liquid crystal element LC is coupled to the drive electrode COML included in a drive electrode block COMLA. The insulating layer 24 (refer to FIG. 12) is provided between the pixel electrode 22 and the drive electrode COML, thus forming storage capacitance Cs illustrated in FIG. 15.

The gate line GCL couples the sub-pixel SPix to the other sub-pixels SPix belonging to the same row of the display unit 20. The gate line GCL is coupled to the gate driver 12 (refer to FIG. 1), and is supplied with the scan signal Vscan from the gate driver 12. The data line SGL couples the sub-pixel SPix to the other sub-pixels SPix belonging to the same column of the display unit 20. The data line SGL is coupled to the source driver 13 (refer to FIG. 1), and is supplied with the pixel signal Vpix from the source driver 13. Each of the drive electrodes COML included in the drive electrode block COMLA is coupled to the drive electrode driver 14 (refer to FIG. 1), and is supplied with the drive signal Vcom from the drive electrode driver 14.

As illustrated in FIG. 16, a region surrounded by the gate lines GCL and the data lines SGL serves as the sub-pixel SPix. The sub-pixel SPix is provided so as to include a region where the pixel electrode 22 overlaps the drive electrode COML. Each of the pixel electrodes 22 is coupled to the data line SGL through the switching element TrD.

As illustrated in FIG. 16, the pixel electrode 22 includes a plurality of strip electrodes 22a and connecting portions 22b. The strip electrodes 22a are provided along the data line SGL, and are arranged in a direction along the gate lines GCL. The connecting portions 22b connect ends of the strip electrodes 22a to one another. The pixel electrode 22 includes five of the strip electrodes 22a, but is not limited thereto, and may include four or less, or six or more of the strip electrodes 22a. The pixel electrode 22 may include, for example, two of the strip electrodes 22a.

As illustrated in FIG. 16, the switching element TrD includes a semiconductor layer 61, a source electrode 62, a drain electrode 63, and a gate electrode 64. A light-blocking layer 65 is provided on the lower side of the semiconductor layer 61.

As illustrated in FIG. 17, the light-blocking layer 65 is provided on a substrate 121. An insulating layer 58a is provided on the substrate 121 so as to cover the light-blocking layer 65. The semiconductor layer 61 is provided on the insulating layer 58a. The gate electrode 64 (gate line GCL) is provided on the upper side of the semiconductor layer 61 with an insulating layer 58b interposed therebetween. The drain electrode 63 and the source electrode 62 (data line SGL) are provided on the upper side of the gate electrode 64 (gate line GCL) an insulating layer 58c interposed therebetween. The wiring 51 (refer to FIG. 14) is provided on the upper side of the drain electrode 63 and the source electrode 62 (data line SGL) with an insulating layer 58d interposed therebetween. The drive electrode COML is provided on the upper side of the wiring 51 with an insulating layer 58e interposed therebetween. As described above, the pixel electrode 22 is provided on the upper side of the drive electrode COML with the insulating layer 24 interposed therebetween. An orientation film 34 is provided on the pixel electrode 22. An orientation film 33 faces the orientation film 34 with the liquid crystal layer 6 interposed therebetween.

As illustrated in FIGS. 16 and 17, the pixel electrode 22 is coupled to the drain electrode 63 of the switching element TrD through a contact hole H11. The semiconductor layer 61 is coupled to the drain electrode 63 through a contact hole H12. The semiconductor layer 61 intersects the gate electrode 64 in the plan view. The gate electrode 64 is coupled to the gate line GCL, and is provided so as to project from one side of the gate line GCL. The semiconductor layer 61 extends to a position overlapping the source electrode 62, and is electrically coupled to the source electrode 62 through a contact hole H13. The source electrode 62 is coupled to the data line SGL, and projects from one side of the data line SGL. The wiring 51 is provided in a layer different from those of the data line SGL and the gate line GCL, and is not electrically coupled to the switching element TrD.

A known material, such as a polysilicon or an oxide semiconductor, can be used the material of the semiconductor layer 61. For example, a transparent amorphous oxide semiconductor (TAOS) can be used to achieve a higher capacity to hold the voltage for video display for a long time, and improve the display quality.

A portion of the semiconductor layer 61 overlapping the gate electrode 64 is provided with a channel (not illustrated). The light-blocking layer 65 is preferably provided in a position overlapping the channel, and preferably has an area larger than the channel. Providing the light-blocking layer 65 can block light incident on the semiconductor layer 61 from, for example, a backlight.

The gate driver 12 illustrated in FIG. 1 drives the gate line GCL so as to sequentially scan the gate line GCL. The gate driver 12 applies the scan signal Vscan (refer to FIG. 1) to the gate of a TFT element Tr of the sub-pixel SPix through the gate line GCL to sequentially select one row (one horizontal line) of the sub-pixels SPix as the target of the display driving. The source driver 13 supplies the pixel signals Vpix to the sub-pixels SPix belonging to the one horizontal line selected by the gate driver 12 through the data lines SGL illustrated in FIG. 15. These sub-pixels SPix perform display of each horizontal line according to the supplied pixel signals Vpix. When this display operation is performed, the drive electrode driver 14 applies the drive signal Vcomdc for display to the drive electrodes COML. As a result, the drive electrodes COML serve as common electrodes for the pixel electrodes 22 during the display operation.

The color filter 32 illustrated in FIG. 12 has periodically arranged color regions of color filters colored in, for example, three colors of red (R), green (G), and blue (B). Color regions 32R, 32G, and 32B of the three colors R, G, and B are associated, as one set, with the sub-pixels SPix illustrated in FIG. 15 described above. The sub-pixels SPix corresponding to the color regions 32R, 32G, and 32B of the three colors constitute a pixel Pix as one set. As illustrated in FIG. 12, the color filter 32 faces the liquid crystal layer 6 in the direction orthogonal to the TFT substrate 21. The color filter 32 may have a combination of other colors as long as being colored in different colors. The color filter 32 is not limited to a combination of three colors, and may be a combination of four or more colors.

In the present embodiment, as illustrated in FIG. 15, the drive electrodes COML extend in a direction parallel to the extending direction of the gate lines GCL, and extend in a direction intersecting the extending direction of the data lines SGL. The extending direction of the drive electrodes COML is not limited thereto. The drive electrodes COML may extend, for example, in a direction parallel to the data lines SGL.

The drive electrodes COML illustrated in FIGS. 12 and 13 serve as the common electrodes that apply a common potential (reference potential) to the pixel electrodes 22 of the display unit 20. The drive electrodes COML also serve as the drive electrodes when the touch detection using the mutual-capacitance method is performed by the touch sensor 30. The drive electrodes COML also serve as the drive electrodes when the hover detection or the correction value detection using the self-capacitance method is performed by the touch sensor 30. The drive electrodes COML also serve as the drive electrodes when the correction value detection using the mutual-capacitance method is performed by the touch sensor 30.

Figure 18:
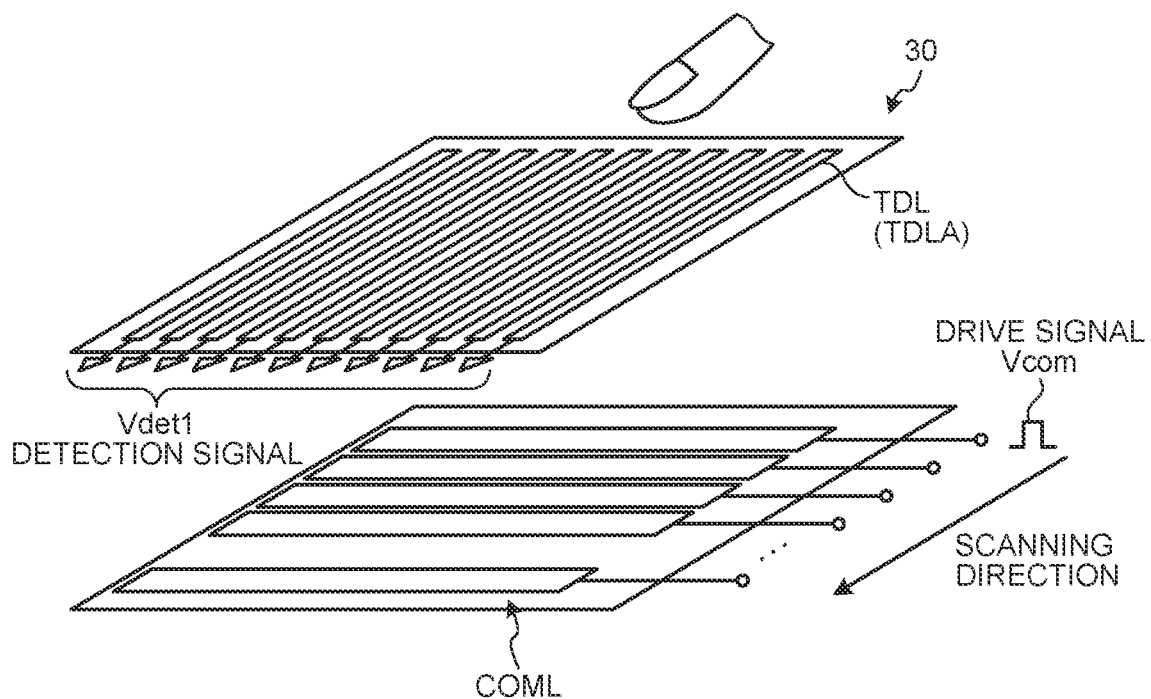
FIG. 18 is a perspective view illustrating a configuration example of drive electrodes and touch detection electrodes of a display panel according to the first embodiment.

FIG. 18 is a perspective view illustrating a configuration example of the drive electrodes and the touch detection electrodes of the display panel according to the first embodiment. The touch sensor 30 includes the drive electrodes COML provided on the pixel substrate 2 and the touch detection electrodes TDL provided on the counter substrate 3. The drive electrodes COML include a plurality of striped electrode patterns extending in the right-left direction in FIG. 18. The touch detection electrode blocks TDLA including the touch detection electrodes TDL serve as a plurality of electrode patterns extending in a direction intersecting the extending direction of the drive electrodes COML. The touch detection electrode blocks TDLA face the drive electrodes COML in the direction orthogonal to the surface of the TFT substrate 21 (refer to FIG. 12). Each of the electrode patterns of the touch detection electrode block TDLA is coupled to the input of the detection signal amplifier 42 of the detector 40 (refer to FIG. 2). Electrostatic capacitance is generated at an intersecting portion between the drive electrode COML and each of the electrode patterns of the touch detection electrode blocks TDLA.

The shape of the touch detection electrode blocks TDLA and the drive electrodes COML is not limited to the shape formed of a plurality of divided stripes. For example, the drive electrodes COML may have a shape of comb teeth. Otherwise, the drive electrodes COML only need to be divided into a plurality of portions, and the shape of slits dividing the touch detection electrodes TDL may be linear or curved.

When the touch sensor 30 performs the touch detection using the mutual-capacitance method, the drive electrode driver 14 performs driving so as to sequentially scan each of the drive electrodes COML in a time-division manner, and thus, sequentially selects the drive electrodes COML. The detection signal Vdet1 is output from the touch detection electrode block TDLA, and thus, the touch detection using the drive electrodes COML is performed. That is, the drive electrode COML corresponds to the drive electrode E1 and the touch detection electrode block TDLA corresponds to the detection electrode E2 in the basic principle of the mutual-capacitive touch detection described above. The touch sensor 30 performs the touch detection according to the basic principle. As illustrated in FIG. 18, the touch detection electrode blocks TDLA and the drive electrodes COML intersecting each other constitute a touch detection surface in the form of a matrix having a row-column configuration. By scanning the entire touch detection surface formed in a matrix having a row-column configuration, the touch sensor 30 can detect the position where the conductor comes in contact with or approximates the display surface from the outside.

As an exemplary operation method of the display device 1, the display device 1 performs the detection operation (detection operation period) and the display operation (display operation period) in a time-division manner. The display device 1 may perform the detection operation and the display operation in any way of division. The following describes a method in which the display device 1 performs the detection operation and the display operation by dividing each of the detection operation and the display operation into a plurality of times of operations in one frame period (1F period) of the display unit 20, that is, in a time required for displaying video information for one screen.

Figure 19:
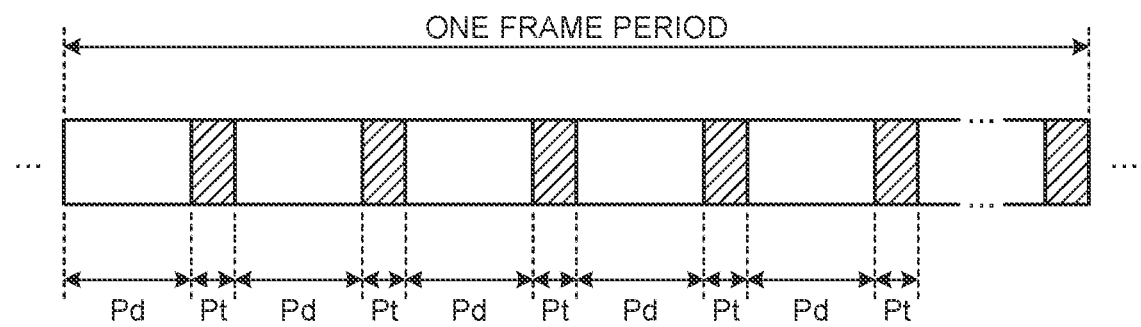
FIG. 19 is a schematic diagram illustrating an example of arrangement of display operation periods and detection operation periods in one frame period.

FIG. 19 is a schematic diagram illustrating an example of arrangement of the display operation periods and the detection operation periods in the one frame period. The one frame period includes a plurality of display operation periods Pd and a plurality of detection operation periods Pt. These periods are alternately arranged on a time axis in the order of a display operation period Pd, a detection operation period Pt, the display operation period Pd, the detection operation period Pt, . . . .

The controller 11 (FIG. 1) supplies the pixel signals Vpix to the pixels Pix in a plurality of rows (refer to FIG. 15) selected in each of the display operation periods Pd through the gate driver 12 and the source driver 13. In the present embodiment, the drive electrodes COML are also used as the common electrodes of the display unit 20. Therefore, in each of the display operation periods Pd, the controller 11 supplies the drive signal Vcomdc for display serving as a common electrode potential for display to the drive electrode COML selected through the drive electrode driver 14.

In each of the detection operation periods Pt, the display device 1 performs any one of the touch detection operation using the mutual-capacitance method, the hover detection operation using the self-capacitance method, and the correction value detection operation to detect the correction value for correcting the detection value during the hover detection.

In the example illustrated in FIG. 19, the display device 1 performs the video display for one screen in one frame period in a plurality of divided times. However, one display operation period Pd and one detection operation period Pt may be provided in the one frame period. In this case, the touch detection operation, the hover detection operation, and the correction value detection operation only need to be performed in chronological order in the detection operation period Pt. Each of the touch detection operation, the hover detection operation, and the correction value detection operation only needs to be performed once in the one frame period, but is preferably performed a plurality of times to increase the detection accuracy in each of the operations.

Figure 20:
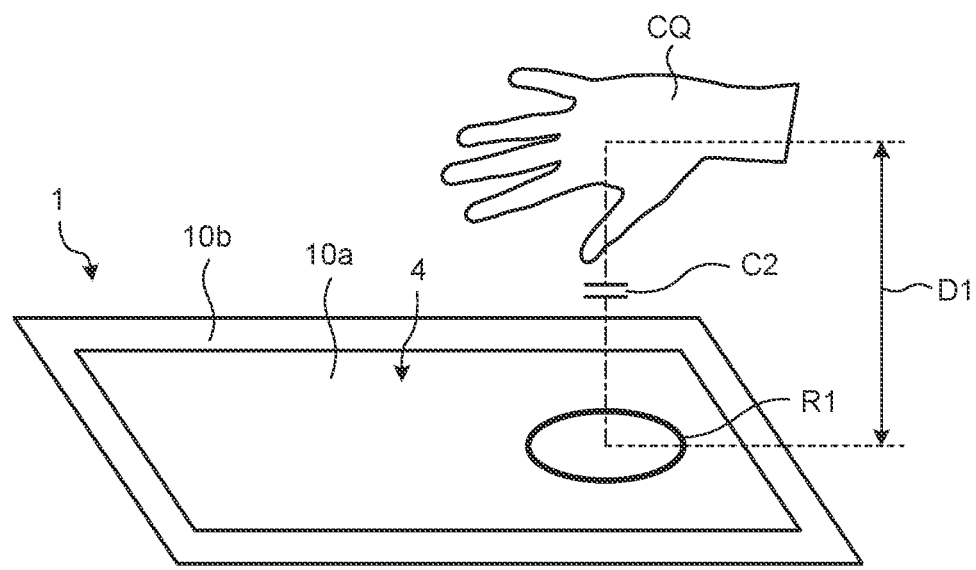
FIG. 20 is a schematic diagram illustrating an example of a hover detected by the display device.
Figure 21:
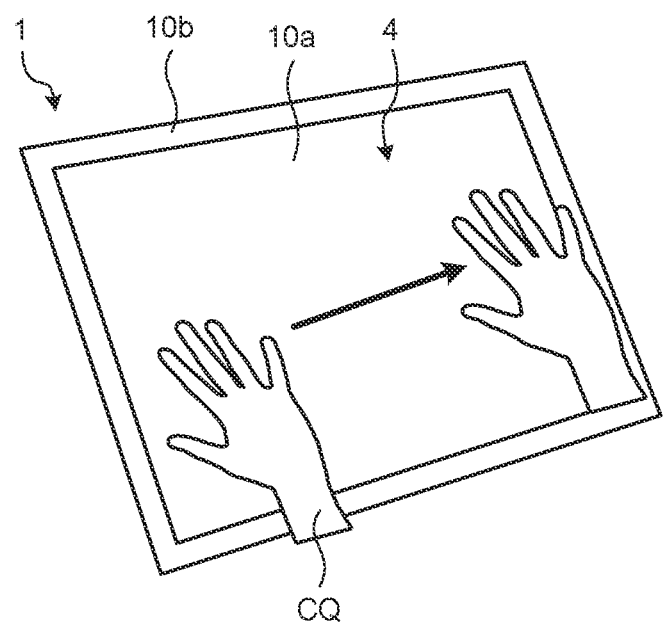
FIG. 21 is a schematic diagram illustrating another example of the hover detected by the display device.

FIGS. 20 and 21 are schematic diagrams illustrating examples of the hover detected by the display device. FIGS. 20 and 21 illustrate a hand of a user as a detection target object CQ. The display device 1 can detect the position and the height of the detection target object CQ located above a display surface 4 in hover detection periods of detection operation periods Pt1 and Pt2. In FIGS. 20 and 21, the detection target object CQ is in the non-present state or the non-contact state with respect to the display surface 4 of the display device 1. The detection target object CQ is away from the display surface 4 by a distance (height) D1. The electrostatic capacitance C2 is generated between the drive electrodes COML (not illustrated) disposed on the display surface 4 side and the detection target object CQ. The detector 40 (refer to FIG. 1) supplies the drive signal Vtd for hover detection to the touch detection electrode blocks TDLB on which the electrostatic capacitance C2 is generated. The detector 40 detects whether the detection target object CQ is present based on the detection signal Vdet2 output from the touch detection electrode blocks TDLB.

In the non-contact state, the electrostatic capacitance C2 increases with increase in the distance D1 between the detection target object CQ and the display surface 4. The increase in the electrostatic capacitance C2 increases the absolute value |ΔV| of the difference in the detection signal Vdet2. This phenomenon allows the detector 40 to detect the distance D1 based on the level of the absolute value |ΔV|. The detector 40 can also detect a position R1 on the display surface 4 facing the detection target object CQ by identifying one of the drive electrodes COML at which the absolute value |ΔV| is a predetermined threshold or higher. As a result, as illustrated in FIG. 21, the display device 1 can detect, for example, a swipe of moving the hand along the display surface 4 and a gesture by the hand.

Figure 22:
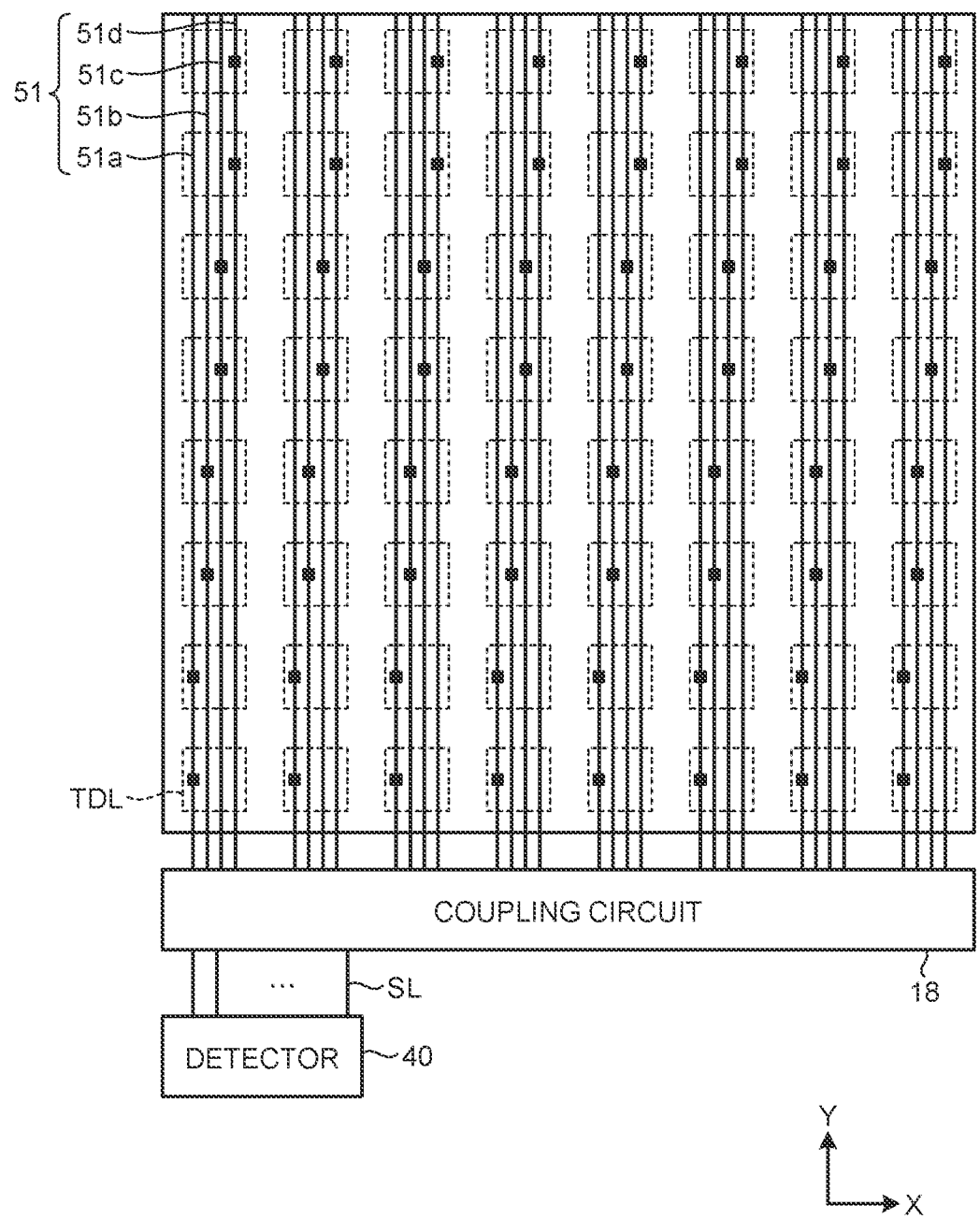
FIG. 22 is a diagram illustrating an example of coupling of the touch detection electrodes to wiring.
Figure 23:
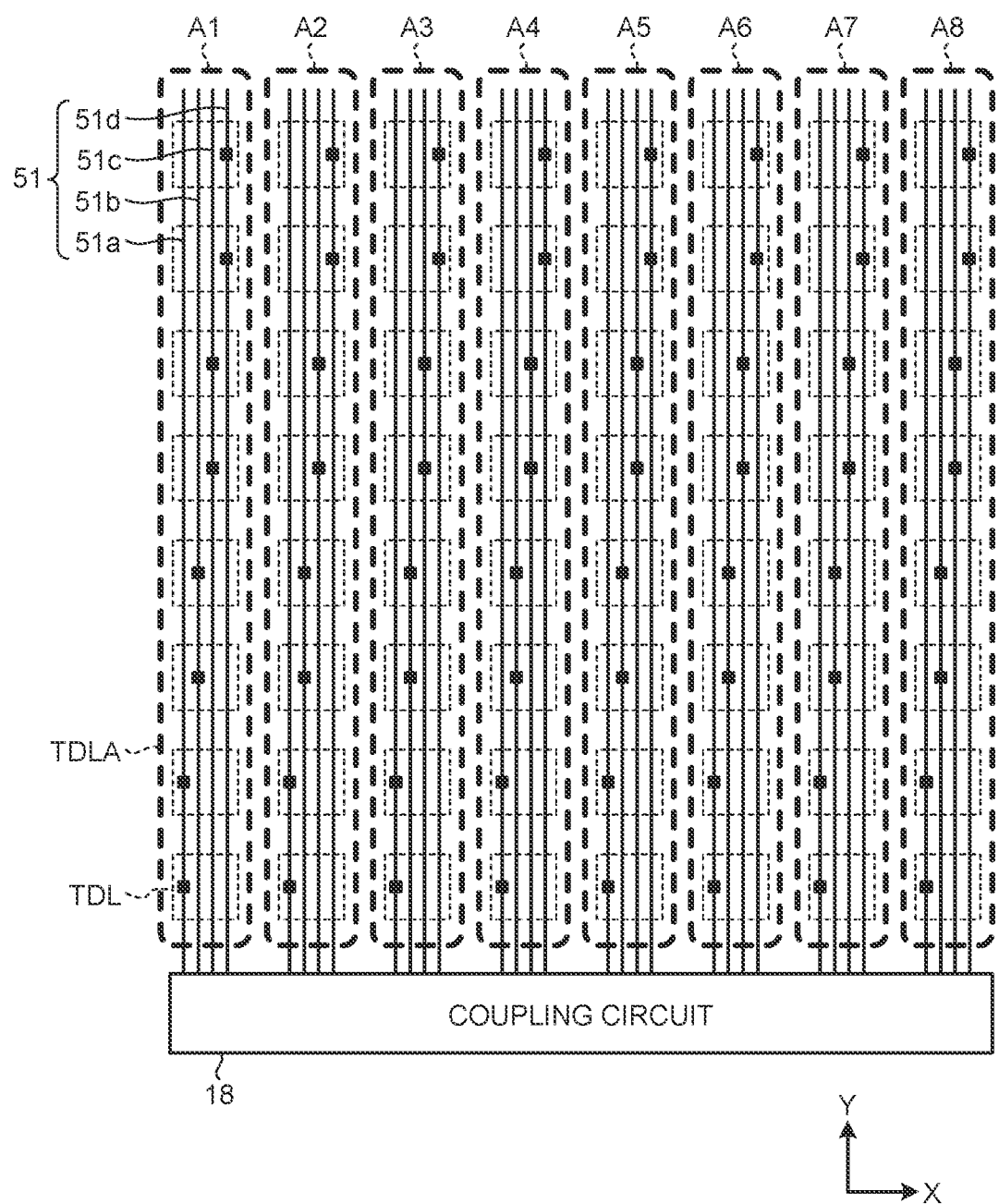
FIG. 23 is a diagram illustrating a configuration example of linear touch detection electrode blocks.
Figure 24:
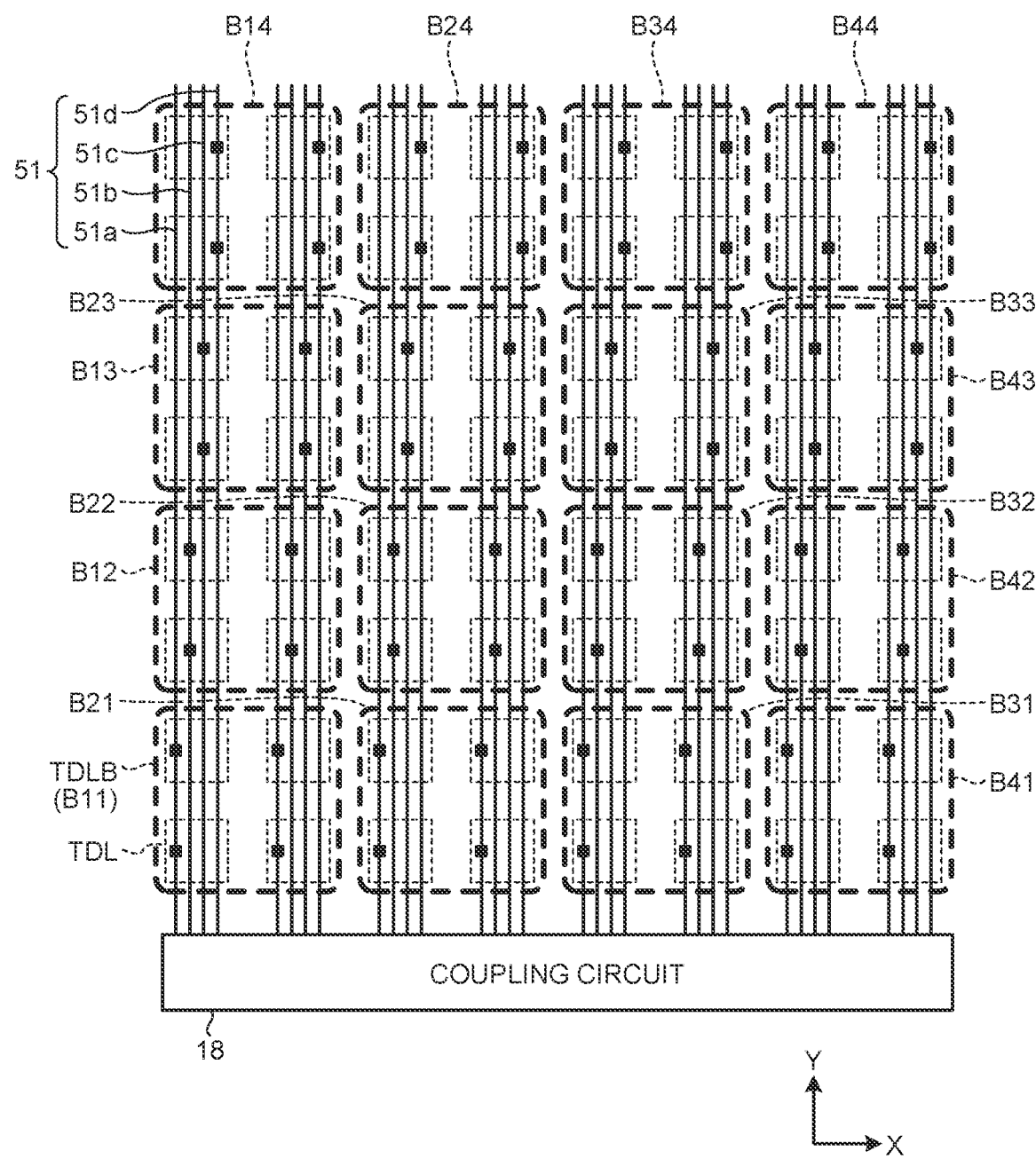
FIG. 24 is a diagram illustrating a configuration example of square touch detection electrode blocks.

FIG. 22 is a diagram illustrating an example of the coupling of the touch detection electrodes to the wiring. FIG. 23 is a diagram illustrating a configuration example of the touch detection electrode blocks each having a linear shape. FIG. 24 is a diagram illustrating a configuration example of the touch detection electrode blocks each having a square shape. As illustrated in FIG. 22, the touch detection electrodes TDL are arranged side by side in the row direction (X-direction) and the column direction (Y-direction) to form a plurality of rows and a plurality of columns. FIG. 22 illustrates a case where the touch detection electrodes TDL are arranged so as to form eight rows and eight columns.

Each of a plurality of wires of the wiring 51 is coupled to the touch detection electrodes TDL arranged side by side in the row direction (X-direction). For example, each of the wires of the wiring 51 includes four wires 51a to 51d extending in the column direction (Y-direction). Specifically, in the touch detection electrodes TDL in the leftmost column in FIG. 22, when viewed from the coupling circuit 18, the first and second touch detection electrodes TDL are coupled to the wire 51a; the third and fourth touch detection electrodes TDL are coupled to the wire 51b; the fifth and sixth touch detection electrodes TDL are coupled to the wire 51c; and the seventh and eighth touch detection electrodes TDL are coupled to the wire 51d. Also in the touch detection electrodes TDL on the right side of the leftmost column in FIG. 22, the wires 51a to 51d are coupled to the touch detection electrodes TDL in the same way as to the touch detection electrodes TDL in the leftmost column in FIG. 22.

As illustrated in FIG. 22, each of the wires of the wiring 51 is coupled to the coupling circuit 18. The coupling circuit 18 includes a multiplexer having, for example, 16 or more channels capable of receiving and outputting signals. The coupling circuit 18 is coupled to the detector 40 through a plurality of detection data lines SL. The coupling circuit 18 is provided in the frame region 10b of the counter substrate 31 (refer to FIG. 14). The coupling circuit 18 may alternatively be built into the detection IC 49 (refer to FIG. 13).

The coupling circuit 18 switches the coupling between the touch detection electrodes TDL and the wiring 51 based on a control signal received from the controller 11. Through this switching, the coupling circuit 18 can couple the touch detection electrodes TDL together in the column direction (Y-direction) to form the touch detection electrode blocks TDLA as illustrated in FIG. 23, or couple the touch detection electrodes TDL together in the row direction (X-direction) and the column direction (Y-direction) to form the touch detection electrode blocks TDLB as illustrated in FIG. 24. In FIG. 24, the touch detection electrodes TDL are coupled together in both the row direction and the column direction to form the touch detection electrode blocks TDLB. The present disclosure is, however, not limited to this configuration. For example, the touch detection electrodes TDL may be coupled together in the column direction to form the touch detection electrode blocks TDLB. The touch detection electrodes TDL may be coupled together in the row direction when forming the touch detection electrode blocks TDLA, and may be coupled together in the column direction when forming the touch detection electrode blocks TDLB.

Figure 25:
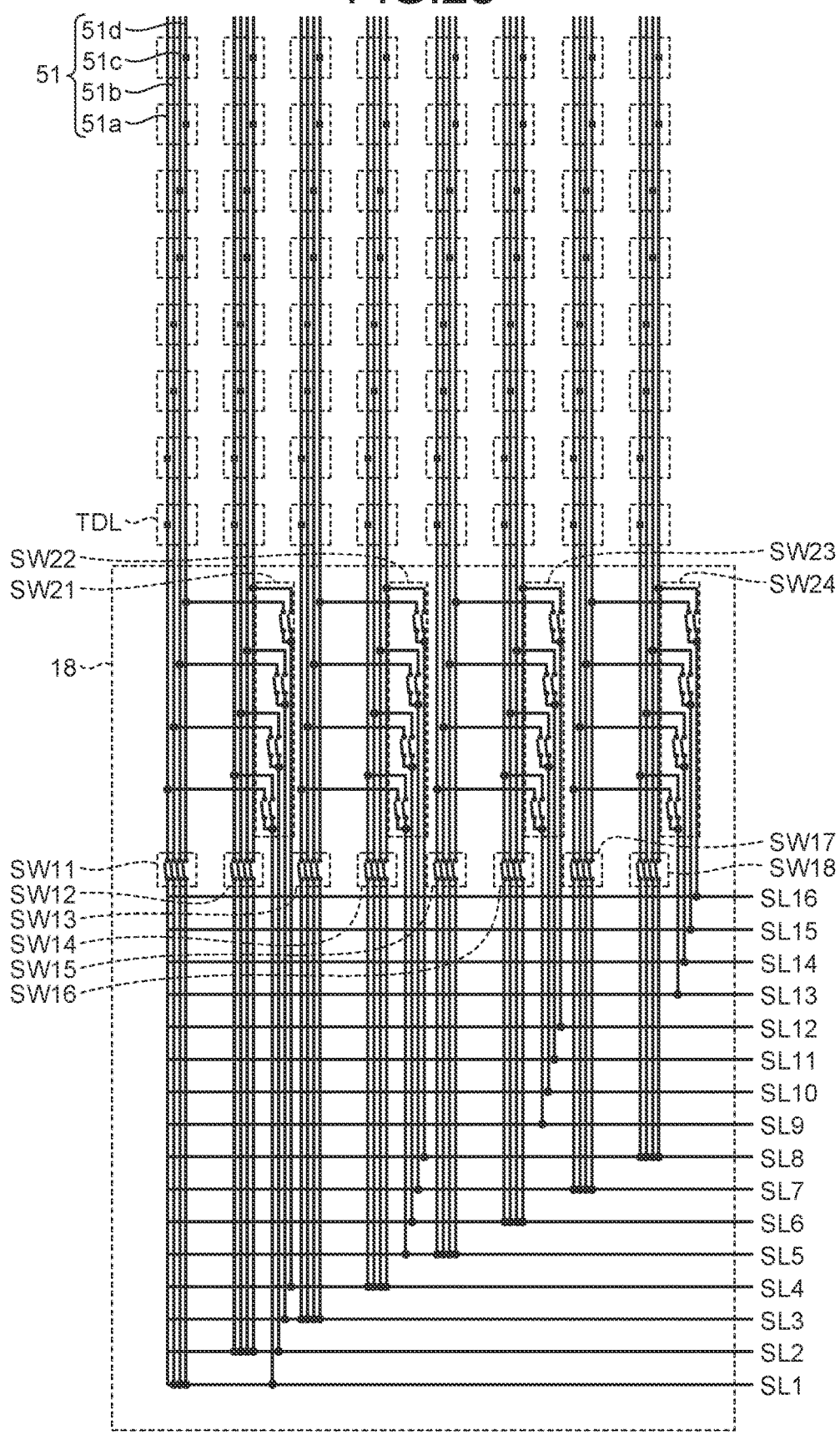
FIG. 25 is a diagram illustrating a configuration example of a coupling circuit according to the first embodiment.

FIG. 25 is a diagram illustrating a configuration example of the coupling circuit according to the first embodiment. As illustrated in FIG. 25, the coupling circuit 18 includes a plurality of switching elements SW11 to SW18 and SW21 to SW24. Each of the switching elements SW11 to SW18 and SW21 to SW24 is coupled to the wires of the wiring 51, and couples or uncouples the wires of the wiring 51 on one side to or from the wires of the wiring 51 on the other side. The switching elements SW11 to SW18 and SW21 to SW24 can switch the coupling among the touch detection electrodes TDL to either a coupled state or an uncoupled state.

When the switching elements SW11 to SW18 are on and the switching elements SW21 to SW24 are off, the touch detection electrodes TDL are coupled to one another in the row direction (X-direction) to form the touch detection electrode blocks TDLA (refer to FIG. 23). For example, adjacent eight of the touch detection electrodes TDL are coupled together in the row direction (X-direction) to form one of the touch detection electrode blocks TDLA.

FIG. 23 illustrates a case as an example of the present embodiment where eight of the touch detection electrode blocks TDLA (A1 to A8) are formed from 64 of the touch detection electrodes TDL arranged side by side at even intervals in the row direction (X-direction) and the column direction (Y-direction). The eight touch detection electrode blocks TDLA are arranged side by side at even intervals in the row direction (X-direction). The eight touch detection electrode blocks TDLA are coupled to detection data lines SL1 to SL8 through the switching elements SW11 to SW18, respectively.

When the switching elements SW11 to SW18 are off and the switching elements SW21 to SW24 are on, the touch detection electrodes TDL are coupled to one another in the row direction (X-direction) and the column direction (Y-direction) to form the touch detection electrode blocks TDLB (refer to FIG. 24). For example, the touch detection electrodes TDL adjacent to each other in the row direction (X-direction) and the column direction (Y-direction) are coupled to each other to form one of the touch detection electrode blocks TDLB from four of the touch detection electrodes TDL.

FIG. 24 illustrates a case as an example of the present embodiment where 16 of the touch detection electrode blocks TDLB (B11 to B14, B21 to B24, B31 to B34, and B41 to B44) are formed from the 64 touch detection electrodes TDL. The shape of each of the touch detection electrode blocks TDLB is substantially square in plan view. The 16 touch detection electrode blocks TDLB are arranged side by side at even intervals in the row direction (X-direction) and the column direction (Y-direction). The 16 touch detection electrode blocks TDLB are coupled to respective detection data lines SL1 to SL16 through the switching elements SW21 to SW24.

In the present embodiment, each of the touch detection electrode blocks TDLA (A1 to A8) illustrated in FIG. 23 is used as the detection electrode (the detection electrode E2 illustrated in FIG. 3) to perform the touch detection using the basic principle of the mutual-capacitance method. In the present embodiment, each of the touch detection electrode blocks TDLB (B11 to B14, B21 to B24, B31 to B34, and B41 to B44) illustrated in FIG. 24 is used as the detection electrode (the detection electrode E1 illustrated in FIGS. 8 to 10) to perform the hover detection using the basic principle of the self-capacitance method.

In the examples illustrated in FIGS. 23 to 25, the example has been described where one of the touch detection electrode blocks TDLB having a substantially square shape is formed from four of the touch detection electrodes TDL when the hover detection using the basic principle of the self-capacitance method is performed and when the correction value detection using the basic principle of the mutual-capacitance method is performed. However, the number and the shape in the plan view of the touch detection electrodes TDL forming the touch detection electrode block TDLB are not limited to this example. For example, the present disclosure may have an aspect in which one of the touch detection electrode blocks TDLB having the substantially square shape is formed from nine of the touch detection electrodes TDL, or in which the shape of the touch detection electrode block TDLB is substantially rectangular in the plan view. The present disclosure is not limited by the number or the shape in the plan view of the touch detection electrodes TDL forming the touch detection electrode block TDLB.

Figure 26:
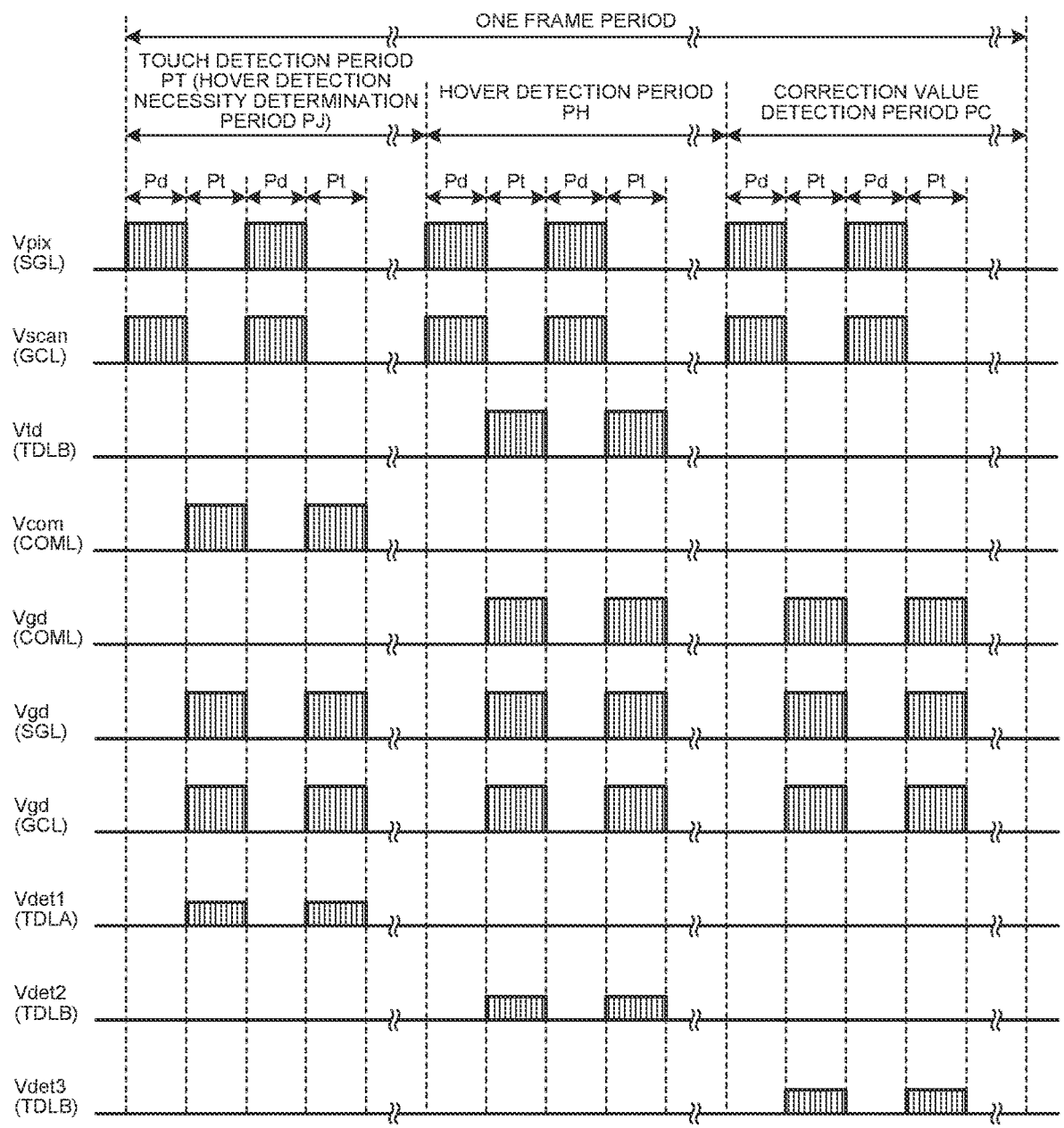
FIG. 26 is a timing waveform diagram illustrating a first example of a basic operation of the display device according to the first embodiment.
Figure 27:
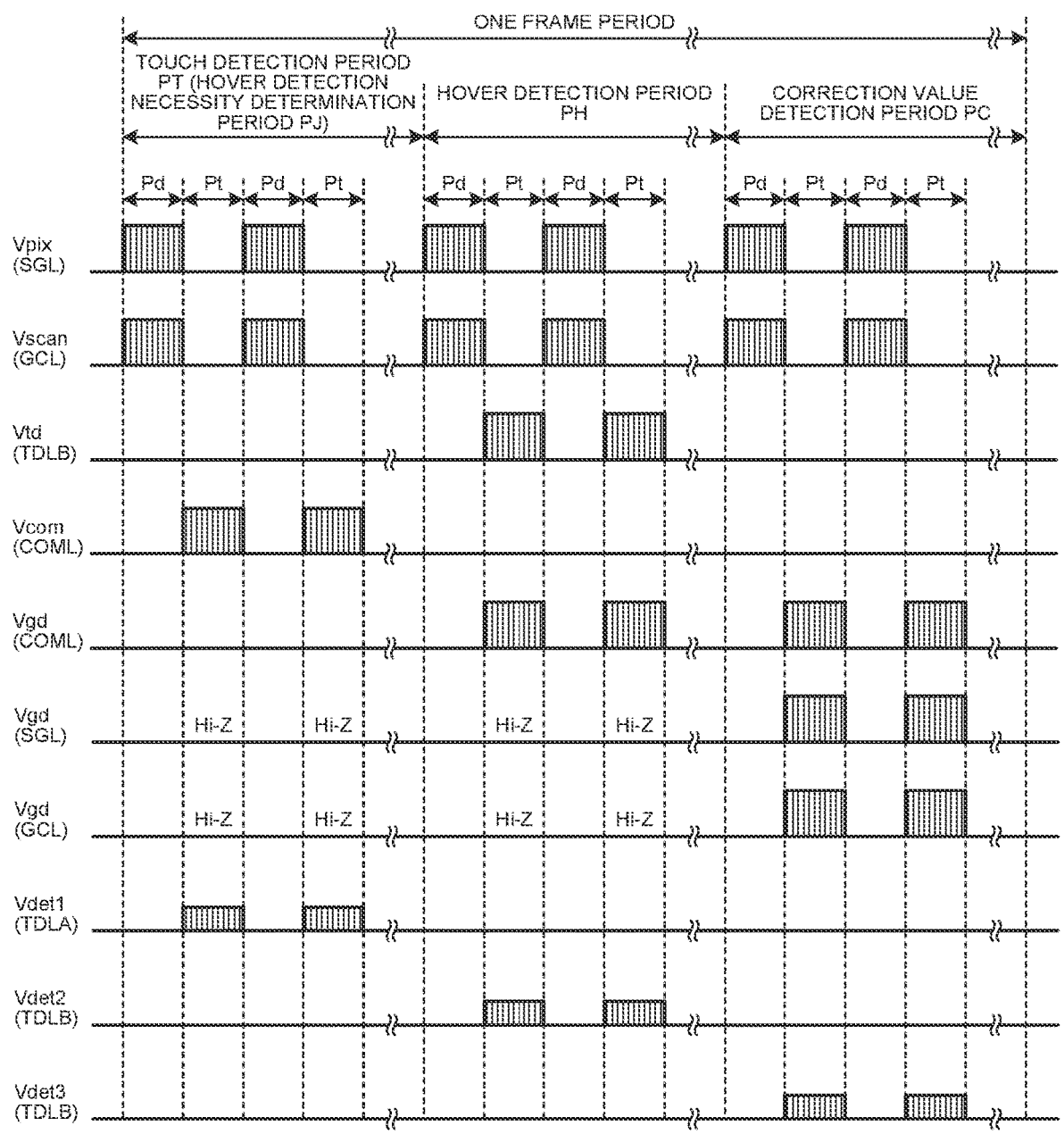
FIG. 27 is a timing waveform diagram illustrating a second example of the basic operation of the display device according to the first embodiment.

FIG. 26 is a timing waveform diagram illustrating a first example of a basic operation of the display device according to the first embodiment. FIG. 27 is a timing waveform diagram illustrating a second example of the basic operation of the display device according to the first embodiment. In the examples illustrated in FIGS. 26 and 27, each of the touch detection electrode blocks TDLB (B11 to B14, B21 to B24, B31 to B34, and B41 to B44) illustrated in FIG. 24 is used as the detection electrode (the detection electrode E2 illustrated in FIG. 5) to perform the correction value detection using the basic principle of the mutual-capacitance method.

In the present embodiment, as illustrated in FIGS. 26 and 27, the one frame period basically includes a touch detection period PT to perform the touch detection operation using the mutual-capacitance method, a hover detection period PH to perform the hover detection operation using the self-capacitance method, and a correction value detection period PC to perform the correction value detection operation to detect the correction value for correcting the detection value during the hover detection. The display operation period Pd and the detection operation period Pt are alternately arranged in each of the touch detection period PT, the hover detection period PH, and the correction value detection period PC.

In each of the display operation periods Pd, the drive signal Vcomdc for display serving as the common electrode potential for display is supplied from the drive electrode driver 14 to the drive electrodes COML. This operation fixes the potential of the drive electrodes COML to the drive signal Vcomdc for display. In this state, control signals are sequentially output from the gate driver 12 to gate lines GCL1, GCL2, GCL3, . . . , and the pixel signals Vpix are sequentially output from the source driver 13 to data lines SGL1, SGL2, SGL3, . . . . In this way, the pixel signals Vpix are sequentially supplied to the pixels Pix in the rows selected in the display operation period Pd (refer to FIG. 15) to write display data.

In each of the detection operation periods Pt of the touch detection period PT, the switching elements SW11 to SW18 of the coupling circuit 18 (refer to FIG. 25) are controlled to be on, and the switching elements SW21 to SW24 thereof are controlled to be off. As a result, the touch detection electrodes TDL form the touch detection electrode blocks TDLA (A1 to A8), as illustrated in FIG. 23. In this state, the drive signal Vcom for touch detection is supplied from the drive electrode driver 14 to the drive electrodes COML selected in each of the detection operation periods Pt. As illustrated in FIG. 26, the guard signal Vgd, that has the same waveform as that of the drive signal Vcom for touch detection and is synchronized with the drive signal Vcom, is supplied from the gate driver 12 to the gate lines GCL. As illustrated in FIG. 26, the guard signal Vgd, that has the same waveform as that of the drive signal Vcom for touch detection and is synchronized with the drive signal Vcom, is supplied from the source driver 13 to the source lines SGL. As a result, the detection signal Vdet1 is sequentially output from each of the touch detection electrode blocks TDLA. The first example illustrated in FIG. 26 represents an example of supplying the guard signal Vgd to the gate lines GCL and the source lines SGL in each of the detection operation periods Pt of the touch detection period PT. The present disclosure may, however, have an aspect in which the gate lines GCL and the source lines SGL are set to a high-impedance (Hi-Z) state, as illustrated in FIG. 27.

The detector 40 acquires the detection signal Vdet1 output from each of the touch detection electrode blocks TDLA through a corresponding one of the detection data lines SL1 to SL8. The detector 40 performs arithmetic processing based on the acquired detection signal Vdet1, and determines, from the result of the arithmetic processing, whether the detection target object is in the contact state, or in the non-contact state or the non-present state.

In each of the detection operation periods Pt of the hover detection period PH, the switching elements SW11 to SW18 of the coupling circuit 18 (refer to FIG. 25) are controlled to be off, and the switching elements SW21 to SW24 thereof are controlled to be on. As a result, the touch detection electrodes TDL form the touch detection electrode blocks TDLB (B11 to B14, B21 to B24, B31 to B34, and B41 to B44), as illustrated in FIG. 24. In this state, the drive signal Vtd for hover detection is supplied from the touch detection electrode driver 41 of the detector 40 to each of the touch detection electrode blocks TDLB through a corresponding one of the detection data lines SL1 to SL16 of the coupling circuit 18. For example, the touch detection electrode driver 41 supplies the drive signals Vtd for hover detection so as to have the same waveform and to be synchronized with one another to the detection data lines SL1 to SL16. The guard signal Vgd, that has the same waveform as that of the drive signal Vtd for hover detection and is synchronized with the drive signal Vtd, is supplied from the drive electrode driver 14 to the drive electrodes COML. As illustrated in FIG. 26, the guard signal Vgd, that has the same waveform as that of the drive signal Vtd for hover detection and is synchronized with the drive signal Vtd, is supplied from the gate driver 12 to the gate lines GCL. As illustrated in FIG. 26, the guard signal Vgd, that has the same waveform as that of the drive signal Vtd for hover detection and is synchronized with the drive signal Vtd, is supplied from the source driver 13 to the source lines SGL. As a result, the detection signal Vdet2 is simultaneously output from each of the touch detection electrode blocks TDLB. The first example illustrated in FIG. 26 represents an example of supplying the guard signal Vgd to the gate lines GCL and the source lines SGL in each of the detection operation periods Pt of the hover detection period PH. The present disclosure may, however, have the aspect in which the gate lines GCL and the source lines SGL are set to the high-impedance (Hi-Z) state, as illustrated in FIG. 27.

The drive signal Vtd for hover detection in each of the detection operation periods Pt of the hover detection period PH may be a signal that has the same waveform as that of the drive signal Vcom for touch detection in each of the detection operation periods Pt of the touch detection period PT and is synchronized with the drive signal Vcom. In this case, the guard signal Vgd in each of the detection operation periods Pt of the hover detection period PH is substantially the same signal as the guard signal Vgd in each of the detection operation periods Pt of the touch detection period PT.

The detector 40 acquires the detection signal Vdet2 output from each of the touch detection electrode blocks TDLB through a corresponding one of the detection data lines SL1 to SL16. The detector 40 performs arithmetic processing based on the acquired detection signal Vdet2, and determines, from the result of the arithmetic processing, whether the detection target object is in the non-contact state or the non-present state.

In each of the detection operation periods Pt of the correction value detection period PC, the switching elements SW11 to SW18 of the coupling circuit 18 (refer to FIG. 25) are controlled to be off, and the switching elements SW21 to SW24 thereof are controlled to be on. As a result, the touch detection electrodes TDL form the touch detection electrode blocks TDLB (B11 to B14, B21 to B24, B31 to B34, and B41 to B44), as illustrated in FIG. 24. In this state, the guard signal Vgd is supplied from the drive electrode driver 14 to the drive electrodes COML. As illustrated in FIG. 26, the guard signal Vgd is supplied from the gate driver 12 to the gate lines GCL, and the guard signal Vgd is supplied from the source driver 13 to the source lines SGL. As a result, the detection signal Vdet3 is simultaneously output from each of the touch detection electrode blocks TDLB.

The guard signal Vgd in each of the detection operation periods Pt of the correction value detection period PC is substantially the same signal as the guard signal Vgd in each of the detection operation periods Pt of the hover detection period PH.

The detector 40 acquires the detection signal Vdet3 output from each of the touch detection electrode blocks TDLB through a corresponding one of the detection data lines SL1 to SL16. The detector 40 performs arithmetic processing based on the acquired detection signal Vdet3 to obtain the correction value for correcting the detection value during the hover detection.

Figure 28:
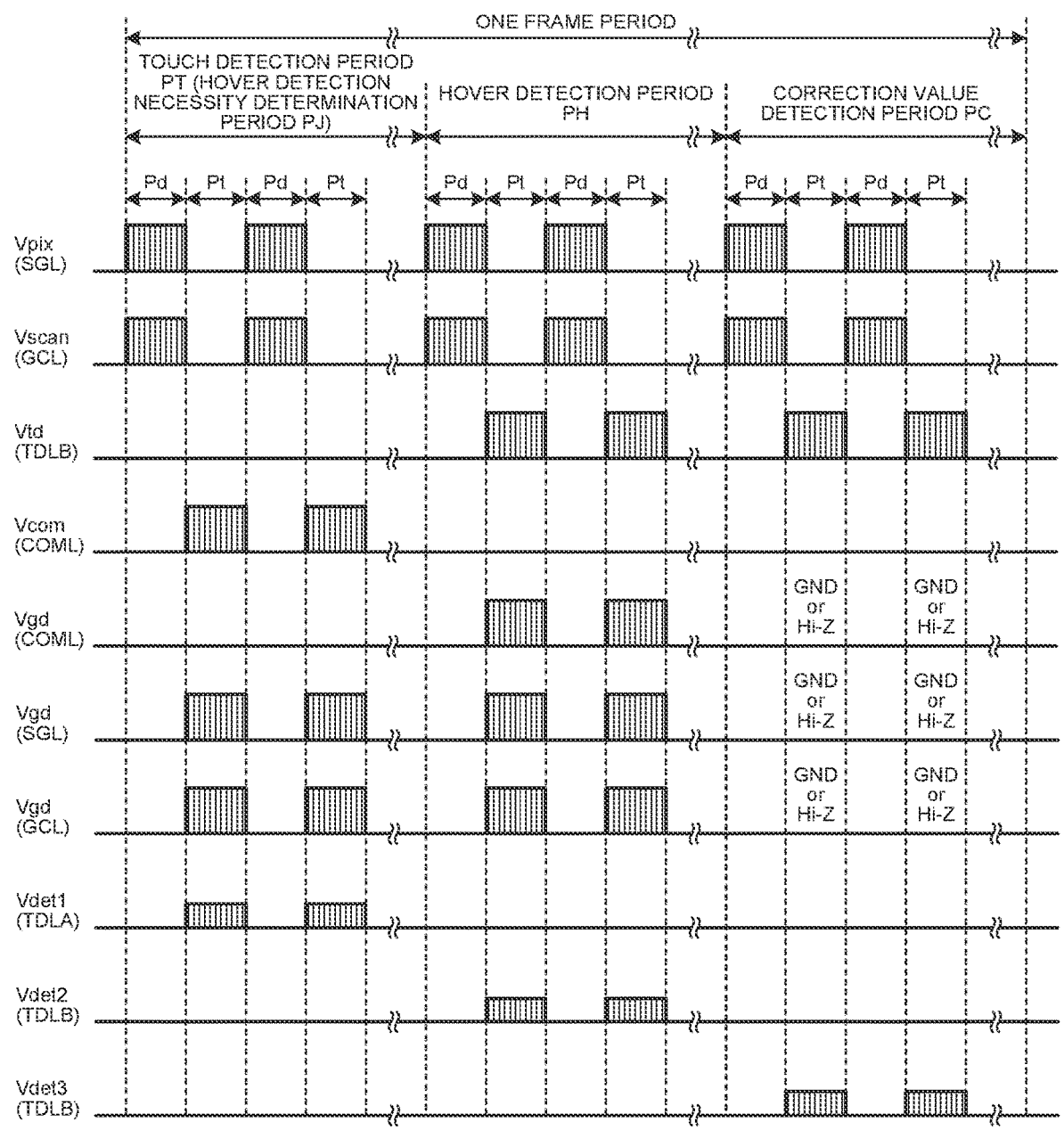
FIG. 28 is a timing waveform diagram illustrating a third example of the basic operation of the display device according to the first embodiment.
Figure 29:
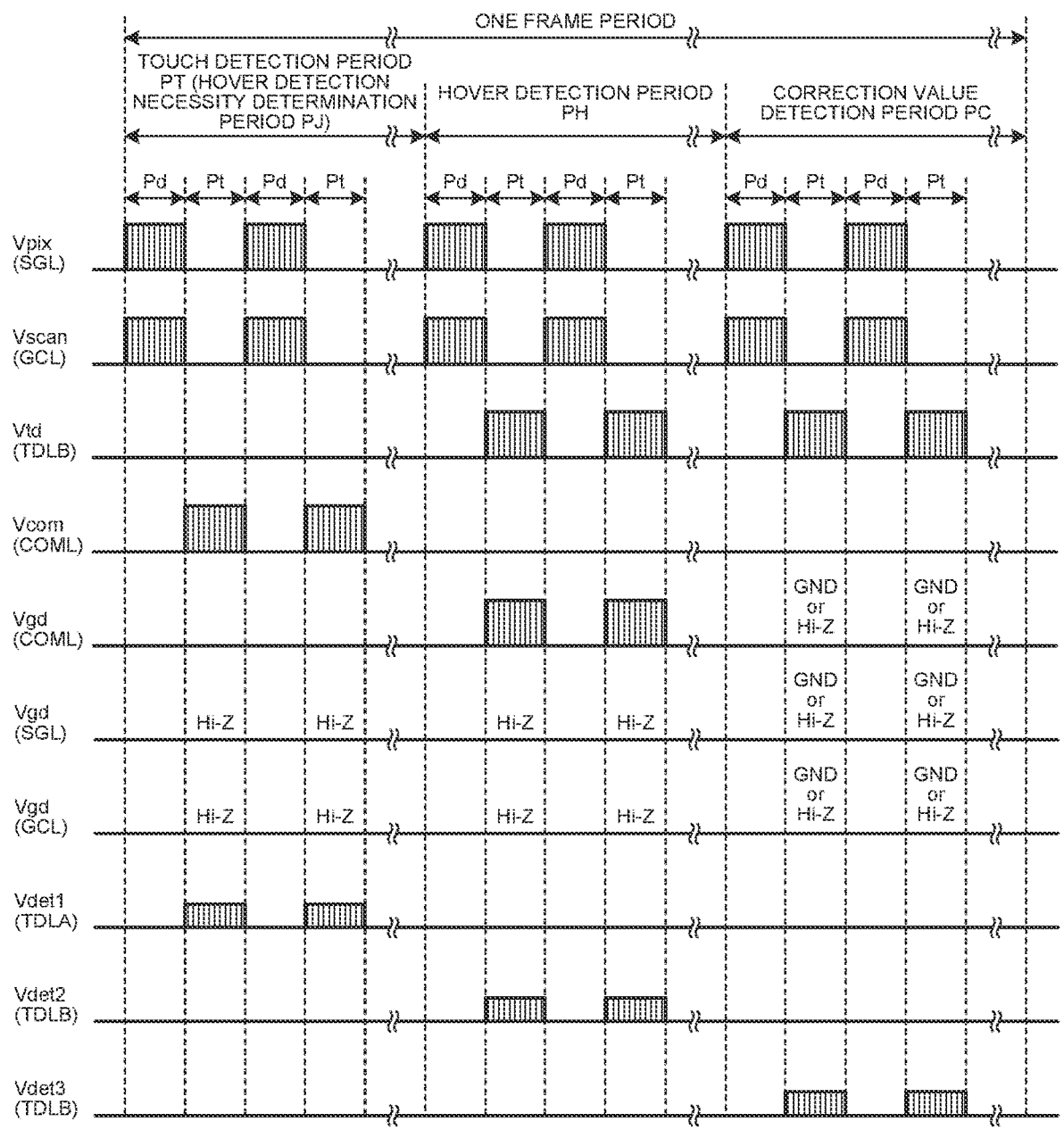
FIG. 29 is a timing waveform diagram illustrating a fourth example of the basic operation of the display device according to the first embodiment.

FIG. 28 is a timing waveform diagram illustrating a third example of the basic operation of the display device according to the first embodiment. FIG. 29 is a timing waveform diagram illustrating a fourth example of the basic operation of the display device according to the first embodiment. In the examples illustrated in FIGS. 28 and 29, each of the touch detection electrode blocks TDLB (B11 to B14, B21 to B24, B31 to B34, and B41 to B44) illustrated in FIG. 24 is used as the detection electrode (the detection electrode E1 illustrated in FIGS. 8 to 10) to perform the correction value detection using the basic principle of the self-capacitance method.

In the examples illustrated in FIGS. 28 and 29, in each of the detection operation periods Pt of the correction value detection period PC, the switching elements SW11 to SW18 of the coupling circuit 18 (refer to FIG. 25) are controlled to be off, and the switching elements SW21 to SW24 thereof are controlled to be on. As a result, the touch detection electrodes TDL form the touch detection electrode blocks TDLB (B11 to B14, B21 to B24, B31 to B34, and B41 to B44), as illustrated in FIG. 24. In this state, the drive signal Vtd for correction value detection is supplied from the touch detection electrode driver 41 of the detector 40 to each of the touch detection electrode blocks TDLB through a corresponding one of the detection data lines SL1 to SL16 of the coupling circuit 18. For example, the touch detection electrode driver 41 supplies the drive signals Vtd for correction value detection so as to have the same waveform and to be synchronized with one another to the detection data lines SL1 to SL16. As a result, the detection signal Vdet3 is simultaneously output from each of the touch detection electrode blocks TDLB. In the examples illustrated in FIGS. 28 and 29, at least either one of each of the drive electrodes COML and each of the source lines SGL and the gate line GCL is set to the fixed potential (GND). The other one that is not set to the fixed potential (GND) is set to the high-impedance (Hi-Z) state.

In the examples illustrated in FIGS. 28 and 29, the guard signal Vgd in each of the detection operation periods Pt of the correction value detection period PC is substantially the same signal as the guard signal Vgd in each of the detection operation periods Pt of the hover detection period PH.

The detector 40 acquires the detection signal Vdet3 output from each of the touch detection electrode blocks TDLB through a corresponding one of the detection data lines SL1 to SL16. The detector 40 performs the arithmetic processing based on the acquired detection signal Vdet3 to obtain the correction value for correcting the detection value during the hover detection.

If the detection target object is detected to be in the contact state in the touch detection operation, the detection target object need not be determined whether being in the non-contact state or the non-present state in the hover detection. For this reason, in the present embodiment, the entire period of the touch detection period PT or a certain period in the touch detection period PT (the entire period of the touch detection period PT in the examples illustrated in FIGS. 26 to 29) is used as a hover detection necessity determination period PJ for determining whether the detection target object needs to be determined whether being in the non-contact state or the non-present state in the hover detection.

Figure 30:
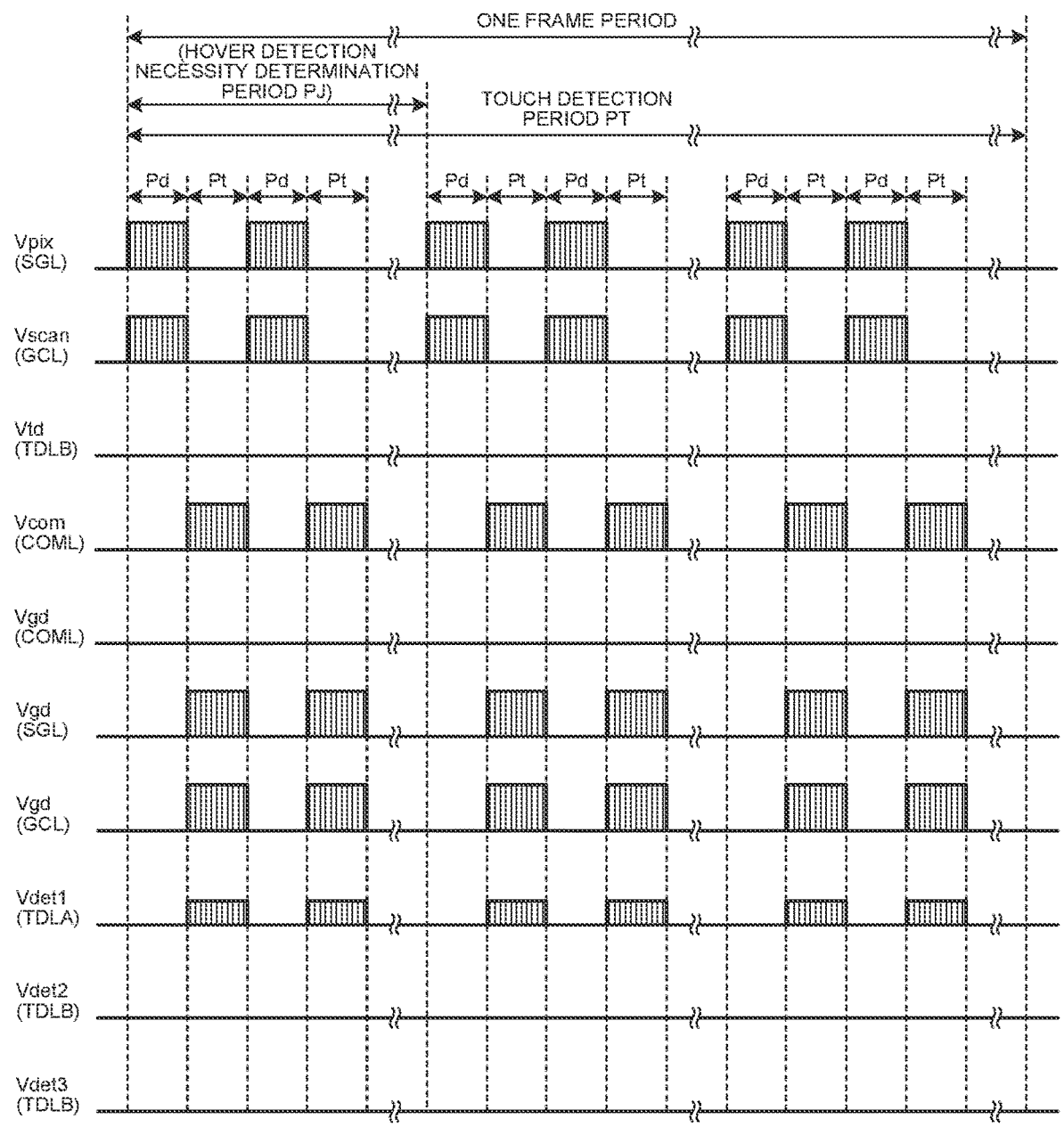
FIG. 30 is a timing waveform diagram illustrating an operation example in each of the first example illustrated in FIG. 26 and the third example illustrated in FIG. 28 when a detection target object is detected to be in a contact state in a hover detection necessity determination period of the display device according to the first embodiment.
Figure 31:
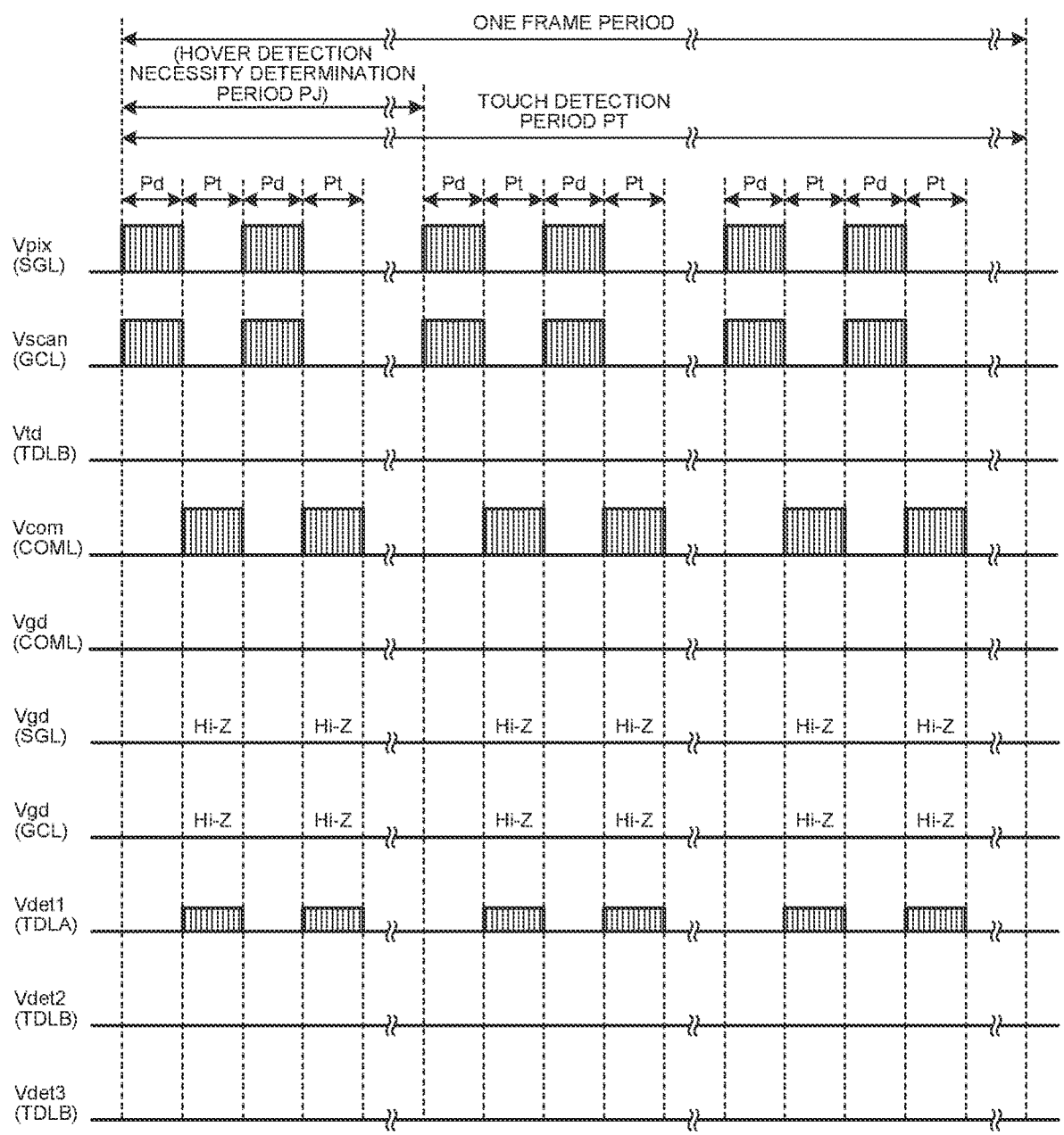
FIG. 31 is a timing waveform diagram illustrating an operation example in each of the second example illustrated in FIG. 27 and the fourth example illustrated in FIG. 29 when the detection target object is detected to be in the contact state in the hover detection necessity determination period of the display device according to the first embodiment.

FIG. 30 is a timing waveform diagram illustrating an operation example in each of the first example illustrated in FIG. 26 and the third example illustrated in FIG. 28 when the detection target object is detected to be in the contact state in the hover detection necessity determination period of the display device according to the first embodiment. FIG. 31 is a timing waveform diagram illustrating an operation example in each of the second example illustrated in FIG. 27 and the fourth example illustrated in FIG. 29 when the detection target object is detected to be in the contact state in the hover detection necessity determination period of the display device according to the first embodiment. As illustrated in FIGS. 30 and 31, if the detection target object is detected to be in the contact state in the hover detection necessity determination period PJ, the entire period of the one frame period is used as the touch detection period PT without providing the hover detection period PH and the correction value detection period PC.

If the detection target object is not detected to be in the contact state in the hover detection necessity determination period PJ, the hover detection period PH and the correction value detection period PC are provided, as illustrated in FIGS. 26 to 29.

Figure 32:
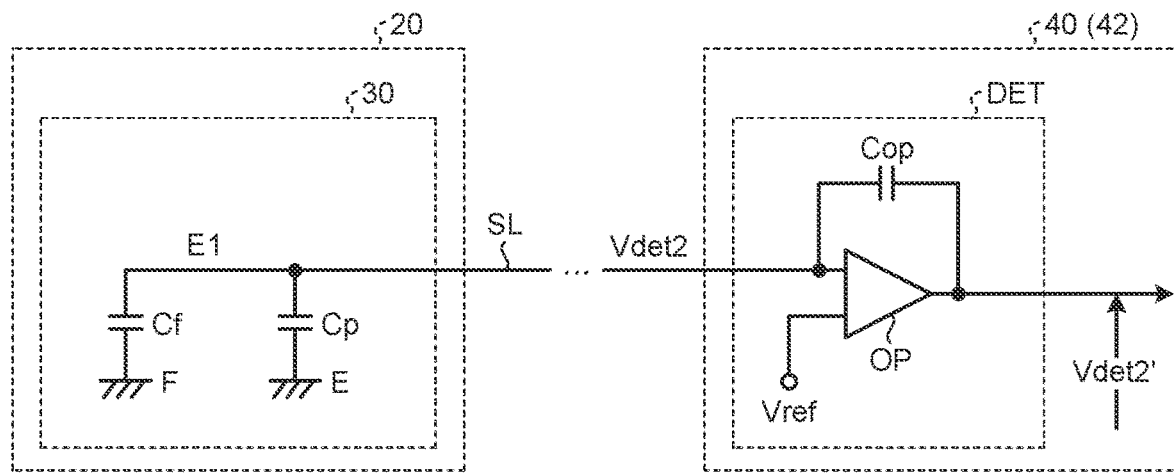
FIG. 32 is a diagram illustrating an equivalent circuit of a detection circuit when hover detection is performed.
Figure 33:
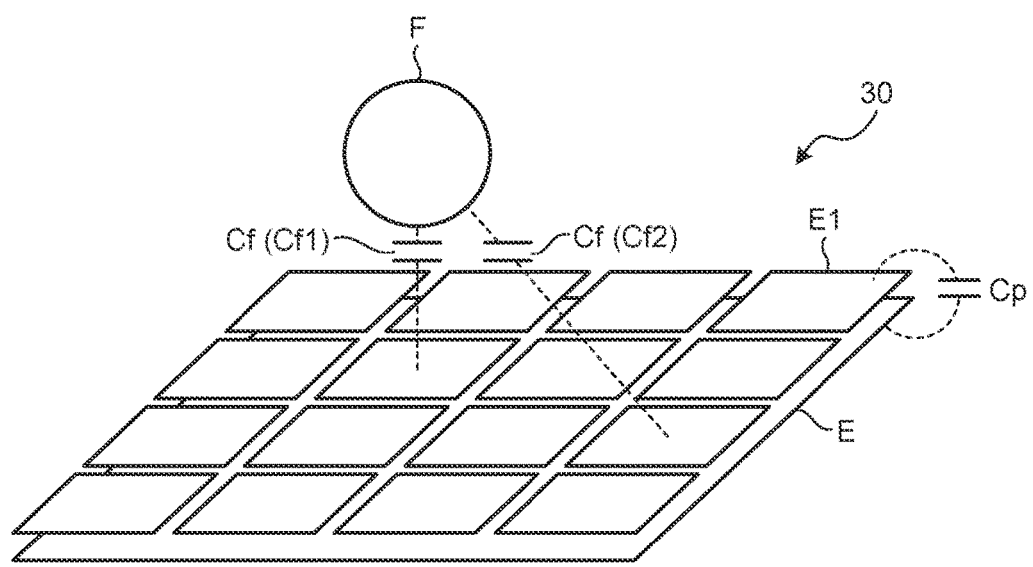
FIG. 33 is a diagram illustrating a positional relation between a touch sensor and the detection target object when the hover detection is performed.

The following describes the concept of the hover detection according to the present embodiment. FIG. 32 is a diagram illustrating an equivalent circuit of the detection circuit when the hover detection is performed. FIG. 33 is a diagram illustrating a positional relation between the touch sensor and the detection target object when the hover detection is performed.

In FIGS. 32 and 33, E1 denotes the detection electrode during the hover detection and the correction value detection; E denotes the peripheral conductor facing or close to the detection electrode E1; F denotes the detection target object such as a finger; Cp denotes the capacitance value between the detection electrode E1 and the peripheral conductor E; Cf denotes a capacitance value between the detection electrode E1 and the detection target object F; OP denotes an operational amplifier OP included in the voltage detector DET; and Cop denotes a capacitance value provided between input and output ends of the operational amplifier OP.

As illustrated in FIG. 32, the detector 40 (detection signal amplifier 42) includes the voltage detector DET illustrated in FIGS. 4, 6, and 10. The detector 40 (detection signal amplifier 42) includes a plurality of the voltage detectors DET corresponding to a plurality of the detection electrodes E1 provided in the touch sensor 30.

In the present embodiment, the touch detection electrode block TDLB exemplifies the detection electrode E1, and the drive electrode COML exemplifies the peripheral conductor E. As illustrated in FIG. 33, the distance between the detection electrode E1 and the detection target object F is much larger than the distance between the detection electrode E1 and the peripheral conductor E when the hover detection is performed. Therefore, when the hover detection is performed, the capacitance value Cf between the detection electrode E1 and the detection target object F is much smaller than the capacitance value Cp between the detection electrode E1 and the peripheral conductor E (Cf<<Cp). Accordingly, the difference between the output (Vdet2') of the voltage detector DET in the non-contact state and the output (Vdet2') of the voltage detector DET in the non-present state is relatively small, so that the non-contact state is difficult to be detected.

Thus, in the present embodiment, during the hover detection, a first drive signal (corresponding to the drive signal Vtd) is supplied from a first drive circuit (corresponding to the touch detection electrode driver 41) to the detection electrode E1 (corresponding to the touch detection electrode block TDLB), and a second drive signal (corresponding to the guard signal Vgd), that has the same waveform as that of the first drive signal and is synchronized with the first drive signal, is supplied from a second drive circuit (corresponding to the drive electrode driver 14) to the peripheral conductor E (corresponding to the drive electrode COML). In this case, the output (Vdet2') of the voltage detector DET is represented by Expression (1) below, where Vo denotes a wave height value of the first drive signal supplied to the detection electrode E1 and the second drive signal supplied to the peripheral conductor E.

$$Vdet2' = Cf \times Vo/Cop \tag{1}$$

As a result, the output (Vdet2') of the voltage detector DET in the non-present state is reduced to substantially zero, and the non-contact state can be easily detected.

The operational amplifier OP included in the voltage detector DET has a temperature characteristic that the output characteristic changes with temperature. That is, the output (Vdet2') of the voltage detector DET changes with temperature.

As described above, in the hover detection, the capacitance value Cf between the detection electrode E1 and the detection target object F is smaller, and is therefore more easily affected by the temperature characteristic of the operational amplifier OP. As a result, the detection accuracy is lower in the non-contact state, and the hover detection may not be accurately executable.

Accordingly, in the present embodiment, the detection value in the hover detection is corrected to increase the detection accuracy in the non-contact state (that is, the hover detection accuracy).

As illustrated in FIG. 33, a capacitance value Cf1 between the detection electrode E1 located in a position closer to the detection target object F and the detection target object F is larger than a capacitance value Cf2 between the detection electrode E1 located in a position farther from the detection target object F and the detection target object F. The voltage detector DET is provided for each of the detection electrodes E1, and the current value flowing through the operational amplifier OP changes with the level of the capacitance value Cf between the detection electrode E1 and the detection target object F. That is, the temperature of the operational amplifier OP included in the voltage detector DET corresponding to the detection electrode E1 located in the position closer to the detection target object F may differ from the temperature of the operational amplifier OP included in the voltage detector DET corresponding to the detection electrode E1 located in the position farther from the detection target object F. Therefore, the detection value in the hover detection needs to be corrected for each of the voltage detectors DET.

Figure 34:
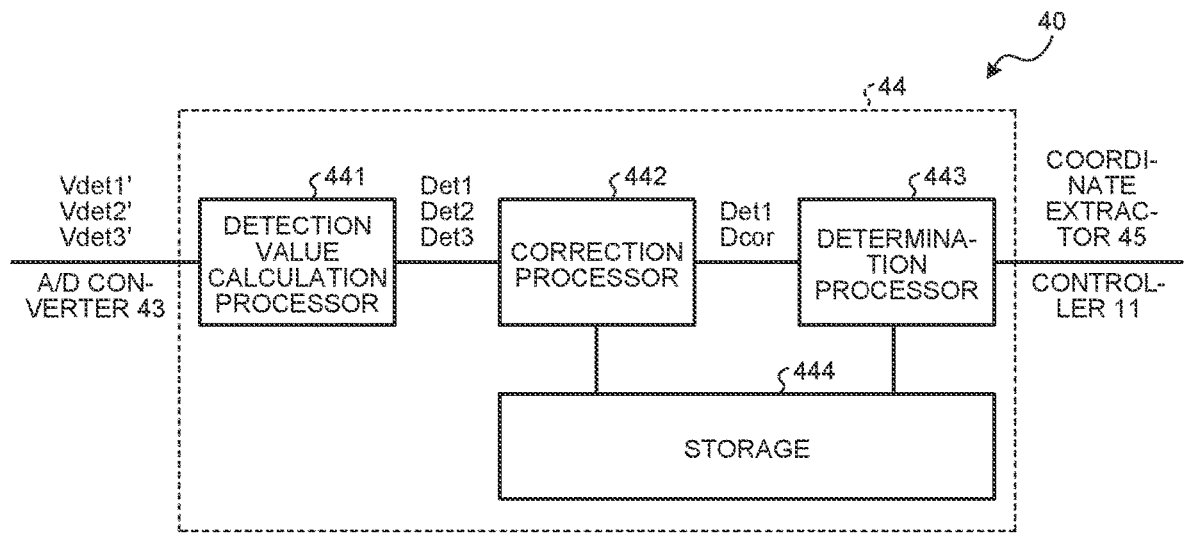
FIG. 34 is a diagram illustrating an example of an internal block configuration of a signal processor.

FIG. 34 is a diagram illustrating an example of an internal block configuration of the signal processor. As illustrated in FIG. 34, the signal processor 44 of the detector 40 includes a detection value calculation processor 441, a correction processor 442, a determination processor 443, and a storage 444 as internal blocks.

The detection value calculation processor 441 receives the detection signals Vdet1', Vdet2', and Vdet3' that has been output from the voltage detector DET of the detection signal amplifier 42 and converted into the digital signals by the A/D converter 43. The detection value calculation processor 441 performs the predetermined detection value calculation processing such as the mean value processing or the maximum value processing within the predetermined period on the detection signals Vdet1', Vdet2', and Vdet3', and outputs detection values Det1, Det2, and Det3 to the correction processor 442.

In the correction value detection, the correction processor 442 obtains a temperature correction coefficient k to be multiplied by the detection value Det2 in the hover detection. The following describes a method for deriving the temperature correction coefficient k.

Figure 35:
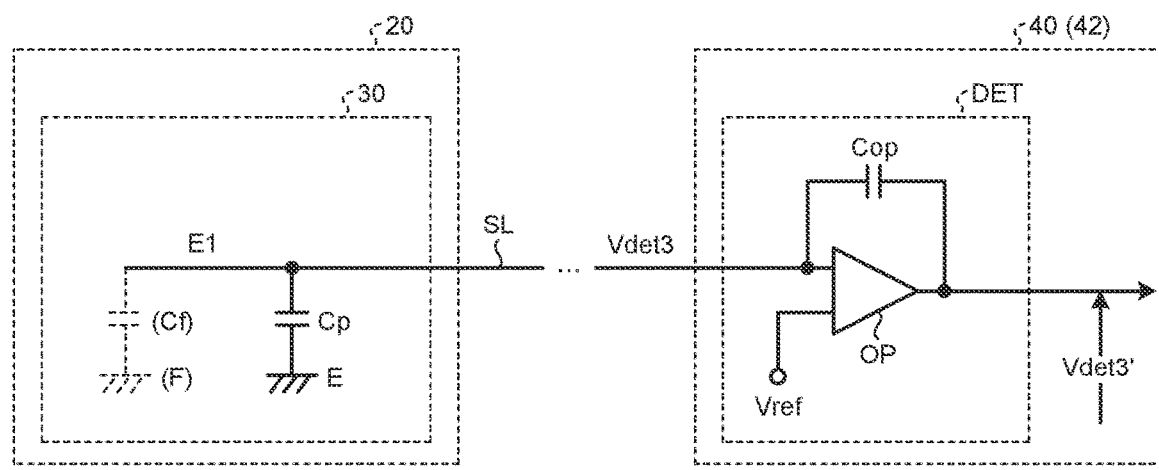
FIG. 35 is a diagram illustrating an equivalent circuit of the detection circuit when a temperature correction coefficient is derived in correction value detection.

FIG. 35 is a diagram illustrating an equivalent circuit of the detection circuit when the temperature correction coefficient is derived in the correction value detection.

In the present embodiment, the temperature correction coefficient k is derived in the correction value detection when the detection target object F is in the non-contact state or the non-present state.

During the correction value detection, the above-described second drive signal (corresponding to the guard signal Vgd) is supplied from the second drive circuit (corresponding to the drive electrode driver 14) to the peripheral conductor E (corresponding to the drive electrode COML). In this case, the output (Vdet3') of the voltage detector DET is represented by Expression (2) below, where Vo denotes the wave height value of the second drive signal supplied to the peripheral conductor E.

$$Vdet3' = (Cp + Cf) \times Vo/Cop \quad (2)$$

As described above, the capacitance value Cp between the detection electrode E1 and the peripheral conductor E is much larger than the capacitance value Cf between the detection electrode E1 and the detection target object F when the hover detection is performed (Cp>>Cf). Accordingly, in the non-contact state or the non-present state of the detection target object F, the capacitance value Cf between the detection electrode E1 and the detection target object F can be assumed to be substantially zero as represented by Expression (3) below $$Vdet3' \approx Cp \times Vo/Cop \quad (3)$$

The capacitance value Cp between the detection electrode E1 and the peripheral conductor E is a value determined by a structure of the display panel 10, and thus, the amount of change thereof caused by the temperature characteristic can be assumed to be substantially zero. Accordingly, the variation in the output (Vdet3') of the voltage detector DET can be assumed to be caused by the temperature characteristic of the operational amplifier OP included in the voltage detector DET.

A detection value Det3T1 at a temperature T1 has a proportional relation represented by Expression (4) below with a detection value Det3T2 at a temperature T2, where VT1 denotes the output (Vdet3') of the voltage detector DET at the temperature T1, and VT2 denotes the output (Vdet3') of the voltage detector DET at the temperature T2.

$$VT2/VT1 = Det3T2/Det3T1 \quad (4)$$

In the present embodiment, the temperature correction coefficient k is derived using Expression (5) below, where Deref denotes a reference detection value at a reference temperature (for example, under an environment at room temperature 25 degrees Celsius) of each of the operational amplifiers OP of the voltage detectors DET provided for the respective detection electrodes E1.

$$k = Dref/Det3 \quad (5)$$

As represented by Expression (5) above, the temperature correction coefficient k is a variable value that varies with the detection value Det3 depending on the ambient temperature. The correction value detection in the present embodiment refers to the derivation of the temperature correction coefficient k using the detection value Det3. The storage 444 stores the reference detection value Dref at the reference temperature (for example, under the environment at room temperature 25 degrees Celsius) of each of the operational amplifiers OP of the voltage detectors DET provided for the respective detection electrodes E1. The detection electrodes E1 and the operational amplifiers OP correspond to each other on a one-to-one basis. Accordingly, in the following description, the reference detection value Dref of each of the operational amplifiers OP of the voltage detectors DET provided for the respective detection electrodes E1 is also called the reference detection value Dref for each of the detection electrodes E1. FIG. 36 is a chart illustrating an example of reference detection value information including the reference detection value for each of the detection electrodes. The example illustrated in FIG. 36 illustrates an example of storing reference detection values Dref1, Dref2, Dref3, . . . , Drefn for detection electrodes E11, E12, E13, . . . , E1n, respectively (where n is a natural number).

The present embodiment assumes that the reference detection value Dref has been set to a value detected in advance in the non-present state of the detection target object before shipping the display device 1.

In the touch detection, the correction processor 442 outputs the received detection value Det1 to the determination processor 443.

In the correction value detection, the correction processor 442 reads the reference detection value Dref for each of the detection electrodes E1 from the reference detection value information (FIG. 36) stored in the storage 444, obtains the temperature correction coefficient k using Expression (5) above, and stores the obtained temperature correction coefficient k for each of the detection electrodes E1 as temperature correction coefficient information illustrated in FIG. 37 in the storage 444. FIG. 37 is a chart illustrating an example of the temperature correction coefficient information including the temperature correction coefficient for each of the detection electrodes. The example illustrated in FIG. 37 illustrates an example of storing temperature correction coefficients k1, k2, k3, . . . , kn for the detection electrodes E11, E12, E13, . . . , E1n, respectively (where n is a natural number). An initial value of 1 at the reference temperature (for example, under the environment at room temperature 25 degrees Celsius) of each of the operational amplifiers OP of the voltage detectors DET provided for the respective detection electrodes E1 is stored in advance as each of the temperature correction coefficients k1, k2, k3, . . . , kn in the storage 444 before shipping the display device 1. In this case, in a detection procedure to be described later, the above-mentioned initial value of 1 is used as the temperature correction coefficients k1, k2, k3, . . . , kn used in the hover detection period PH until the detection values of the temperature correction coefficients k1, k2, k3, . . . , kn detected in the correction value detection period PC are stored.

In the hover detection, the correction processor 442 reads the temperature correction coefficient k for each of the detection electrodes E1 from the temperature correction coefficient information (FIG. 37) stored in the storage 444, and outputs a corrected detection value Dcor obtained by correcting the detection value Det2 using Expression (6) below to the determination processor 443.

$$Dcor = k \times Det2 \qquad (6)$$

In the touch detection, the determination processor 443 determines, based on the received detection value Det1, whether the detection target object is in the contact state, or is in the non-contact state or the non-present state. Specifically, for example, the determination processor 443 compares each of the detection values Det1 detected in each of the one frame periods with a predetermined first threshold Dth1, and if one or more of the detection values Det1 is/are equal to or higher than the first threshold Dth1 (Det1≥Dth1), determines that the detection target object is in the contact state, and outputs the determination result to the controller 11. The determination processor 443 also outputs information on a position where the detection value Det1 is the first threshold Dth1 or higher to the coordinate extractor 45 provided at the subsequent stage. The present disclosure may have an aspect in which, for example, the determination processor 443 stores the detection values Det1 in the respective one frame periods in the storage 444, and compares each of the detection values Det1 stored in the storage 444 with the first threshold Dth1 on a predetermined frame by predetermined frame basis. In the present embodiment, as described above, the reference detection value Dref is set to the value detected in advance in the non-present state of the detection target object before shipping the display device 1. As a method for setting the reference detection value Dref, the reference detection value Dref only needs to be set to, for example, the detection value Det3 when the detection value Det1 is lower than the first threshold (Det1<Dth1) under the environment of the reference temperature.

In the hover detection, the determination processor 443 determines whether the detection target object is in the non-contact state or the non-present state based on the corrected detection value Dcor for each of the detection electrodes E1. Specifically, for example, the determination processor 443 compares the corrected detection value Dcor for each of the detection electrodes E1 with a predetermined second threshold Dth2, and if one or more of the corrected detection values Dcor for the respective detection electrodes E1 is/are equal to or higher than the second threshold Dth2 (Dcor Dth2), determines that the detection target object is in the non-contact state, and outputs information on a position of the detection electrode E1 where the corrected detection value Dcor is equal to or higher than the second threshold Dth2 to the coordinate extractor 45 provided at the subsequent stage. The present disclosure may have an aspect in which, for example, the determination processor 443 stores the corrected detection values Dcor in the respective one frame periods in the storage 444, and compares each of the corrected detection values Dcor stored in the storage 444 with the second threshold Dth2 on a predetermined frame by predetermined frame basis.

Figure 38:
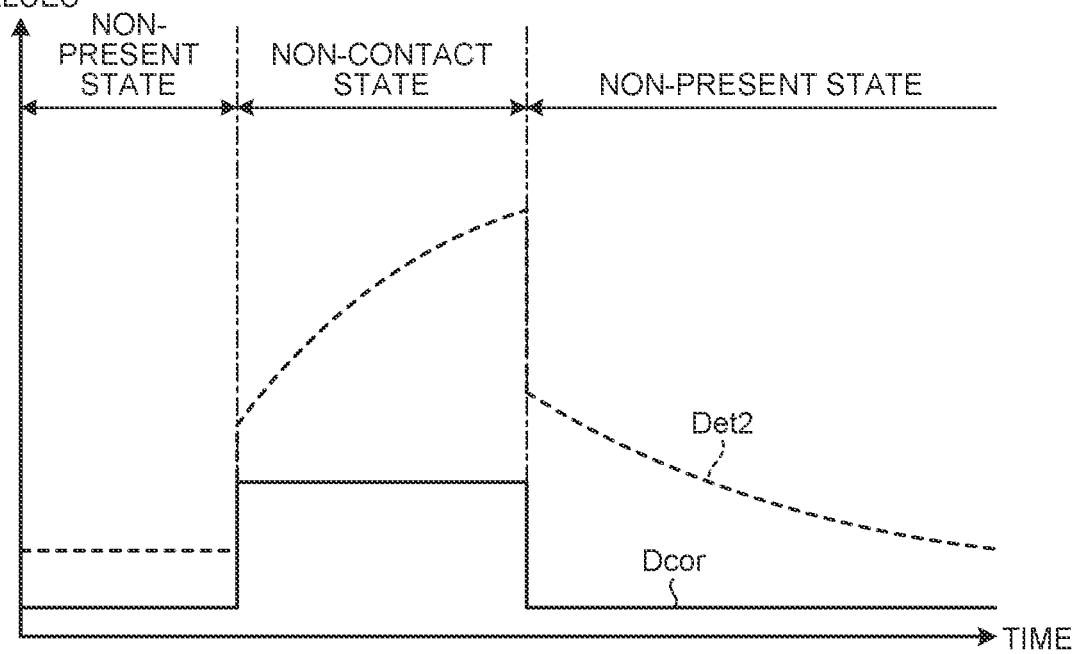
FIG. 38 is a diagram illustrating a detection value and a corrected detection value during the hover detection.

FIG. 38 is a diagram illustrating the detection value and the corrected detection value during the hover detection. In FIG. 38, the vertical axis represents input and output values of the correction processor 442 in the hover detection, and the horizontal axis represents time. A dashed line illustrated in FIG. 38 represents the detection value Det2 serving as an input value of the correction processor 442 in the hover detection, and a solid line represents the corrected detection value Dcor serving as an output value of the correction processor 442 in the hover detection. In the example illustrated in FIG. 38, the distance between the detection electrode E1 and the detection target object F is assumed to be constant in the non-contact state.

As illustrated in FIG. 38, the amount of charge flowing into the operational amplifier OP included in the voltage detector DET increases in the non-contact state. Therefore, the temperature of the operational amplifier OP increases with time, and as a result, the detection value Det2 serving as the input value of the correction processor 442 also increases. After the detection target object F is brought into the non-present state, the temperature of the operational amplifier OP decreases with time, and as a result, the detection value Det2 serving as the input value of the correction processor 442 also decreases.

However, the corrected detection value Dcor serving as the output value of the correction processor 442 in the hover detection is corrected for the temperature variation by the correction processor 442, and thus, stays at a constant value in each of the non-present state and the non-contact state.

In this way, correcting the detection value during the hover detection can increase the hover detection accuracy.

Figure 39:
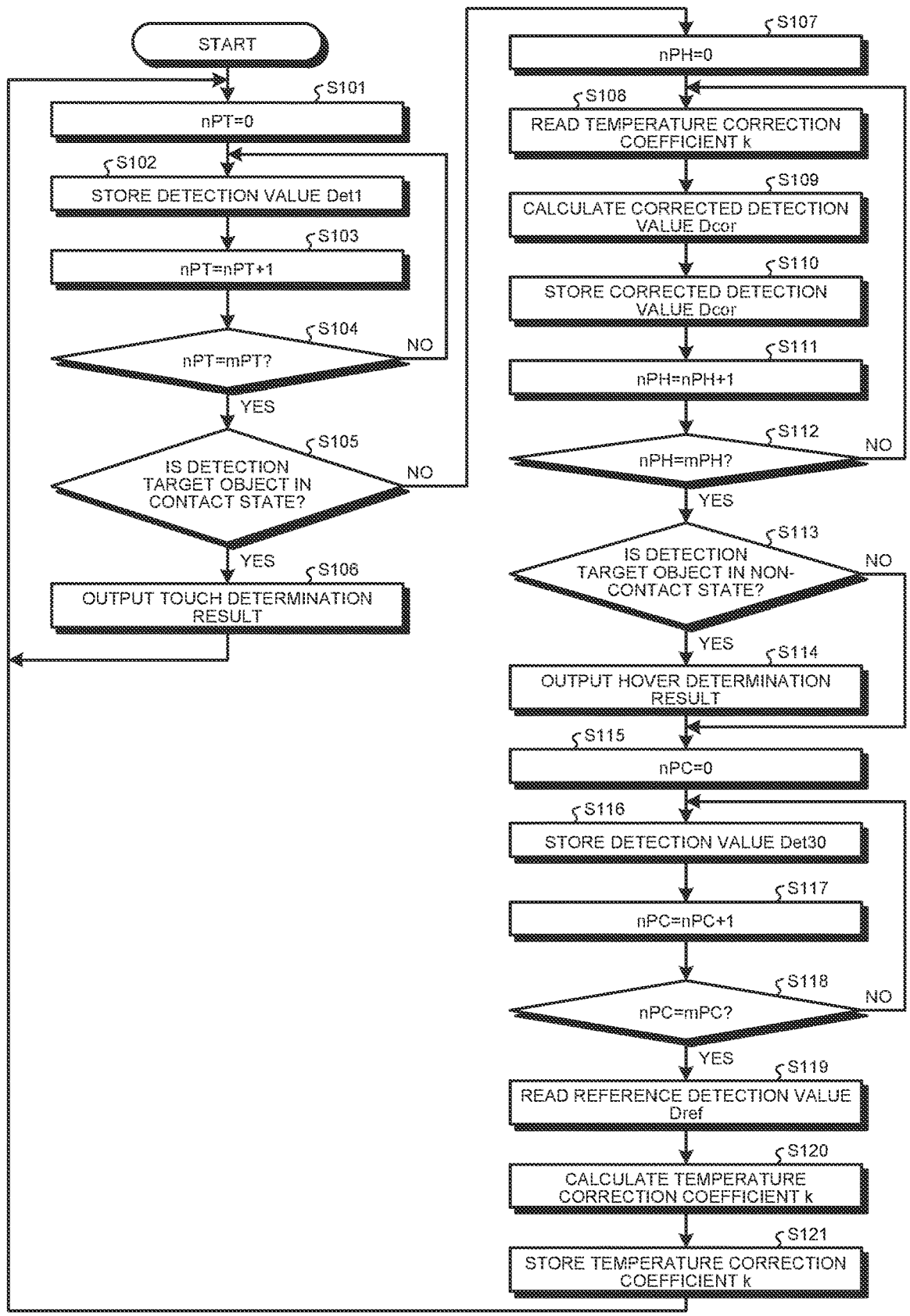
FIG. 39 is a flowchart illustrating an example of a detection procedure according to the first embodiment.

The following describes the detection procedure according to the first embodiment. FIG. 39 is a flowchart illustrating an example of the detection procedure according to the first embodiment. The flowchart illustrated in FIG. 39 illustrates the example of performing each of the touch detection, the hover detection, and the correction value detection once or more times. The storage 444 stores a number of times of detection nPT (where nPT is a natural number) in the touch detection, a number of times of detection nPH (where nPH is a natural number) in the hover detection, and a number of times of detection nPC (where nPC is a natural number) in the correction value detection. The number of times of detection nPT in the touch detection may be, for example, the number of times of the detection operation period Pt in the touch detection period PT, or may be the number of times of repetition of the one frame period. The number of times of detection nPH in the hover detection may be, for example, the number of times of the detection operation period Pt in the hover detection period PH, or may be the number of times of repetition of the one frame period. The number of times of detection nPC in the correction value detection may be, for example, the number of times of the detection operation period Pt in the correction value detection period PC, or may be the number of times of repetition of the one frame period.

First, the controller 11 performs control so as to perform the touch detection operation in the touch detection period PT. The detector 40 resets the number of times of detection nPT in the touch detection (Step S101), stores the detection value Det1 received by the determination processor 443 in the touch detection period PT in the storage 444 (Step S102), increments the number of times of detection nPT in the touch detection (Step S103), and determines whether the number of times of detection nPT in the touch detection has reached a predetermined number of times mPT (Step S104).

If the number of times of detection nPT in the touch detection is smaller than the predetermined number of times mPT (No at Step S104), the detector 40 repeats the processing from Step S102 to Step S104 until the number of times of detection nPT in the touch detection reaches the predetermined number of times mPT (Yes at Step S104).

If the number of times of detection nPT in the touch detection reaches the predetermined number of times mPT (Yes at Step S104), the determination processor 443 of the detector 40 determines whether the detection target object is in the contact state based on the detection value Det1 stored in the storage 444 (Step S105).

If the detection target object is determined to be in the contact state (Yes at Step S105), the determination processor 443 of the detector 40 outputs the touch determination result (Step S106). Specifically, the determination processor 443 of the detector 40 compares, for example, each of the detection values Det1 detected in each of the one frame periods with the predetermined first threshold Dth1, and if one or more of the detection values Det1 is/are equal to or higher than the first threshold Dth1 (Det1 Dth1), determines that the detection target object is in the contact state, and outputs the determination result to the controller 11. The determination processor 443 also outputs the information on the position where the detection value Det1 is the first threshold Dth1 or higher to the coordinate extractor 45 provided at the subsequent stage. The controller 11 performs control so as to perform the touch detection operation in the entire period of the one frame period as the touch detection period PT, and returns the process to Step S101.

If, instead, the determination processor 443 of the detector 40 determines that the detection target object is not in the contact state, that is, the detection target object is in the non-contact state or the non-present state (No at Step S105), the controller 11 performs control so as to provide the hover detection period PH and the correction value detection period PC in the one frame period, perform the hover detection operation in the hover detection period PH, and perform the correction value detection operation in the correction value detection period PC.

The detector 40 resets the number of times of detection nPH in the hover detection (Step S107). The correction processor 442 of the detector 40 reads the temperature correction coefficient k for each of the detection electrodes E1 from the temperature correction coefficient information (FIG. 37) stored in the storage 444 (Step S108), and uses Expression (6) above to calculate the corrected detection value Dcor (Step S109). Specifically, the correction processor 442 of the detector 40 multiplies the received detection value Det2 for each of the detection electrodes E1 by the temperature correction coefficient k for the detection electrode E1 to obtain the corrected detection value Dcor corrected from the detection value Det2 for the detection electrode E1.

The determination processor 443 of the detector 40 stores the corrected detection value Dcor calculated by the correction processor 442 in the storage 444 (Step S110), increments the number of times of detection nPH in the hover detection (Step S111), and determines whether the number of times of detection nPH in the hover detection has reached a predetermined number of times mPH (Step S112).

If the number of times of detection nPH in the hover detection is smaller than the predetermined number of times mPH (No at Step S112), the detector 40 repeats the processing from Step S108 to Step S112 until the number of times of detection nPH in the hover detection reaches the predetermined number of times mPH (Yes at Step S112).

If the number of times of detection nPH in the hover detection reaches the predetermined number of times mPH (Yes at Step S112), the determination processor 443 of the detector 40 determines whether the detection target object is in the non-contact state based on the corrected detection value Dcor stored in the storage 444 (Step S113).

If the detection target object is determined to be in the non-contact state (Yes at Step S113), the determination processor 443 of the detector 40 outputs the hover determination result to the coordinate extractor 45 provided at the subsequent stage (Step S114). Specifically, the determination processor 443 of the detector 40 compares, for example, the corrected detection value Dcor for each of the detection electrodes E1 detected in each of the one frame periods with the predetermined second threshold Dth2, and if one or more of the corrected detection values Dcor for the respective detection electrodes E1 is/are equal to or higher than the second threshold Dth2 (Dcor Dth2), determines that the detection target object is in the non-contact state, and outputs the information on the position of the detection electrode E1 where the corrected detection value Dcor is equal to or higher than the second threshold Dth2 to the coordinate extractor 45 provided at the subsequent stage.

After the determination processor 443 of the detector 40 outputs the hover determination result to the coordinate extractor 45 provided at the subsequent stage at Step S114, or if the determination processor 443 of the detector 40 determines that the detection target object is not in the non-contact state, that is, the detection target object is in the non-present state (No at Step S113), the detector 40 resets the number of times of detection nPC in the correction value detection (Step S115), stores the detection value Det3 received by the correction processor 442 in the correction value detection period PC in the storage 444 (Step S116), increments the number of times of detection nPC in the correction value detection (Step S117), and determines whether the number of times of detection nPC in the correction value detection has reached a predetermined number of times mPC (Step S118).

If the number of times of detection nPC in the correction value detection is smaller than the predetermined number of times mPC (No at Step S118), the detector 40 repeats the processing from Step S116 to Step S118 until the number of times of detection nPC in the correction value detection reaches the predetermined number of times mPC (Yes at Step S118).

If the number of times of detection nPC in the correction value detection reaches the predetermined number of times mPC (Yes at Step S118), the correction processor 442 of the detector 40 reads the reference detection value Dref for each of the detection electrodes E1 from the reference detection value information (FIG. 36) stored in the storage 444 (Step S119), and uses Expression (5) above to calculate the temperature correction coefficient k for each of the detection electrodes E1 (Step S120). Specifically, the correction processor 442 of the detector 40 divides the reference detection value Dref for each of the detection electrodes E1 by the received detection value Det3 for the detection electrode E1 to obtain the temperature correction coefficient k for the detection electrode E1.

The correction processor 442 stores the obtained temperature correction coefficient k for each of the detection electrodes E1 as the temperature correction coefficient information in the storage 444 (Step S121), and returns the process to Step S101.

By performing the above-described processing, the influence of the temperature characteristic of each of the operational amplifiers OP of the voltage detectors DET provided for the respective detection electrodes E1 can be reduced during the hover detection, and the hover detection accuracy can be increased.

Figure 40:
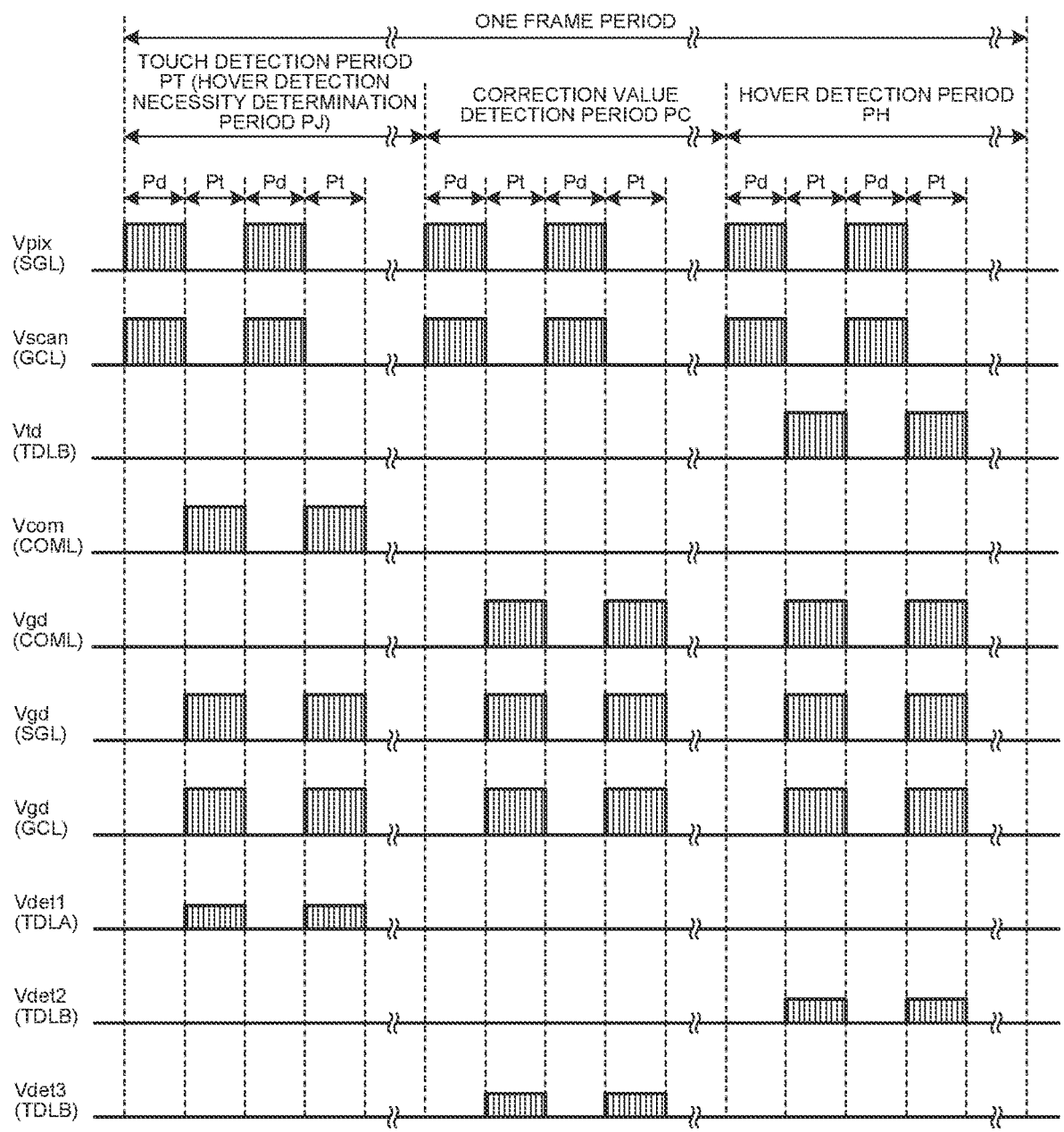
FIG. 40 is a timing waveform diagram illustrating a first example of a basic operation of the display device according to a modification of the first embodiment.
Figure 41:
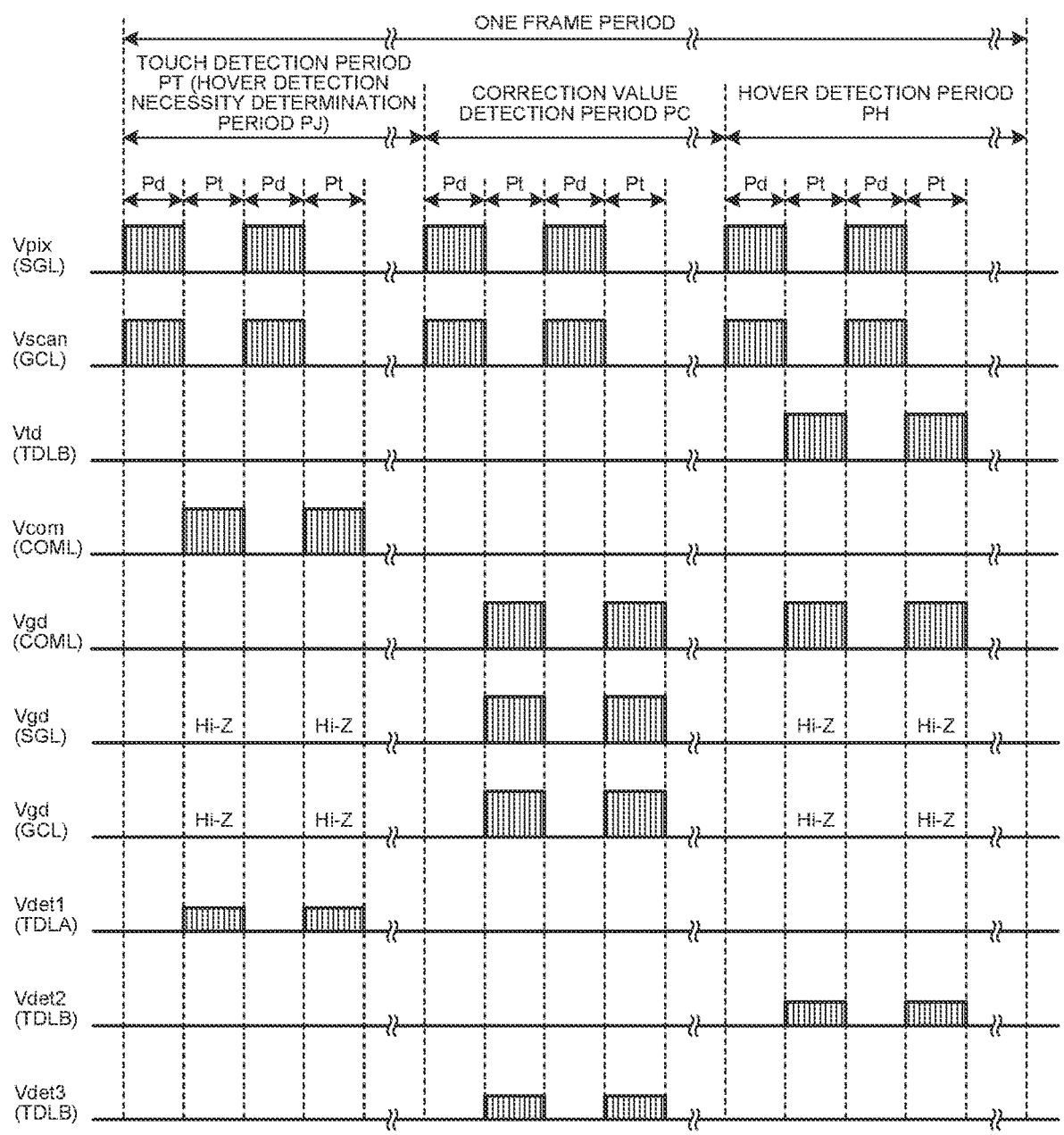
FIG. 41 is a timing waveform diagram illustrating a second example of the basic operation of the display device according to the modification of the first embodiment.
Figure 42:
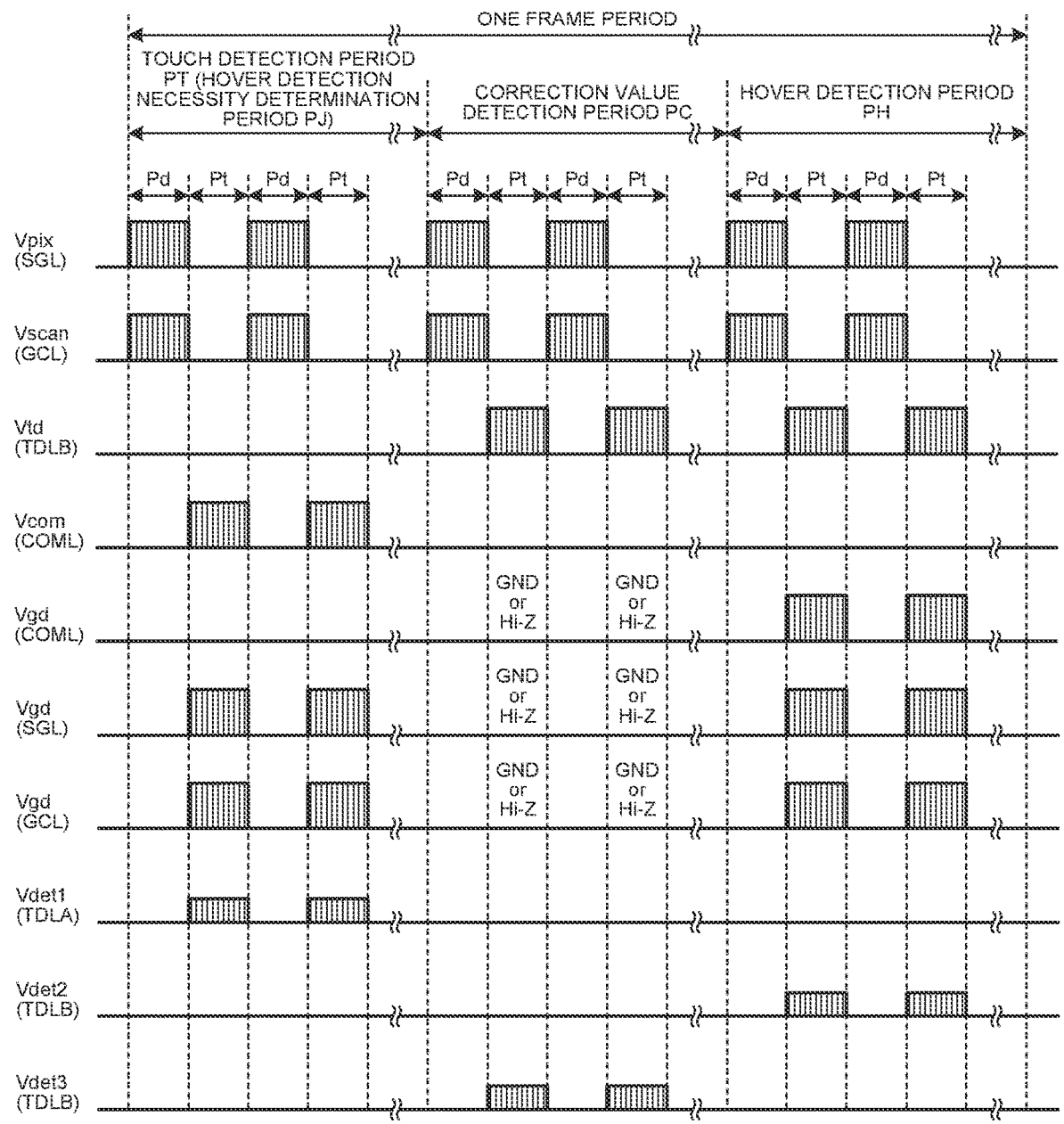
FIG. 42 is a timing waveform diagram illustrating a third example of the basic operation of the display device according to the modification of the first embodiment.
Figure 43:
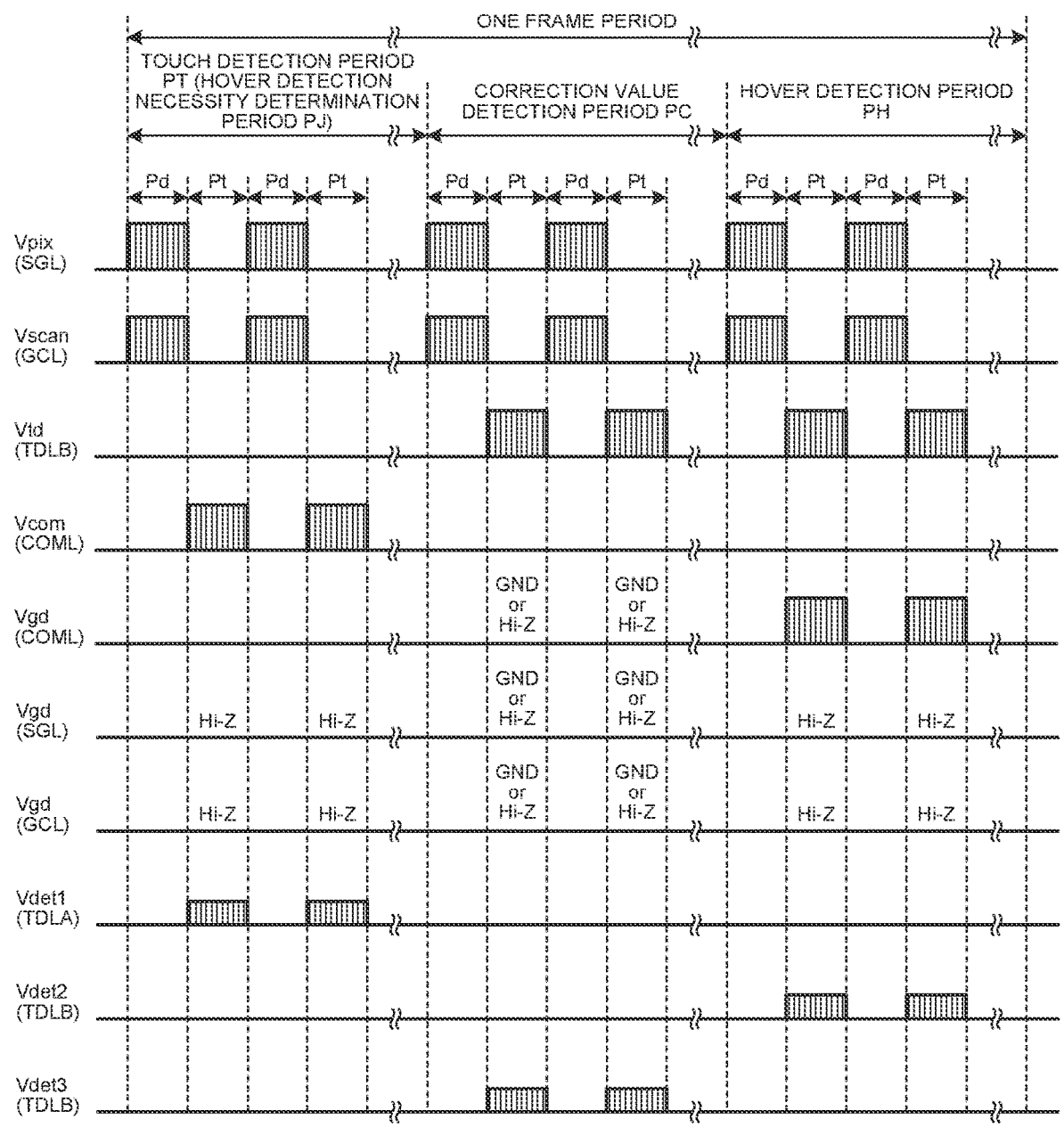
FIG. 43 is a timing waveform diagram illustrating a fourth example of the basic operation of the display device according to the modification of the first embodiment.

FIG. 40 is a timing waveform diagram illustrating a first example of a basic operation of the display device according to a modification of the first embodiment. FIG. 41 is a timing waveform diagram illustrating a second example of the basic operation of the display device according to the modification of the first embodiment. In the examples illustrated in FIGS. 40 and 41, each of the touch detection electrode blocks TDLB (B11 to B14, B21 to B24, B31 to B34, and B41 to B44) illustrated in FIG. 24 is used as the detection electrode (the detection electrode E2 illustrated in FIG. 5) to perform the correction value detection using the basic principle of the mutual-capacitance method. FIG. 42 is a timing waveform diagram illustrating a third example of the basic operation of the display device according to the modification of the first embodiment. FIG. 43 is a timing waveform diagram illustrating a fourth example of the basic operation of the display device according to the modification of the first embodiment. In the examples illustrated in FIGS. 42 and 43, each of the touch detection electrode blocks TDLB (B11 to B14, B21 to B24, B31 to B34, and B41 to B44) illustrated in FIG. 24 is used as the detection electrode (the detection electrode E1 illustrated in FIGS. 8 to 10) to perform the correction value detection using the basic principle of the self-capacitance method.

Figure 44:
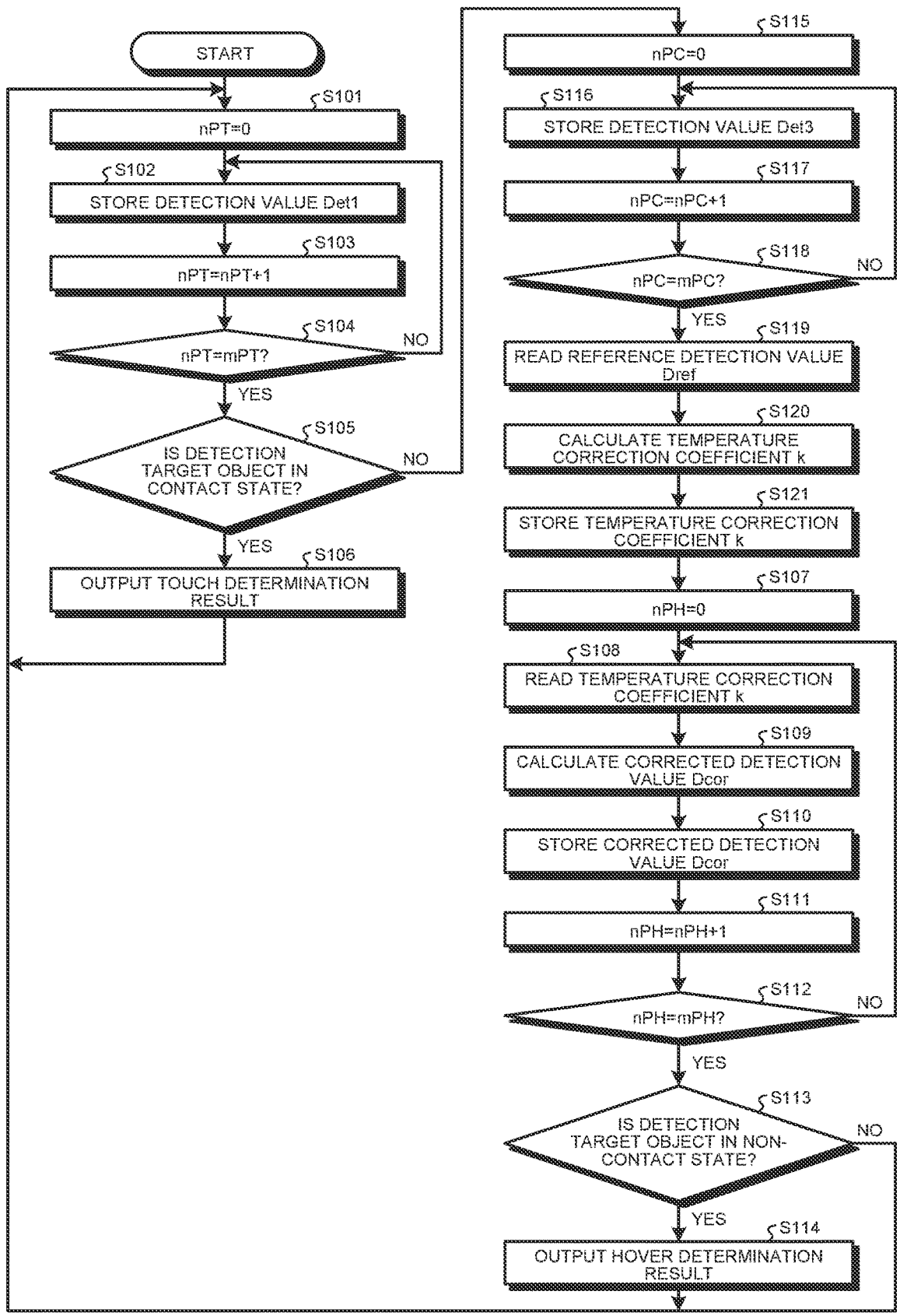
FIG. 44 is a flowchart illustrating an example of a detection procedure according to the modification of the first embodiment.

FIG. 44 is a flowchart illustrating an example of a detection procedure according to the modification of the first embodiment.

In the above-described examples (FIGS. 26 to 29 and 39), the detection periods in the one frame period are provided in the order of the touch detection period PT, the hover detection period PH, and the correction value detection period PC. However, the following describes an example of providing the detection periods in the one frame period in the order of the touch detection period PT, the correction value detection period PC, and the hover detection period PH, as illustrated in FIGS. 40 to 43.

In the example illustrated in FIG. 44, if the determination processor 443 of the detector 40 determines, at Step S105, that the detection target object is not in the contact state, that is, the detection target object is in the non-contact state or the non-present state (No at Step S105), the detector 40 resets the number of times of detection nPC in the correction value detection (Step S115), and performs the subsequent processing up to Step S121. After the correction processor 442 of the detector 40 stores the temperature correction coefficient k for each of the detection electrodes E1 as the temperature correction coefficient information in the storage 444 at Step S121, the detector 40 resets the number of times of detection nPH in the hover detection (Step S107), and performs the subsequent processing up to Step S114. If the determination processor 443 of the detector 40 determines, at Step S113, that the detection target object is not in the non-contact state, that is, the detection target object is in the non-present state (No at S113), or after the determination processor 443 outputs the hover determination result to the coordinate extractor 45 provided at the subsequent stage at Step S114, the process returns to Step S101.

This procedure allows the hover detection to be performed using the temperature correction coefficient k calculated in the correction value detection performed immediately before the hover detection is performed. Therefore, the hover detection accuracy can be further increased.

As described above, the display device 1 according to the first embodiment includes the detection electrodes E1 (touch detection electrode blocks TDLB), the peripheral conductors E (drive electrodes COML) disposed facing or close to the detection electrodes E1 (touch detection electrode blocks TDLB), the first drive circuit (touch detection electrode driver 41) that supplies the first drive signal (drive signal Vtd) to each of the detection electrodes E1 (touch detection electrode blocks TDLB), the second drive circuit (drive electrode driver 14) that supplies the second drive signal (drive signal Vcom or guard signal Vgd) having the same waveform as that of the first drive signal (drive signal Vtd) and synchronized with the first drive signal (drive signal Vtd) to each of the peripheral conductors E (drive electrodes COML), and the detector 40 that detects the first detection signal Vdet1 output from the detection electrodes E1 (touch detection electrode blocks TDLA) in response to the supply of the second drive signal (drive signal Vcom) to each of the peripheral conductors E (drive electrodes COML), the second detection signal Vdet2 output from the detection electrodes E1 (touch detection electrode blocks TDLB) in response to the supply of the first drive signal (drive signal Vtd) to each of the detection electrodes E1 (touch detection electrode blocks TDLB) and the supply of the second drive signal (guard signal Vgd) to each of the peripheral conductors E (drive electrodes COML), and the third detection signal Vdet3 output from the detection electrodes E1 (touch detection electrode blocks TDLB) in response to the supply of the second drive signal (guard signal Vgd) to each of the peripheral conductors E (drive electrodes COML).

Alternatively, the display device 1 according to the first embodiment includes the detection electrodes E1 (touch detection electrode blocks TDLB), the peripheral conductors E (drive electrodes COML) disposed facing or close to the detection electrodes E1 (touch detection electrode blocks TDLB), the first drive circuit (touch detection electrode driver 41) that supplies the first drive signal (drive signal Vtd) to each of the detection electrodes E1 (touch detection electrode blocks TDLB), the second drive circuit (drive electrode driver 14) that supplies the second drive signal (drive signal Vcom or guard signal Vgd) having the same waveform as that of the first drive signal (drive signal Vtd) and synchronized with the first drive signal (drive signal Vtd) to each of the peripheral conductors E (drive electrodes COML), and the detector 40 that detects the first detection signal Vdet1 output from the detection electrodes E1 (touch detection electrode blocks TDLA) in response to the supply of the second drive signal (drive signal Vcom) to each of the peripheral conductors E (drive electrodes COML), the second detection signal Vdet2 output from the detection electrodes E1 (touch detection electrode blocks TDLB) in response to the supply of the first drive signal (drive signal Vtd) to each of the detection electrodes E1 (touch detection electrode blocks TDLB) and the supply of the second drive signal (guard signal Vgd) to each of the peripheral conductors E (drive electrodes COML), and the third detection signal Vdet3 output from the detection electrodes E1 (touch detection electrode blocks TDLB) in response to the supply of the first drive signal (drive signal Vtd) to each of the detection electrodes E1 (touch detection electrode blocks TDLB).

In either of the above-described configurations, if the detection value Det1 of the first detection signal Vdet1 is lower than the predetermined threshold (first threshold Dth1), the detector 40 detects the second detection signal Vdet2 and the third detection signal Vdet3, and uses the detection value Det3 of the third detection signal Vdet3 to correct the detection value Det2 of the second detection signal Vdet2.

Specifically, the detector 40 holds the reference detection value Dref of the third detection signal Vdet3 detected in advance at the predetermined reference temperature when the detection value Det1 of the first detection signal Vdet1 is lower than the threshold (first threshold Dth1), and multiplies the detection value Det2 of the second detection signal Vdet2 by the temperature correction coefficient k that is the ratio of the reference detection value Dref to the detection value Det3 of the third detection signal Vdet3 (Dref/Det3) to obtain the corrected detection value Dcor.

This processing can reduce the influence of each of the operational amplifiers OP of the voltage detectors DET provided for the respective detection electrodes E1 (touch detection electrode blocks TDLB) during the hover detection, and thus, can increase the hover detection accuracy.

According to the present embodiment, the display device 1 can accurately perform the touch detection and satisfactorily perform the hover detection while sharing the electrodes between the touch detection and the hover detection.

In the first embodiment, the touch detection electrode TDL corresponds to a "first electrode", and the drive electrode COML (peripheral conductor E) corresponds to a "second electrode". The touch detection electrode driver 41 corresponds to the "first drive circuit", and the drive electrode driver 14 corresponds to the "second drive circuit". The drive signal Vtd corresponds to the "first drive signal", and the drive signal Vcom or the guard signal Vgd corresponds to the "second drive signal". The detection signal Vdet1 corresponds to the "first detection signal"; the detection signal Vdet2 corresponds to the "second detection signal"; and the detection signal Vdet3 corresponds to the "third detection signal". The reference detection value Dref corresponds to a "reference detection value", and the first threshold Dth1 corresponds to a "threshold". The row direction corresponds to a "first direction", and the column direction corresponds to a "second direction". The touch detection electrode block TDLA corresponds to a "first electrode block", and the touch detection electrode block TDLB corresponds to a "second electrode block". The pixel substrate 2 corresponds to a "substrate". A device including the drive electrodes COML, the touch detection electrodes TDL, and the detector 40 corresponds to a "detection device". The touch detection period PT corresponds to a "first period"; the hover detection period PH corresponds to a second period; and the correction value detection period PC corresponds to a "third period". A "display device" includes the detection device, the pixel substrate 2 having the display region 10a, the liquid crystal layer 6 for displaying the image in the display region 10a, and the controller 11.

Second Embodiment

Figure 45:
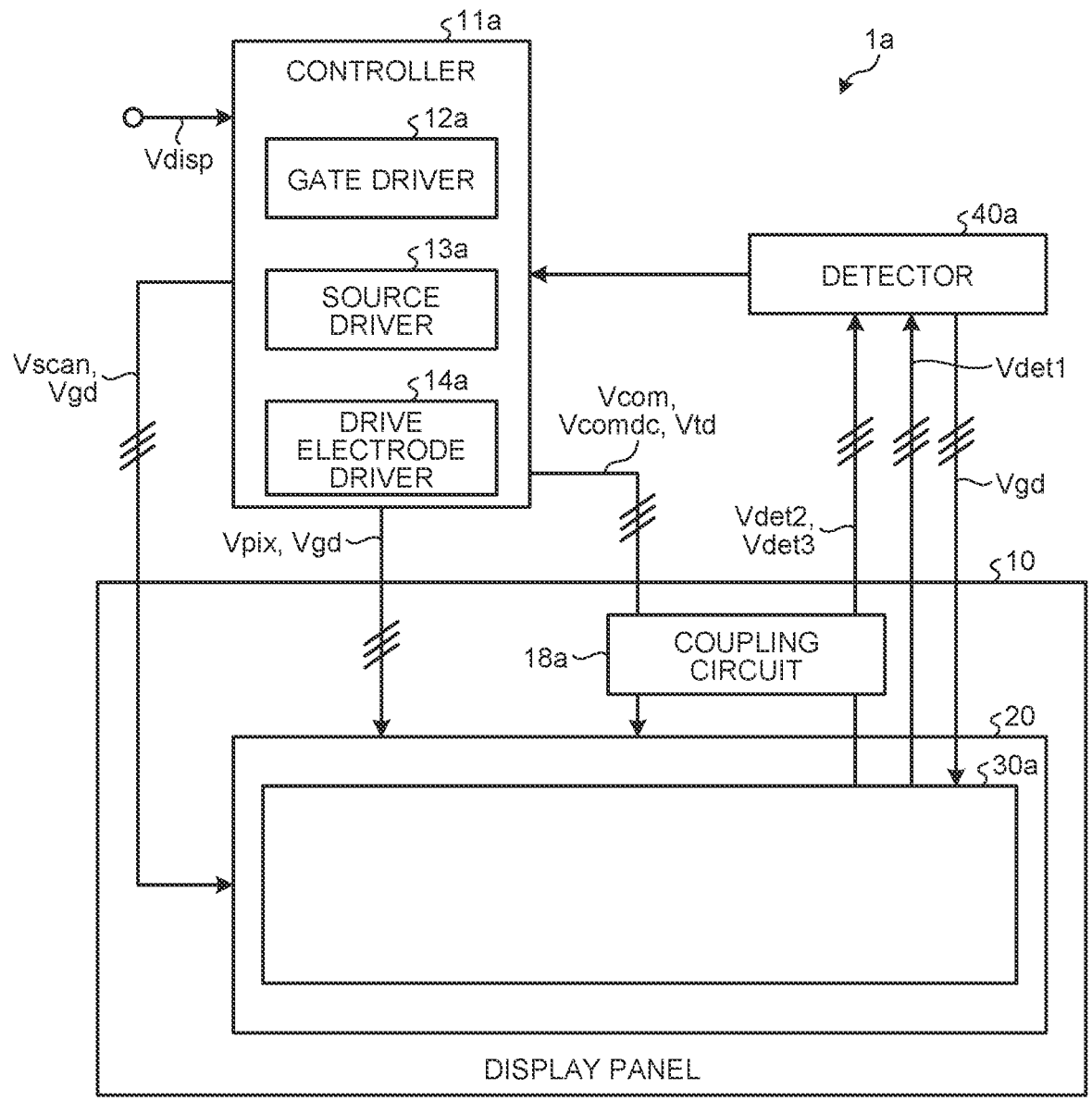
FIG. 45 is a block diagram illustrating a configuration example of a display device according to a second embodiment of the present disclosure.
Figure 46:
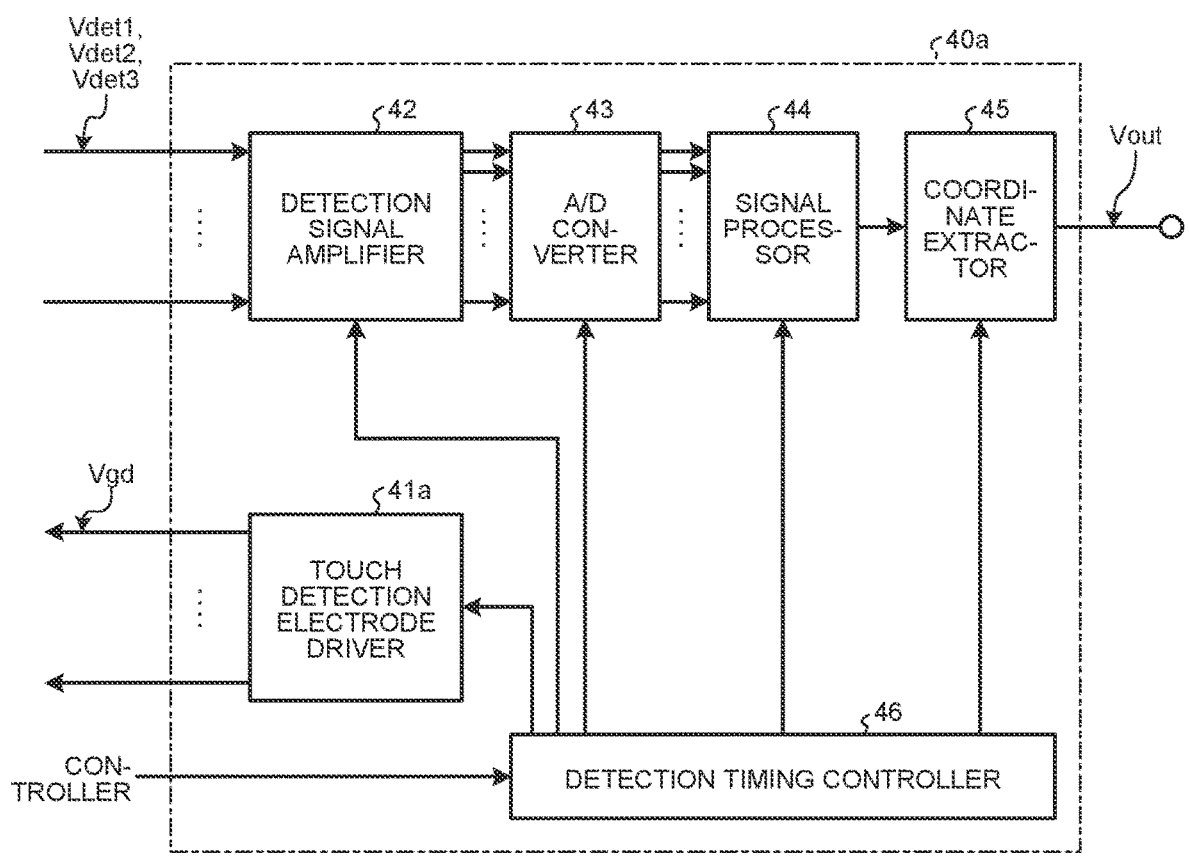
FIG. 46 is a block diagram illustrating a configuration example of a detector of the display device according to the second embodiment.

FIG. 45 is a block diagram illustrating a configuration example of a display device according to a second embodiment of the present disclosure. FIG. 46 is a block diagram illustrating a configuration example of a detector of the display device according to the second embodiment. Components equivalent or identical to those of the first embodiment will not be described again.

In a display device 1a according to the second embodiment, a gate driver 12a of a controller 11a is a circuit having a function to sequentially select one horizontal line as the target of display driving of the display panel 10 by supplying the scan signal Vscan to the gate line GCL of the display unit 20 based on the control signal supplied from the controller 11a. The gate driver 12a has the function to set the gate line GCL to the fixed potential (GND) or the high-impedance state, or to supply the guard signal Vgd to the gate line GCL during the touch detection, the hover detection, and the correction value detection.

A source driver 13a is a circuit that supplies the pixel signal Vpix to each of the sub-pixels SPix through the data line SGL of the display unit 20. The source driver 13a has the function to set the data line SGL to the fixed potential (GND) or the high-impedance state, or to supply the guard signal Vgd to the data line SGL during the touch detection, the hover detection, and the correction value detection. A part of the function of the source driver 13a may be provided in the display panel 10. In this case, the controller 11a may generate the pixel signal Vpix and the guard signal Vgd, and supply the pixel signal Vpix and the guard signal Vgd to the source driver 13a.

A drive electrode driver 14a is a circuit that supplies the drive signal Vcomdc for display or the drive signal Vcom for touch detection to the display unit 20 of the display panel 10. The drive electrode driver 14a has a function to supply the drive signal Vtd for hover detection or correction value detection during the hover detection or the correction value detection. In the present embodiment, the drive signal Vcom for touch detection may be substantially the same signal as the drive signal Vtd for hover detection or correction value detection.

A coupling circuit 18a couples the drive electrodes to one another through the wiring 51 (refer to FIG. 47 to be described later). With this configuration, the drive electrode block COMLA to be described later is formed as the drive electrode in the touch detection, and a drive electrode block COMLB to be described later is formed as the detection electrode in the hover detection and the correction value detection. The detection signal Vdet1 output from the touch detection electrode block TDL and the detection signals Vdet2 and Vdet3 output from the drive electrode block COMLB are supplied through the coupling circuit 18a to the detector 40.

As illustrated in FIG. 46, a detector 40a includes a touch detection electrode driver 41a, the detection signal amplifier 42, the A/D converter 43, the signal processor 44, the coordinate extractor 45, and the detection timing controller 46. Based on the control signal supplied from the controller 11a, the detection timing controller 46 controls the touch detection electrode driver 41a, the detection signal amplifier 42, the A/D converter 43, the signal processor 44, and the coordinate extractor 45 so as to operate them in synchronization with one another.

The touch detection electrode driver 41a is a circuit that sets the touch detection electrode TDL to the fixed potential (GND) or the high-impedance state, or supplies the guard signal Vgd for correction value detection using the self-capacitance method to the display panel 10 during the hover detection and the correction value detection.

A touch sensor 30a performs the touch detection using the mutual-capacitance method described in the first embodiment. In this operation, the touch sensor 30a outputs the detection signal Vdet1 from the touch detection electrodes TDL, on a detection block-by-detection block basis. The detection signal Vdet1 is supplied to the detection signal amplifier 42 of the detector 40a and is, for example, integrated by the voltage detector DET included in the detection signal amplifier 42, and the detection signal Vdet1' is output.

The touch sensor 30a performs the hover detection using the self-capacitance method described in the first embodiment. In this operation, the touch sensor 30a outputs the detection signal Vdet2 from the drive electrode block COMLB to be described later. The detection signal Vdet2 is supplied to the detection signal amplifier 42 of the detector 40a and is, for example, integrated by the voltage detector DET included in the detection signal amplifier 42, and the detection signal Vdet2' is output. In the hover detection according to the present embodiment, the AC rectangular wave Sg (refer to FIG. 11) is applied to the detection electrode E1 (drive electrode block COMLB) and the peripheral conductors (in the present embodiment, the gate line GCL, the gate electrode 64, the data line SGL, and the pixel electrode 22 (refer to FIG. 17)) facing or close to the detection electrode E1 (drive electrode block COMLB).

The touch sensor 30a also performs the correction value detection using the self-capacitance method described in the first embodiment. In this operation, the touch sensor 30a outputs the detection signal Vdet3 from the drive electrode block COMLB to be described later. The detection signal Vdet3 is supplied to the detection signal amplifier 42 of the detector 40a and is, for example, integrated by the voltage detector DET included in the detection signal amplifier 42, and the detection signal Vdet3' is output. In the correction value detection according to the present embodiment, the AC rectangular wave Sg (refer to FIG. 11) is applied to the peripheral conductors (in the present embodiment, the gate line GCL, the gate electrode 64, the data line SGL, and the pixel electrode 22 (refer to FIG. 17)) facing or close to the detection electrode E1 (drive electrode block COMLB).

The following describes a configuration example of the display device 1 in detail. FIG. 47 is a plan view schematically illustrating the TFT substrate included in the display device according to the second embodiment. FIG. 48 is a plan view schematically illustrating the counter substrate included in the display device according to the second embodiment.

Figure 47:
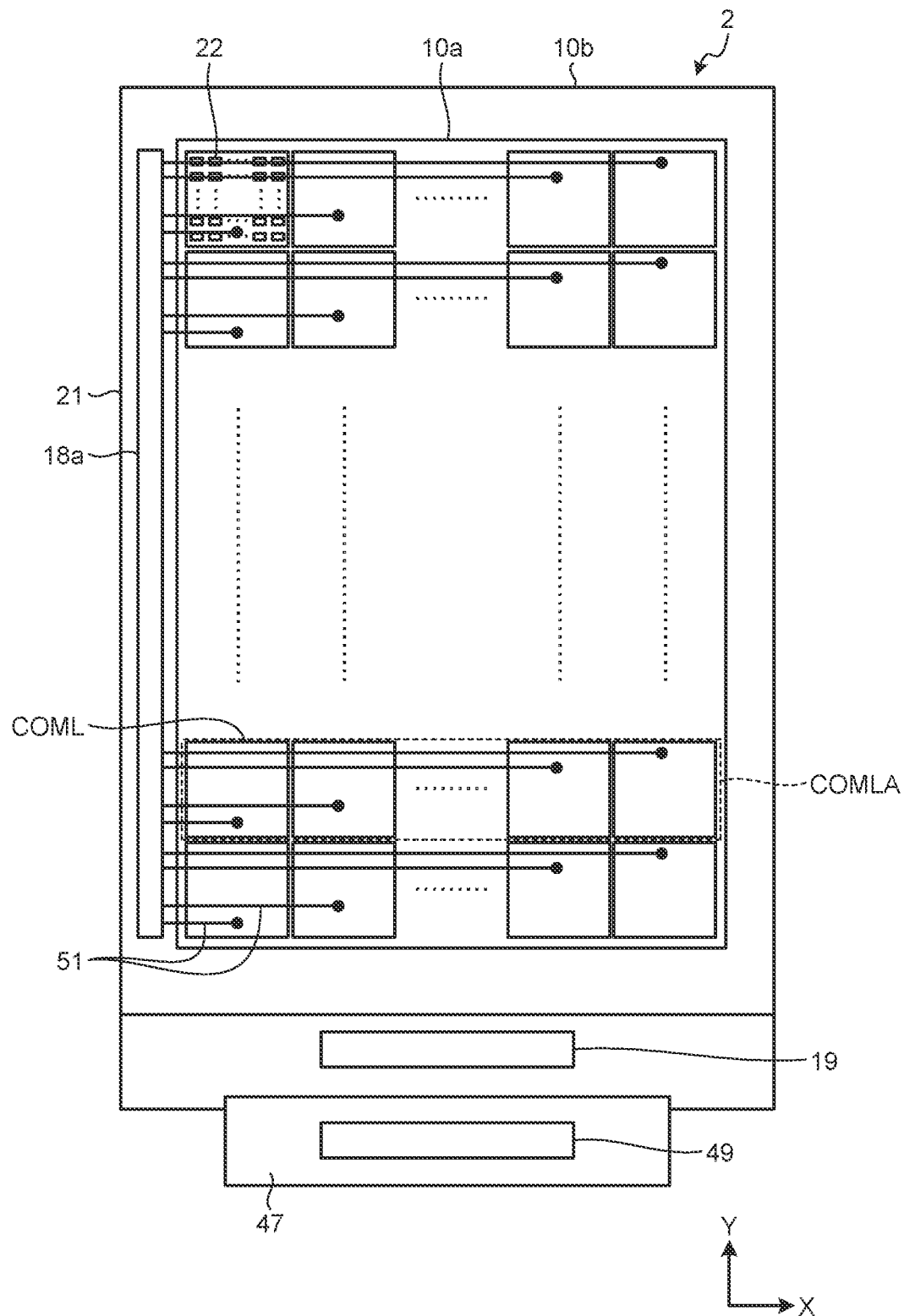
FIG. 47 is a plan view schematically illustrating the TFT substrate included in the display device according to the second embodiment.
Figure 48:
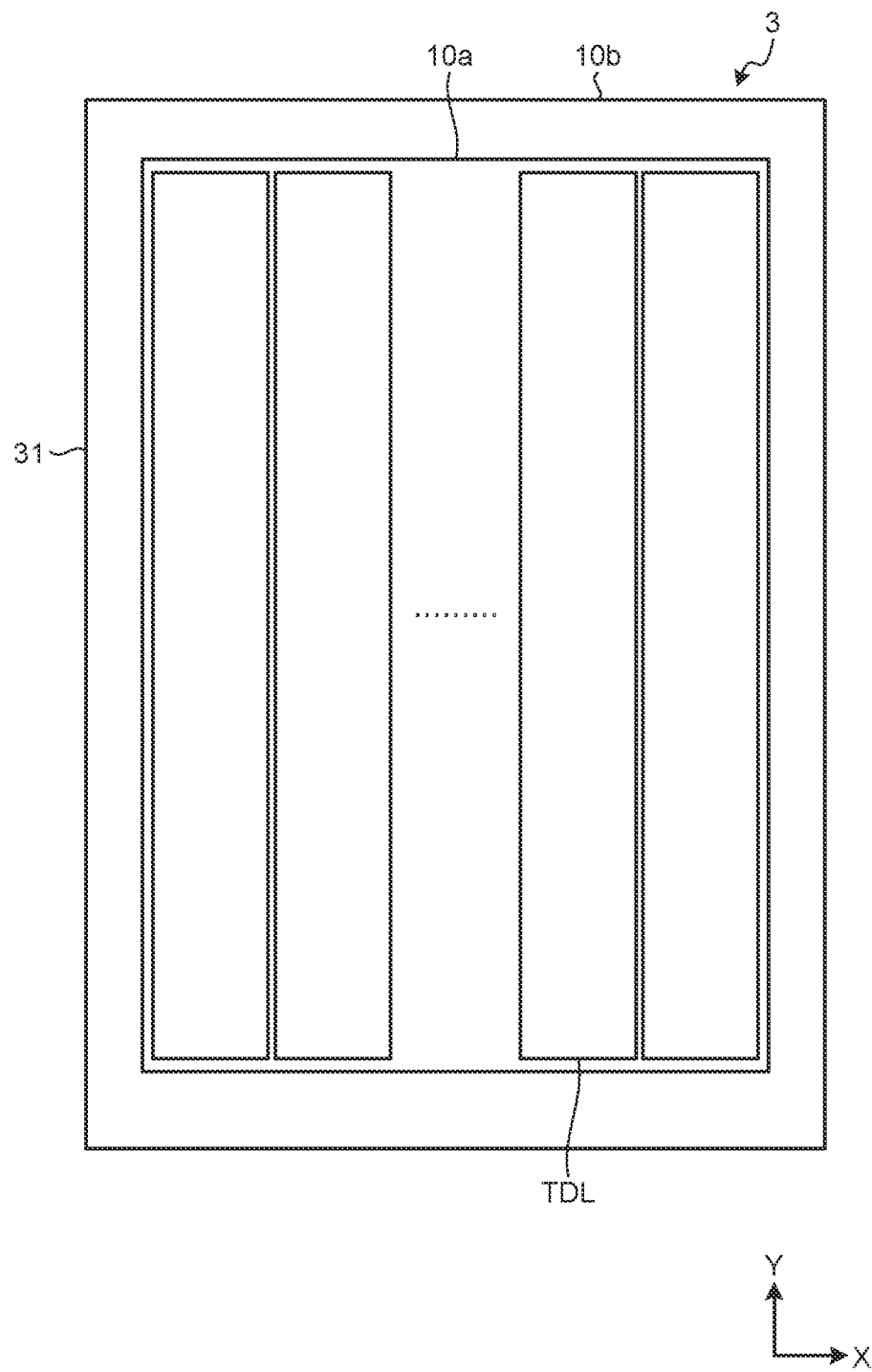
FIG. 48 is a plan view schematically illustrating the counter substrate included in the display device according to the second embodiment.

As illustrated in FIGS. 47 and 48, each of the TFT substrate 21 and the counter substrate 31 has the display region 10a for displaying the image and the frame region 10b provided around the display region 10a. The display region 10a has a rectangular shape having a pair of long edges and a pair of short edges. The frame region 10b has a frame shape surrounding the four edges of the display region 10a.

As illustrated in FIG. 47, the drive electrodes COML are provided in the display region 10a of the TFT substrate 21, and are arranged side by side in the row direction (X-direction) and the column direction (Y-direction), thus being arranged in a matrix having a row-column configuration. Each of the drive electrodes COML is rectangular or square in the plan view. The drive electrodes COML are made of a light-transmitting conductive material such as ITO. The pixel electrodes 22 are arranged in a matrix having a row-column configuration in positions corresponding to each of the drive electrodes COML. Each of the pixel electrodes 22 has an area smaller than that of the drive electrode COML. While FIG. 47 illustrates some of the drive electrodes COML and some of the pixel electrodes 22, the drive electrodes COML and the pixel electrodes 22 are arranged over the entire area of the display region 10a. In the present embodiment, during the touch detection using the mutual-capacitance method, the drive electrodes COML arranged in the row direction are coupled to one another through the coupling circuit 18a to constitute the drive electrode block COMLA having a linear shape.

The display IC 19 is disposed in the frame region 10b of the TFT substrate 21. The display IC 19 is a chip mounted using the COG technique on the TFT substrate 21. The display IC 19 incorporates, for example, the controller 11a (refer to FIG. 45). The display IC 19 outputs the control signals to, for example, the gate lines GCL and the data lines SGL to be described later based on the video signal Vdisp (refer to FIG. 45) supplied from the external host IC (not illustrated).

The flexible substrate 47 with the detection IC 49 disposed thereon is coupled to the frame region 10b of the TFT substrate 21. The detection IC 49 is the chip mounted on the flexible substrate 47. The detection IC 49 incorporates, for example, the detector 40a (refer to FIG. 45), and is coupled to the display IC 19 through the flexible substrate 47.

The wiring 51 is coupled to each of the drive electrodes COML arranged in the display region 10a, and is drawn out to the frame region 10b. Ends of the drive electrodes COML are coupled to the flexible substrate 47 provided on the short-edge side of the frame region 10b of the TFT substrate 21 (refer to FIG. 47). For example, the detector 40a (refer to FIG. 45) incorporated in the detection IC 49 (refer to FIG. 47) is coupled to each of the drive electrodes COML through the flexible substrate 47, the TFT substrate 21, the coupling circuit 18a, and the wiring 51.

The display IC 19 may be disposed, for example, on the short-edge side of the frame region 10b, as illustrated in FIG. 47. This configuration eliminates the need for providing the display IC 19 on a long-edge side of the frame region 10b, and thus, can reduce the width along the long edge of the frame region 10b.

As illustrated in FIG. 48, the touch detection electrodes TDL are provided in the display region 10a of the counter substrate 31. More specifically, the touch detection electrodes TDL extending in the direction (X-direction) along the short edges of the display region 10a are arranged side by side in the direction (Y-direction) along the long edges of the display region 10a. Each of the touch detection electrodes TDL is rectangular in the plan view. The touch detection electrodes TDL are made of a light-transmitting conductive material such as ITO. The touch detection electrodes TDL are not limited to being made of ITO, and may be made of, for example, thin metal wires using a metal material. While FIG. 48 illustrates some of the touch detection electrodes TDL, the touch detection electrodes TDL are arranged over the entire area of the display region 10a.

Figure 49:
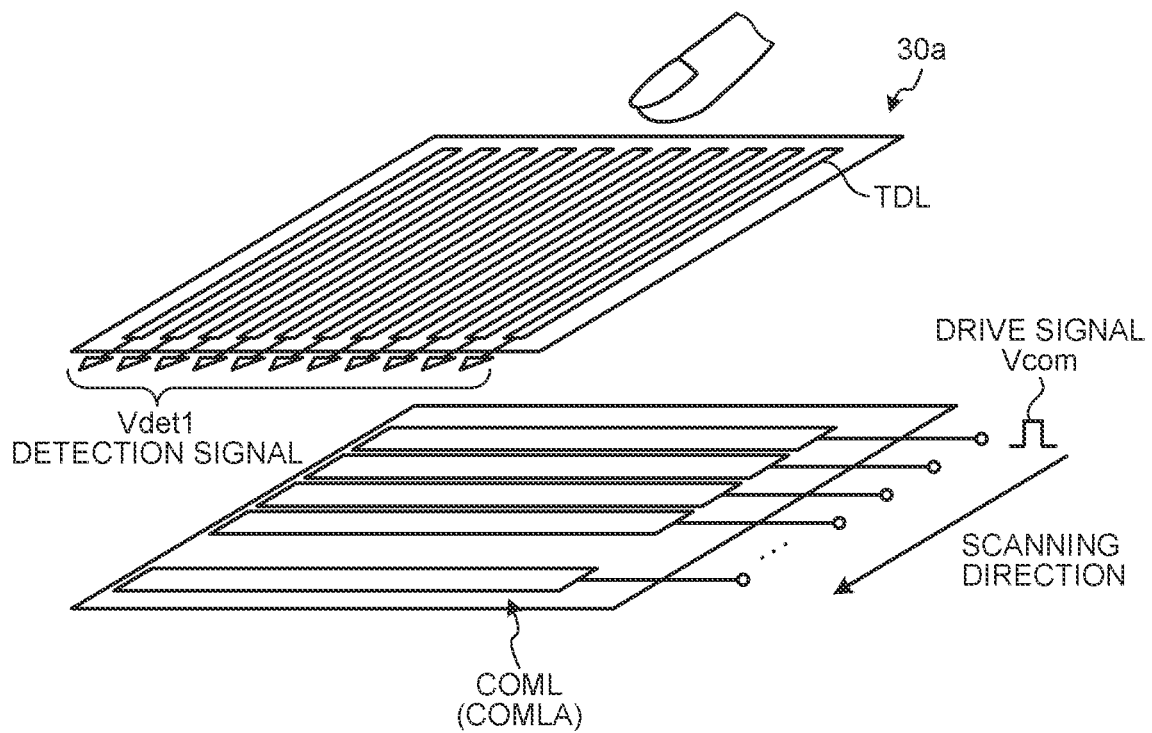
FIG. 49 is a perspective view illustrating a configuration example of the drive electrodes and the touch detection electrodes of the display panel according to the second embodiment.

FIG. 49 is a perspective view illustrating a configuration example of the drive electrodes and the touch detection electrodes of the display panel according to the second embodiment. The touch sensor 30a includes the drive electrodes COML provided on the pixel substrate 2 and the touch detection electrodes TDL provided on the counter substrate 3. The drive electrode blocks COMLA including the drive electrodes COML serve as a plurality of striped electrode patterns extending in the right-left direction in FIG. 49. The touch detection electrodes TDL include a plurality of electrode patterns extending in a direction intersecting the extending direction of the drive electrode blocks COMLA. The touch detection electrodes TDL face the drive electrode blocks COMLA in the direction orthogonal to the surface of the TFT substrate 21 (refer to FIG. 12). Each of the electrode patterns of the touch detection electrodes TDL is coupled to the input of the detection signal amplifier 42 of the detector 40a (refer to FIG. 46). Electrostatic capacitance is generated at an intersecting portion between each of the drive electrodes COML of the drive electrode block COMLA and each of the electrode patterns of the touch detection electrodes TDL.

The shape of the touch detection electrodes TDL and the drive electrode blocks COMLA is not limited to the shape formed of a plurality of divided stripes. For example, the touch detection electrodes TDL may have a shape of comb teeth. Otherwise, the touch detection electrodes TDL only need to be divided into a plurality of portions, and the shape of slits dividing the drive electrodes COML may be linear or curved.

When the touch sensor 30a performs the touch detection using the mutual-capacitance method, the drive electrode driver 14a performs driving so as to sequentially scan each of the drive electrode blocks COMLA in a time-division manner, and thus, sequentially selects the drive electrode blocks COMLA. The detection signal Vdet1 is output from the touch detection electrode TDL, and thus, the touch detection using the drive electrode blocks COMLA is performed. That is, the drive electrode block COMLA corresponds to the drive electrode E1 and the touch detection electrode TDL corresponds to the detection electrode E2 in the basic principle of the mutual-capacitive touch detection described above. The touch sensor 30a performs the touch detection according to the basic principle. As illustrated in FIG. 49, the touch detection electrodes TDL and the drive electrode blocks COMLA intersecting each other constitute the touch detection surface in the form of a matrix having a row-column configuration. By scanning the entire touch detection surface formed in a matrix having a row-column configuration, the touch sensor 30a can detect the position where the conductor comes in contact with or approximates the display surface from the outside.

Figure 50:
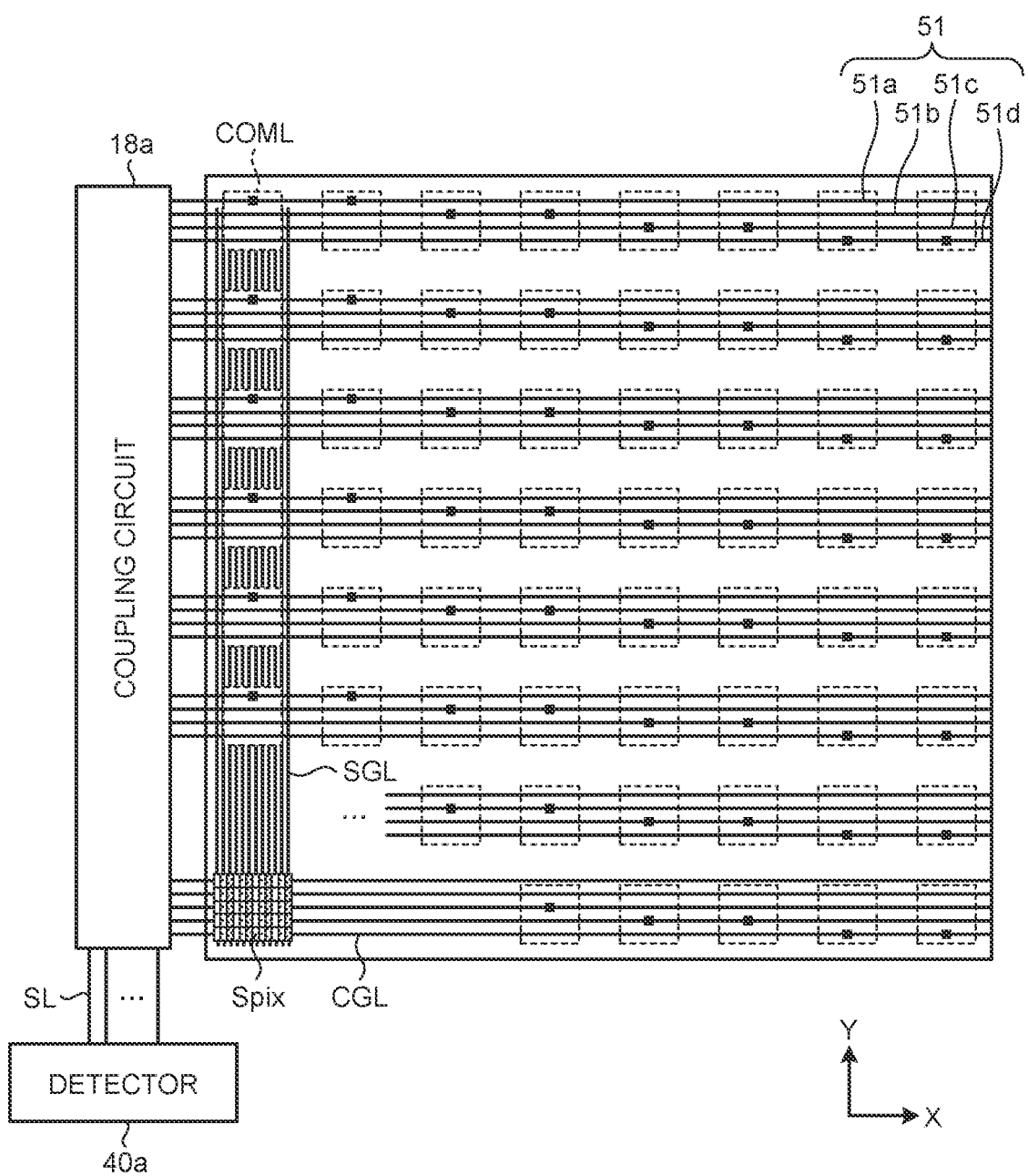
FIG. 50 is a diagram illustrating an example of coupling of the drive electrodes to the wiring.
Figure 51:
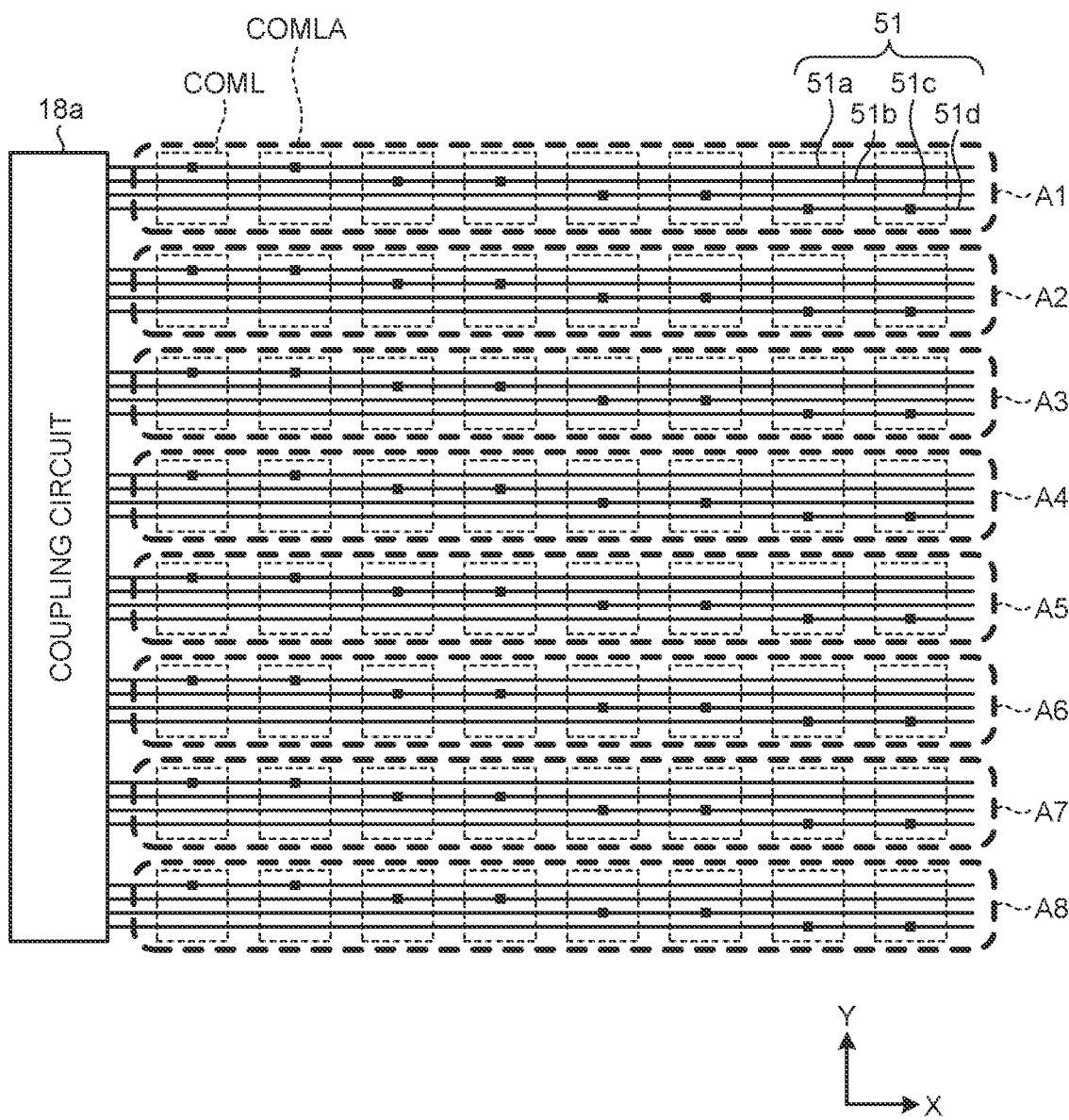
FIG. 51 is a diagram illustrating a configuration example of linear drive electrode blocks.
Figure 52:
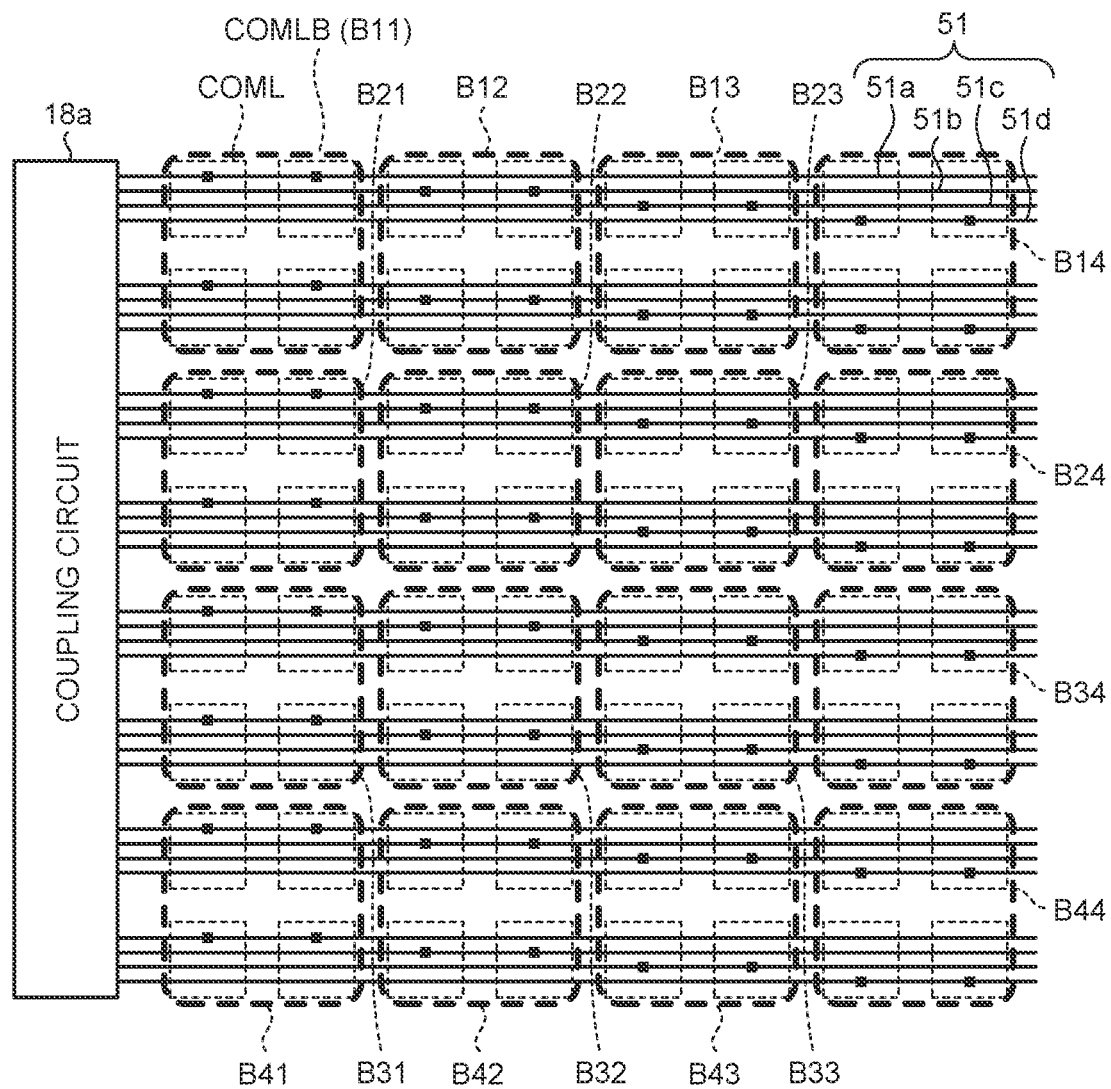
FIG. 52 is a diagram illustrating a configuration example of square drive electrode blocks.

FIG. 50 is a diagram illustrating an example of coupling of the drive electrodes to the wiring. FIG. 51 is a diagram illustrating a configuration example of the drive electrode blocks each having a linear shape. FIG. 52 is a diagram illustrating a configuration example of the drive electrode blocks each having a square shape. As illustrated in FIG. 50, the drive electrodes COML are arranged side by side in the row direction (X-direction) and the column direction (Y-direction) to form a plurality of rows and a plurality of columns. FIG. 50 illustrates a case where the drive electrodes COML are arranged so as to form eight rows and eight columns.

Each of a plurality of wires of the wiring 51 is coupled to the drive electrodes COML arranged side by side in the row direction (X-direction). For example, each of the wires of the wiring 51 includes the four wires 51a to 51d extending in the column direction (Y-direction). Specifically, in the drive electrodes COML in the top row in FIG. 50, when viewed from the coupling circuit 18a, the first and second drive electrodes COML are coupled to the wire 51a; the third and fourth drive electrodes COML are coupled to the wire 51b; the fifth and sixth drive electrodes COML are coupled to the wire 51c; and the seventh and eighth drive electrodes COML are coupled to the wire 51d. Also in the drive electrodes COML below the top row in FIG. 50, the wires 51a to 51d are coupled to the drive electrodes COML in the same way as to the drive electrodes COML in the top row in FIG. 50.

As illustrated in FIG. 50, each of the wires of the wiring 51 is coupled to the coupling circuit 18a. The coupling circuit 18a includes a multiplexer having, for example, 16 or more channels capable of receiving and outputting signals. The coupling circuit 18a is coupled to the detector 40a through the detection data lines SL. The coupling circuit 18a is provided in the frame region 10b of the TFT substrate 21 (refer to FIG. 47). The coupling circuit 18a may alternatively be built into the detection IC 49.

The coupling circuit 18a switches the coupling between the drive electrodes COML and the wiring 51 based on a control signal received from the controller 11a. Through this switching, the coupling circuit 18a can couple the drive electrodes COML together in the row direction (X-direction) to form the drive electrode blocks COMLA as illustrated in FIG. 51, or couple the drive electrodes COML together in the row direction (X-direction) and the column direction (Y-direction) to form the drive electrode blocks COMLB as illustrated in FIG. 52. In FIG. 52, the drive electrodes COML are coupled together in both the row direction and the column direction to form the drive electrode blocks COMLB. The present disclosure is, however, not limited to this configuration. For example, the drive electrodes COML may be coupled together in the column direction to form the drive electrode blocks COMLB. The drive electrodes COML may be coupled together in the row direction when forming the drive electrode blocks COMLA, and may be coupled together in the column direction when forming the drive electrode blocks COMLB.

Figure 53:
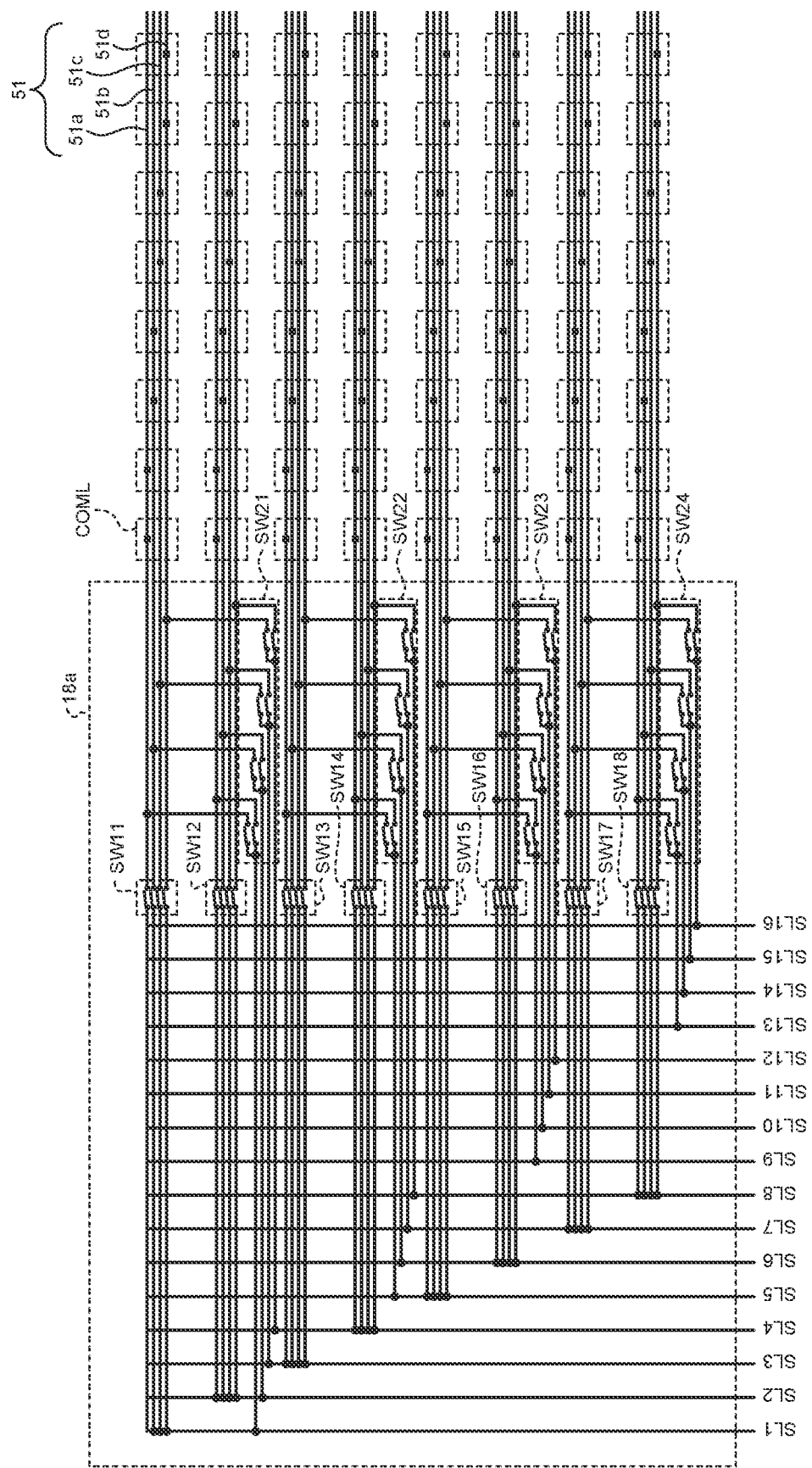
FIG. 53 is a diagram illustrating a configuration example of a coupling circuit according to the second embodiment.

FIG. 53 is a diagram illustrating a configuration example of the coupling circuit according to the second embodiment. As illustrated in FIG. 53, the coupling circuit 18a includes the switching elements SW11 to SW18 and SW21 to SW24. Each of the switching elements SW11 to SW18 and SW21 to SW24 is coupled to the wires of the wiring 51, and couples or uncouples the wires of the wiring 51 on one side to or from the wires of the wiring 51 on the other side. The switching elements SW11 to SW18 and SW21 to SW24 can switch the coupling among the drive electrodes COML to either the coupled state or the uncoupled state.

When the switching elements SW11 to SW18 are on and the switching elements SW21 to SW24 are off, the drive electrodes COML are coupled to one another in the row direction (X-direction) to form the drive electrode blocks COMLA (refer to FIG. 51). For example, adjacent eight of the drive electrodes COML are coupled together in the row direction (X-direction) to form one of the drive electrode blocks COMLA.

FIG. 51 illustrates a case as an example of the present embodiment where eight of the drive electrode blocks COMLA (A1 to A8) are formed from 64 of the touch detection electrodes TDL arranged side by side at even intervals in the row direction (X-direction) and the column direction (Y-direction). The eight drive electrode blocks COMLA are arranged side by side at even intervals in the column direction (Y-direction). The eight drive electrode blocks COMLA are coupled to detection data lines SL1 to SL8 through the switching elements SW11 to SW18, respectively.

When the switching elements SW11 to SW18 are off and the switching elements SW21 to SW24 are on, the drive electrodes COML are coupled to one another in the row direction (X-direction) and the column direction (Y-direction) to form the drive electrode blocks COMLB (refer to FIG. 52). For example, the drive electrodes COML adjacent to each other in the row direction (X-direction) and the column direction (Y-direction) are coupled to each other to form one of the drive electrode blocks COMLB from four of the drive electrodes COML.

FIG. 52 illustrates a case as an example of the present embodiment where 16 of the drive electrode blocks COMLB (B11 to B14, B21 to B24, B31 to B34, and B41 to B44) are formed from 64 of the drive electrodes COML. The shape of each of the drive electrode blocks COMLB is substantially square in the plan view. The 16 drive electrode blocks COMLB are arranged side by side at even intervals in the row direction (X-direction) and the column direction (Y-direction). The 16 drive electrode blocks COMLB are coupled to the respective detection data lines SL1 to SL16 through the switching elements SW21 to SW24.

In the present embodiment, each of the drive electrode blocks COMLA (A1 to A8) illustrated in FIG. 51 is used as the drive electrode (the drive electrode E1 illustrated in FIG. 3) to perform the mutual-capacitive touch detection, and each of the touch detection electrode blocks TDLB (B11 to B14, B21 to B24, B31 to B34, and B41 to B44) illustrated in FIG. 52 is used as the detection electrode (the detection electrode E1 illustrated in FIGS. 8 to 10) to perform the hover detection and the correction value detection using the self-capacitance method.

In the examples illustrated in FIGS. 51 to 53, the example has been described where one of the drive electrode blocks COMLB having a substantially square shape is formed from four of the drive electrodes COML when the hover detection and the correction value detection using the self-capacitance method are performed. However, the number and the shape in the plan view of the drive electrodes COML forming the drive electrode block COMLB are not limited to this example. For example, the present disclosure may have an aspect in which one of the drive electrode blocks COMLB having the substantially square shape is formed from nine of the drive electrodes COML, or in which the shape of the drive electrode block COMLB is substantially rectangular in the plan view. The present disclosure is not limited by the number or the shape in the plan view of the drive electrodes COML forming the drive electrode block COMLB.

Figure 54:
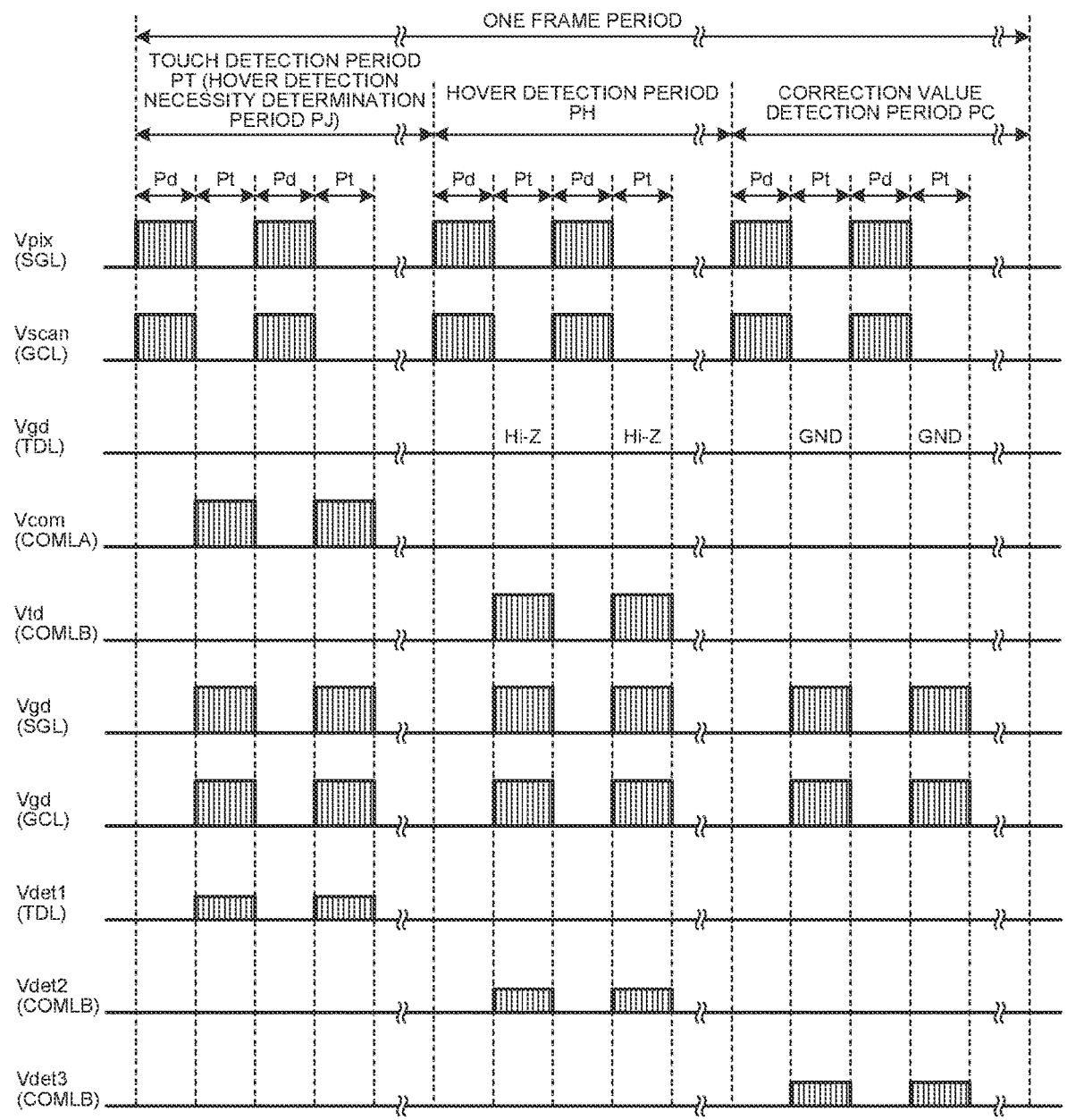
FIG. 54 is a timing waveform diagram illustrating a first example of a basic operation of the display device according to the second embodiment.
Figure 55:
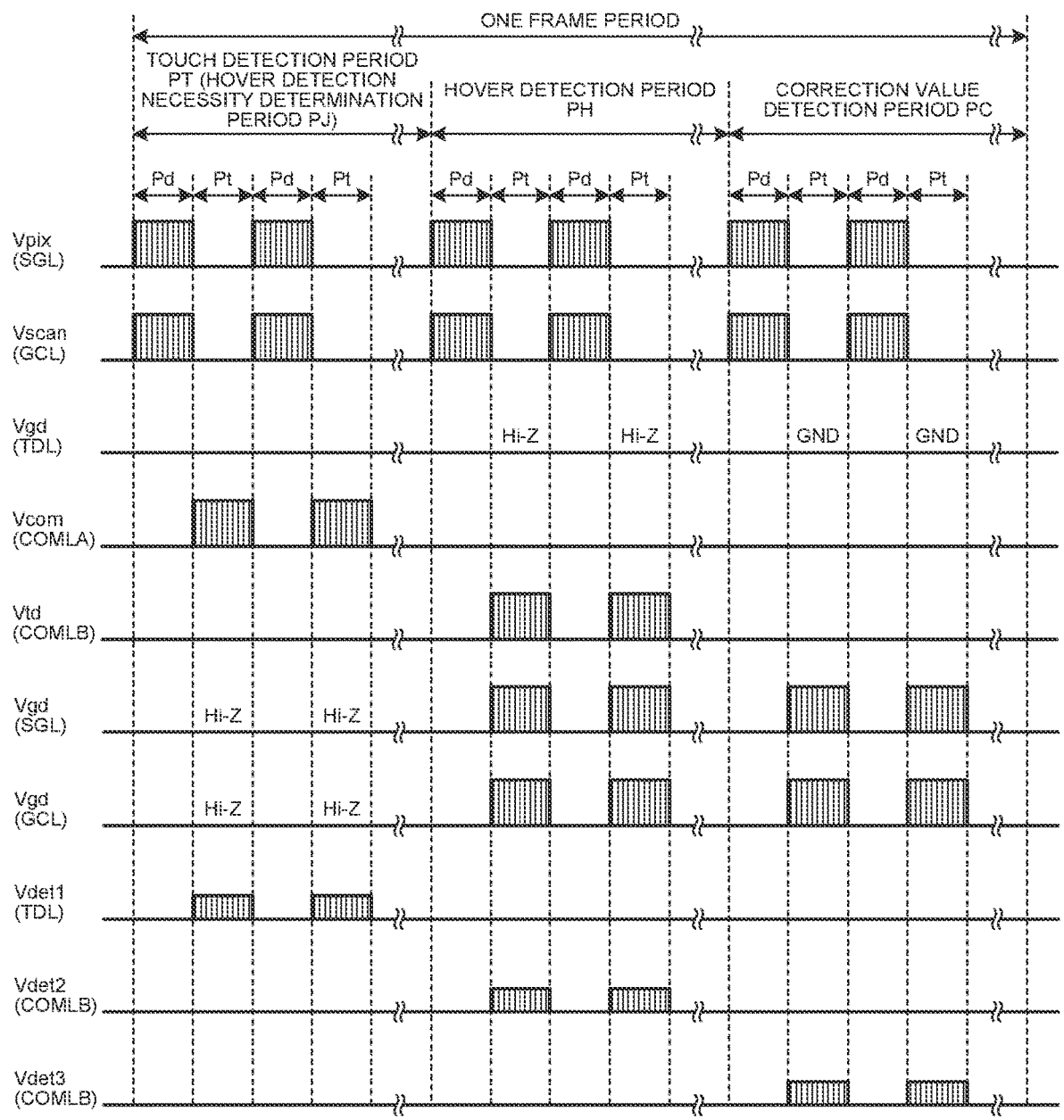
FIG. 55 is a timing waveform diagram illustrating a second example of the basic operation of the display device according to the second embodiment.

FIG. 54 is a timing waveform diagram illustrating a first example of a basic operation of the display device according to the second embodiment. FIG. 55 is a timing waveform diagram illustrating a second example of the basic operation of the display device according to the second embodiment. In the examples illustrated in FIGS. 54 and 55, each of the drive electrode blocks COMLB (B11 to B14, B21 to B24, B31 to B34, and B41 to B44) illustrated in FIG. 52 is used as the detection electrode (the detection electrode E1 illustrated in FIGS. 8 to 10) to perform the correction value detection using the basic principle of the mutual-capacitance method. FIGS. 54 and 55 illustrate the examples of providing the detection periods in the one frame period in the order of the touch detection period PT, the hover detection period PH, and the correction value detection period PC. In the present embodiment, in the same way as in the first embodiment, the one frame period basically includes the touch detection period PT to perform the touch detection operation using the mutual-capacitance method, the hover detection period PH to perform the hover detection operation using the self-capacitance method, and the correction value detection period PC to perform the correction value detection operation to detect the correction value for correcting the detection value during the hover detection, as illustrated in FIGS. 54 and 55. The display operation period Pd and the detection operation period Pt are alternately arranged in each of the touch detection period PT, the hover detection period PH, and the correction value detection period PC.

In each of the display operation periods Pd, the drive signal Vcomdc for display serving as the common electrode potential for display is supplied from the drive electrode driver 14a to the drive electrodes COML. This operation fixes the potential of the drive electrodes COML to the drive signal Vcomdc for display. In this state, the control signals are sequentially output from the gate driver 12 to the gate lines GCL1, GCL2, GCL3, and the pixel signals Vpix are sequentially output from the source driver 13 to the data lines SGL1, SGL2, SGL3, In this way, the pixel signals Vpix are sequentially supplied to the pixels Pix in the rows selected in the display operation period Pd (refer to FIG. 15) to write the display data.

In each of the detection operation periods Pt of the touch detection period PT, the switching elements SW11 to SW18 of the coupling circuit 18a (refer to FIG. 53) are controlled to be on, and the switching elements SW21 to SW24 thereof are controlled to be off. As a result, the drive electrodes COML form the drive electrode blocks COMLA (A1 to A8), as illustrated in FIG. 51. In this state, the drive signal Vcom for touch detection is supplied from the drive electrode driver 14a through the detection data lines SL1 to SL16 of the coupling circuit 18a to the respective drive electrode blocks COMLA selected in each of the detection operation periods Pt. As illustrated in FIG. 54, the guard signal Vgd, that has the same waveform as that of the drive signal Vcom for touch detection and is synchronized with the drive signal Vcom, is supplied from the gate driver 12a to the gate lines GCL. As illustrated in FIG. 54, the guard signal Vgd, that has the same waveform as that of the drive signal Vcom for touch detection and is synchronized with the drive signal Vcom, is supplied from the source driver 13a to the source lines SGL. As a result, the detection signal Vdet1 is sequentially output from each of the touch detection electrodes TDL. The first example illustrated in FIG. 54 represents an example of supplying the guard signal Vgd to the gate lines GCL and the source lines SGL in each of the detection operation periods Pt of the touch detection period PT. The present disclosure may, however, have an aspect in which the gate lines GCL and the source lines SGL are set to the high-impedance (Hi-Z) state, as illustrated in FIG. 55.

The detector 40a acquires the detection signal Vdet1 output from each of the touch detection electrodes TDL. The detector 40a performs the arithmetic processing based on the acquired detection signal Vdet1, and determines, from the result of the arithmetic processing, whether the detection target object is in the contact state, or in the non-contact state or the non-present state.

In each of the detection operation periods Pt of the hover detection period PH, the switching elements SW11 to SW18 of the coupling circuit 18a (refer to FIG. 53) are controlled to be off, and the switching elements SW21 to SW24 thereof are controlled to be on. As a result, the drive electrodes COML form the drive electrode blocks COMLB (B11 to B14, B21 to B24, B31 to B34, and B41 to B44), as illustrated in FIG. 52. In this state, the drive signal Vtd for hover detection is supplied from the drive electrode driver 14a to each of the drive electrode blocks COMLB through a corresponding one of the detection data lines SL1 to SL16 of the coupling circuit 18a. For example, the drive electrode driver 14a supplies the drive signals Vtd for hover detection so as to have the same waveform and to be synchronized with one another to the detection data lines SL1 to SL16. As illustrated in FIG. 54, the guard signal Vgd, that has the same waveform as that of the drive signal Vtd for hover detection and is synchronized with the drive signal Vtd, is supplied from the gate driver 12a to the gate lines GCL. As illustrated in FIG. 54, the guard signal Vgd, that has the same waveform as that of the drive signal Vtd for hover detection and is synchronized with the drive signal Vtd, is supplied from the source driver 13a to the source lines SGL. In each of the detection operation periods Pt of the hover detection period PH, the touch detection electrodes TDL are set to the high-impedance (Hi-Z) state by the touch detection electrode driver 41a of the detector 40a. As a result, the detection signal Vdet2 is simultaneously output from each of the drive electrode blocks COMLB.

The drive signal Vtd for hover detection in each of the detection operation periods Pt of the hover detection period PH may be a signal that has the same waveform as that of the drive signal Vcom for touch detection in each of the detection operation periods Pt of the touch detection period PT and is synchronized with the drive signal Vcom. In this case, the guard signal Vgd in each of the detection operation periods Pt of the hover detection period PH is substantially the same signal as the guard signal Vgd in each of the detection operation periods Pt of the touch detection period PT.

The detector 40a acquires the detection signal Vdet2 output from each of the drive electrode blocks COMLB through a corresponding one of the detection data lines SL1 to SL16. The detector 40a performs the arithmetic processing based on the acquired detection signal Vdet2, and determines, from the result of the arithmetic processing, whether the detection target object is in the non-contact state or the non-present state.

In each of the detection operation periods Pt of the correction value detection period PC, the switching elements SW11 to SW18 of the coupling circuit 18a (refer to FIG. 53) are controlled to be off, and the switching elements SW21 to SW24 thereof are controlled to be on. As a result, the drive electrodes COML form the drive electrode blocks COMLB (B11 to B14, B21 to B24, B31 to B34, and B41 to B44), as illustrated in FIG. 52. In this state, the guard signal Vgd is supplied from the gate driver 12a to the gate lines GCL, and the guard signal Vgd is supplied from the source driver 13a to the data lines SGL. As a result, the detection signal Vdet3 is simultaneously output from each of the drive electrode blocks COMLB.

The guard signal Vgd in each of the detection operation periods Pt of the correction value detection period PC is substantially the same signal as the guard signal Vgd in each of the detection operation periods Pt of the hover detection period PH.

The detector 40a acquires the detection signal Vdet3 output from each of the drive electrode blocks COMLB through a corresponding one of the detection data lines SL1 to SL16. The detector 40a performs the arithmetic processing based on the acquired detection signal Vdet3 to obtain the correction value for correcting the detection value during the hover detection.

Figure 56:
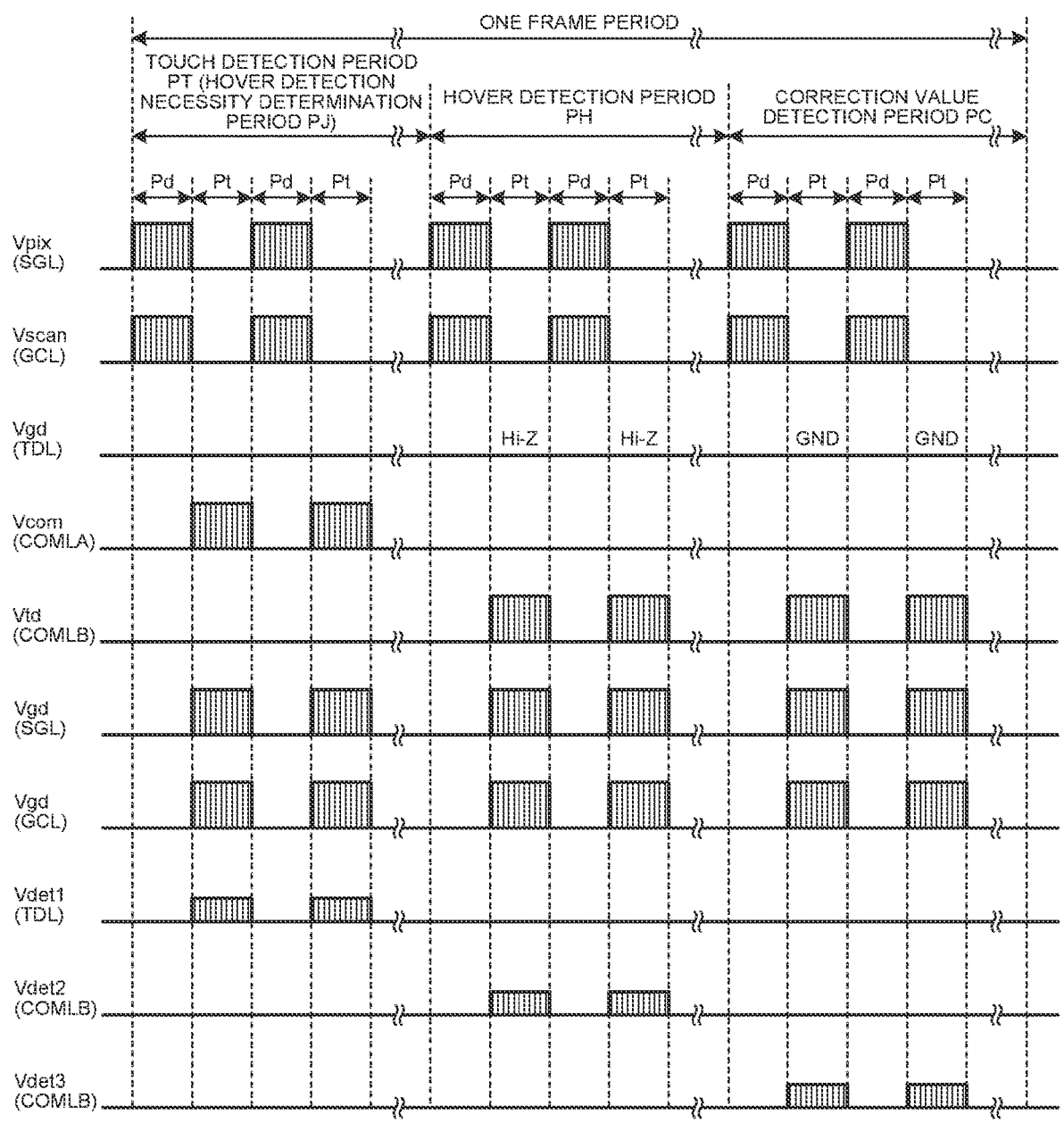
FIG. 56 is a timing waveform diagram illustrating a third example of the basic operation of the display device according to the second embodiment.
Figure 57:
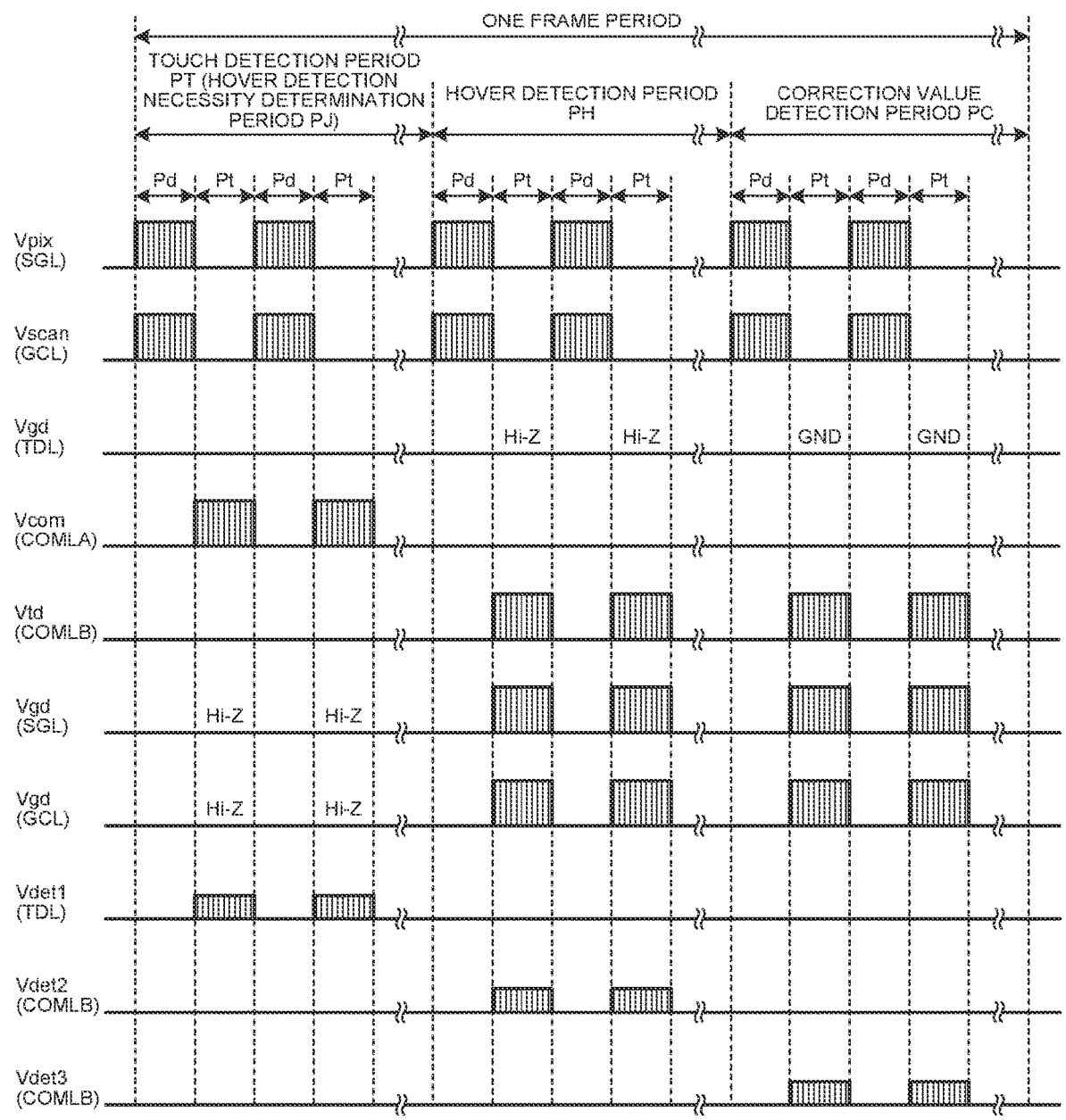
FIG. 57 is a timing waveform diagram illustrating a fourth example of the basic operation of the display device according to the second embodiment.
Figure 58:
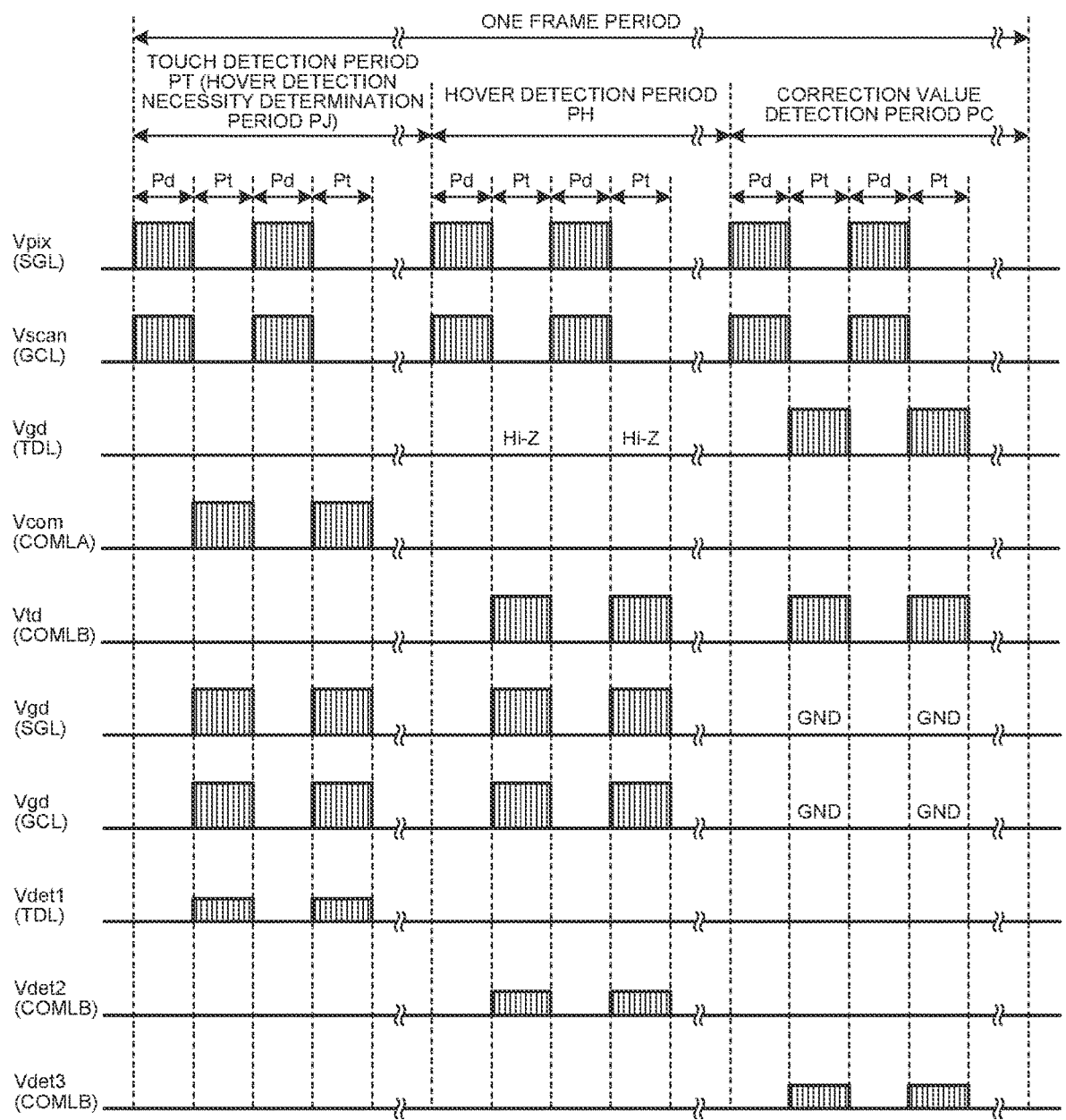
FIG. 58 is a timing waveform diagram illustrating a fifth example of the basic operation of the display device according to the second embodiment.
Figure 59:
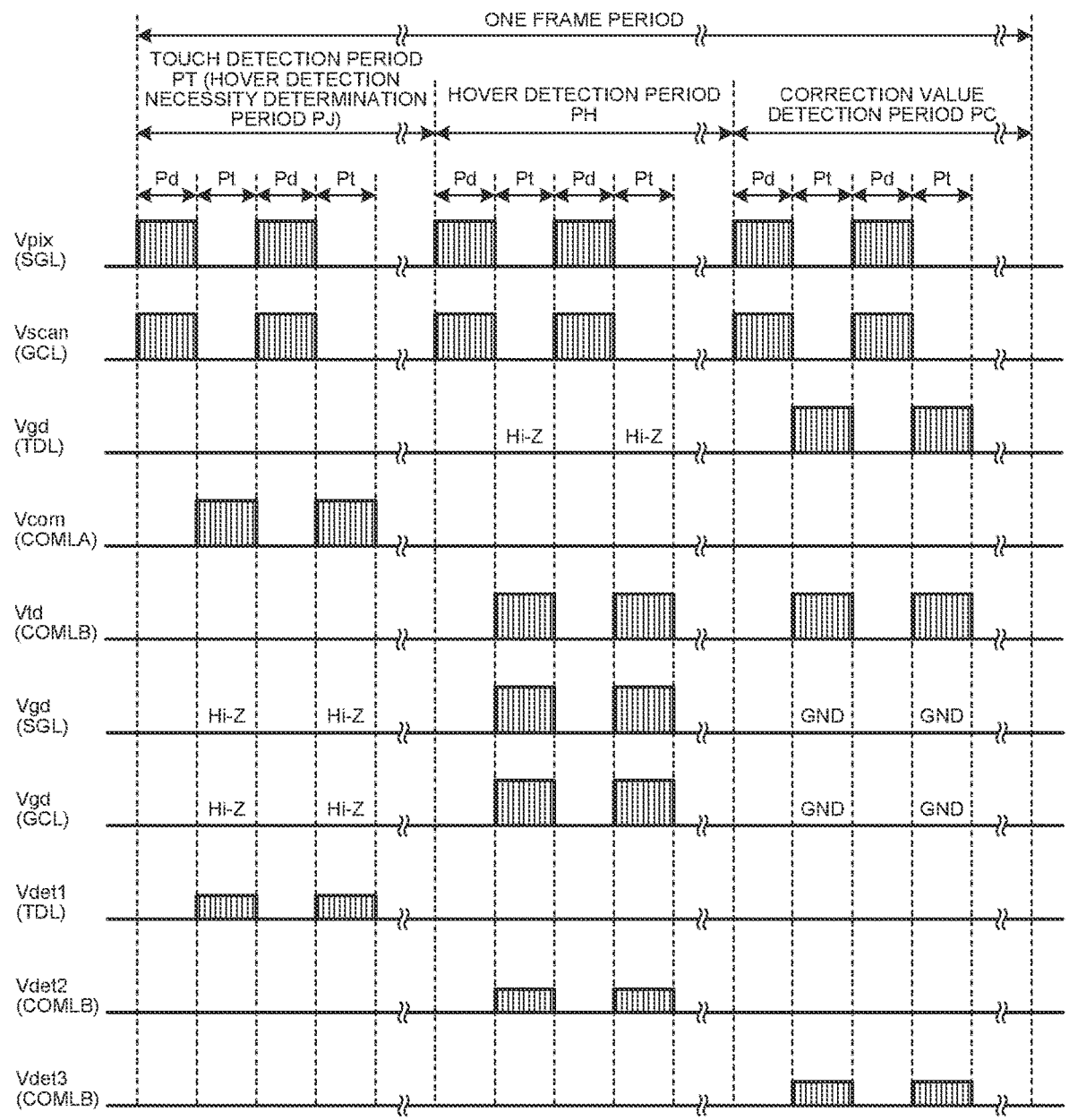
FIG. 59 is a timing waveform diagram illustrating a sixth example of the basic operation of the display device according to the second embodiment.

FIG. 56 is a timing waveform diagram illustrating a third example of the basic operation of the display device according to the second embodiment. FIG. 57 is a timing waveform diagram illustrating a fourth example of the basic operation of the display device according to the second embodiment. FIG. 58 is a timing waveform diagram illustrating a fifth example of the basic operation of the display device according to the second embodiment. FIG. 59 is a timing waveform diagram illustrating a sixth example of the basic operation of the display device according to the second embodiment.

In the examples illustrated in FIGS. 56 to 59, each of the drive electrode blocks COMLB (B11 to B14, B21 to B24, B31 to B34, and B41 to B44) illustrated in FIG. 52 is used as the detection electrode (the detection electrode E1 illustrated in FIGS. 8 to 10) to perform the correction value detection using the basic principle of the self-capacitance method.

In the examples illustrated in FIGS. 56 to 59, in each of the detection operation periods Pt of the correction value detection period PC, the switching elements SW11 to SW18 of the coupling circuit 18a (refer to FIG. 53) are controlled to be off, and the switching elements SW21 to SW24 thereof are controlled to be on. As a result, the touch detection electrodes TDL form the drive electrode blocks COMLB (B11 to B14, B21 to B24, B31 to B34, and B41 to B44), as illustrated in FIG. 52. In this state, the drive signal Vtd for correction value detection is supplied from the drive electrode driver 14a of the controller 11a to each of the drive electrode blocks COMLB through a corresponding one of the detection data lines SL1 to SL16 of the coupling circuit 18a. For example, the drive electrode driver 14a supplies the drive signals Vtd for correction value detection so as to have the same waveform and to be synchronized with one another to the detection data lines SL1 to SL16.

In the examples illustrated in FIGS. 56 and 57, in each of the detection operation periods Pt of the hover detection period PH, the touch detection electrodes TDL are set to the fixed potential (GND) by the touch detection electrode driver 41a of the detector 40a. In the examples illustrated in FIGS. 56 and 57, the guard signal Vgd, that has the same waveform as that of the drive signal Vtd for correction value detection and is synchronized with the drive signal Vtd, is supplied from the gate driver 12a to the gate lines GCL. In the examples illustrated in FIGS. 56 and 57, the guard signal Vgd, that has the same waveform as that of the drive signal Vtd for correction value detection and is synchronized with the drive signal Vtd, is supplied from the source driver 13a to the source lines SGL. As a result, the detection signal Vdet3 is simultaneously output from each of the drive electrode blocks COMLB.

In the examples illustrated in FIGS. 58 and 59, in each of the detection operation periods Pt of the hover detection period PH, the guard signal Vgd, that has the same waveform as that of the drive signal Vtd for correction value detection and is synchronized with the drive signal Vtd, is supplied from the touch detection electrode driver 41a of the detector 40a to the touch detection electrodes TDL. In the examples illustrated in FIGS. 58 and 59, the gate lines GCL are set to the fixed potential (GND) by the gate driver 12a. In the examples illustrated in FIGS. 58 and 59, the source lines SGL are set to the fixed potential (GND) by the source driver 13a. As a result, the detection signal Vdet3 is simultaneously output from each of the drive electrode blocks COMLB.

The present disclosure may have an aspect in which the touch detection electrodes TDL, the gate lines GCL, and the source lines SGL are set to the fixed potential (GND) in each of the detection operation periods Pt of the hover detection period PH.

In the examples illustrated in FIGS. 56 to 59, the drive signal Vtd for correction value detection in each of the detection operation periods Pt of the correction value detection period PC is a signal having the same wavelength as and being in synchronization with the drive signal Vtd for hover detection in each of the detection operation periods Pt of the hover detection period PH, and the guard signal Vgd in each of the detection operation periods Pt of the correction value detection period PC is substantially the same signal as the guard signal Vgd in each of the detection operation periods Pt of the hover detection period PH.

The detector 40a acquires the detection signal Vdet3 output from each of the drive electrode blocks COMLB through a corresponding one of the detection data lines SL1 to SL16. The detector 40a performs the arithmetic processing based on the acquired detection signal Vdet3 to obtain the correction value for correcting the detection value during the hover detection.

Figure 60:
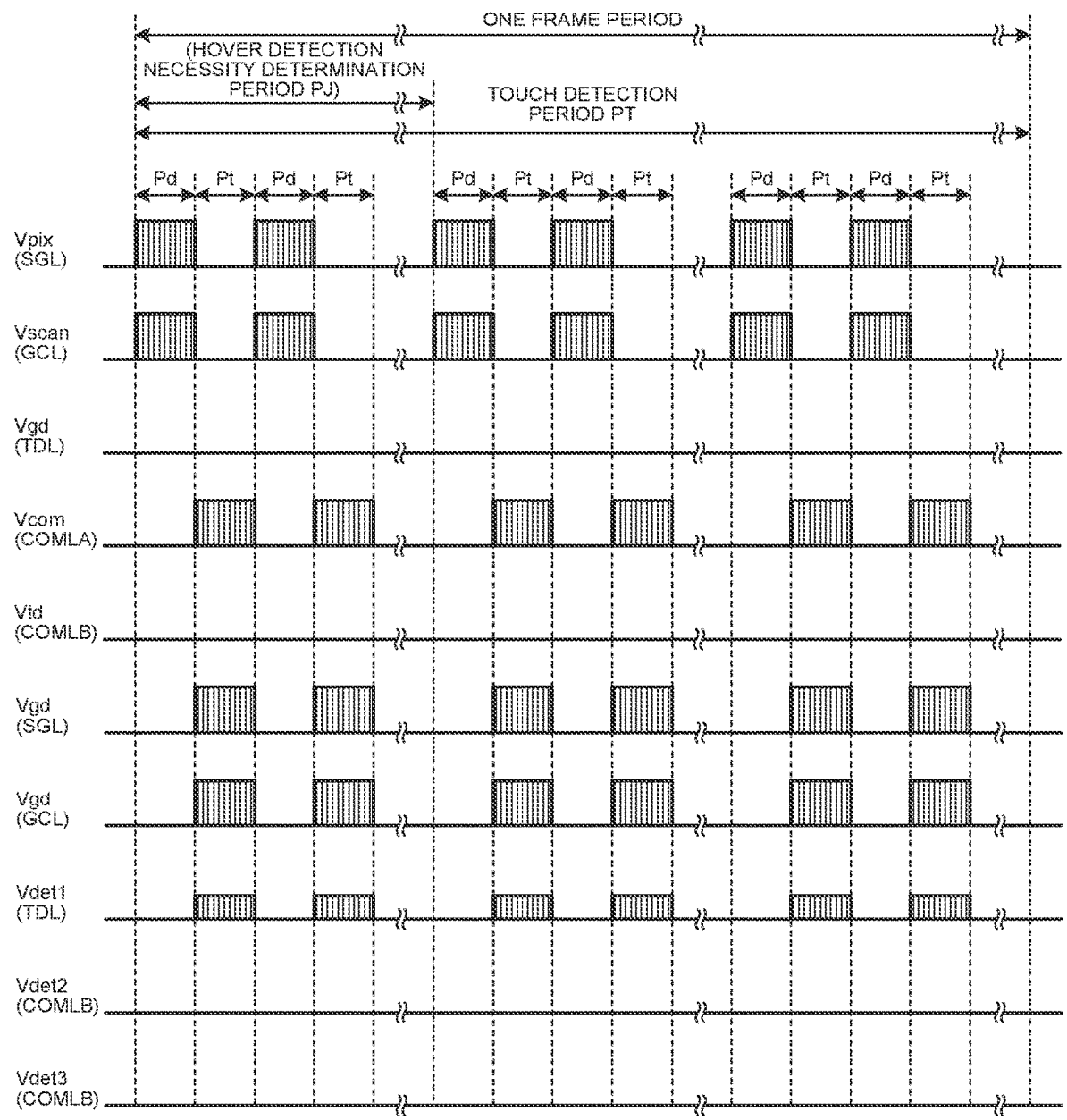
FIG. 60 is a timing waveform diagram illustrating an operation example in each of the first example illustrated in FIG. 54, the third example illustrated in FIG. 56, and the fifth example illustrated in FIG. 58 when the detection target object is detected to be in the contact state in the hover detection necessity determination period of the display device according to the second embodiment.
Figure 61:
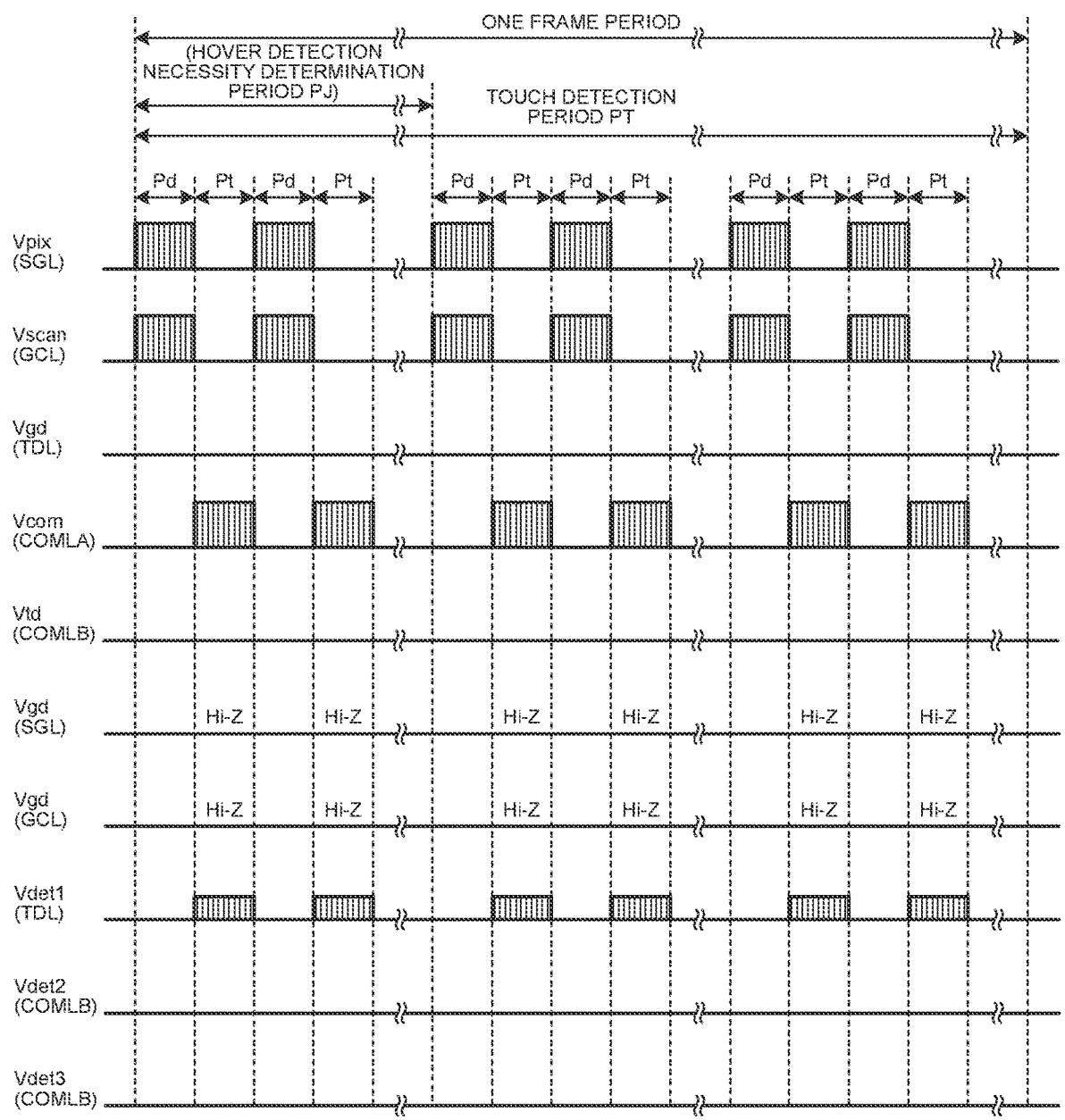
FIG. 61 is a timing waveform diagram illustrating an operation example in each of the second example illustrated in FIG. 55, the fourth example illustrated in FIG. 57, and the sixth example illustrated in FIG. 59 when the detection target object is detected to be in the contact state in the hover detection necessity determination period of the display device according to the second embodiment.

FIG. 60 is a timing waveform diagram illustrating an operation example in each of the first example illustrated in FIG. 54, the third example illustrated in FIG. 56, and the fifth example illustrated in FIG. 58 when the detection target object is detected to be in the contact state in the hover detection necessity determination period of the display device according to the second embodiment. FIG. 61 is a timing waveform diagram illustrating an operation example in each of the second example illustrated in FIG. 55, the fourth example illustrated in FIG. 57, and the sixth example illustrated in FIG. 59 when the detection target object is detected to be in the contact state in the hover detection necessity determination period of the display device according to the second embodiment. As illustrated in FIGS. 60 and 61, if the detection target object is detected to be in the contact state in the hover detection necessity determination period PJ, the entire period of the one frame period is used as the touch detection period PT without providing the hover detection period PH and the correction value detection period PC.

If the detection target object is not detected to be in the contact state in the hover detection necessity determination period PJ, the hover detection period PH and the correction value detection period PC are provided, as illustrated in FIGS. 56 to 59.

Figure 62:
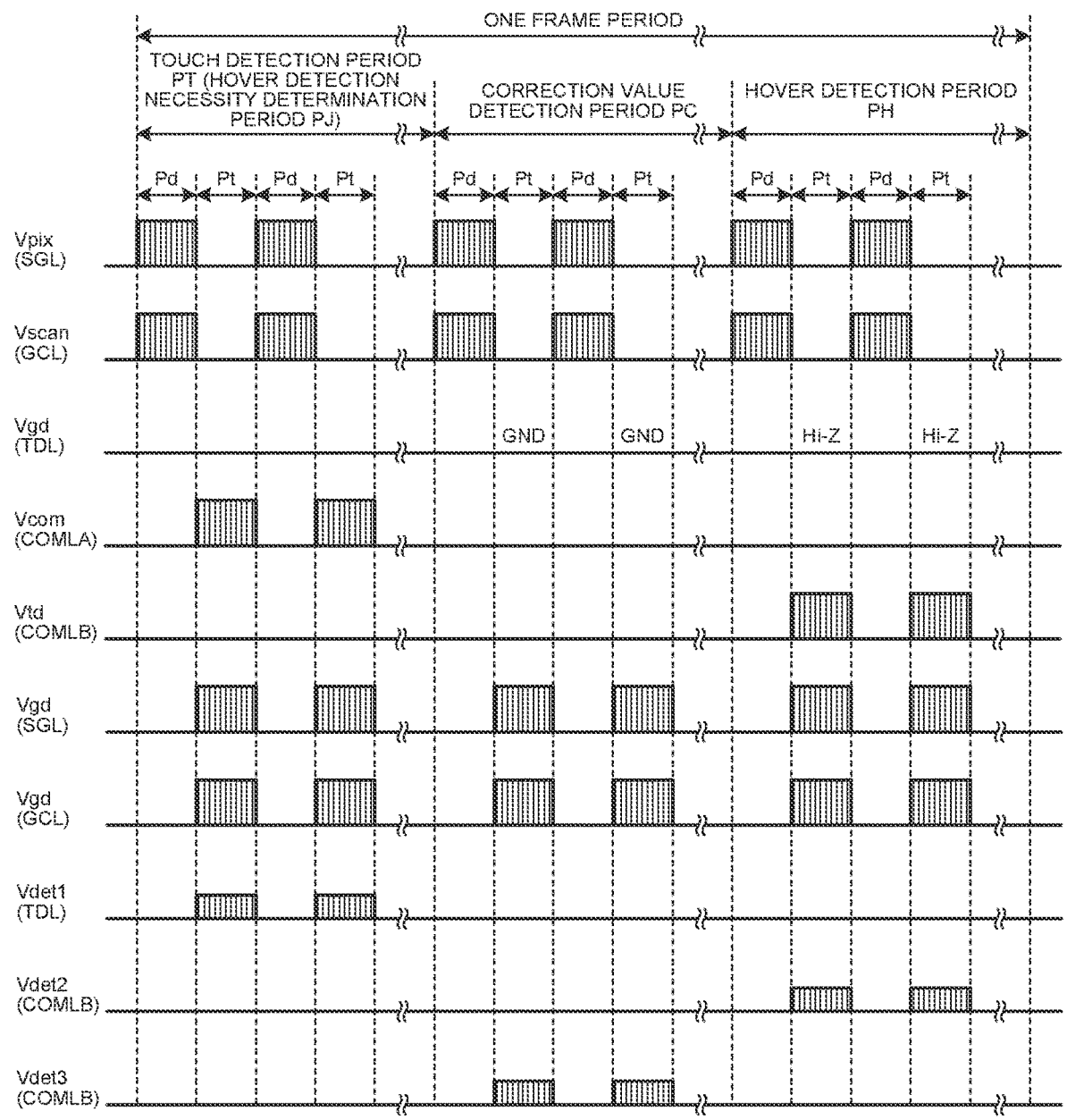
FIG. 62 is a timing waveform diagram illustrating a first example of a basic operation of a display device according to a modification of the second embodiment.
Figure 63:
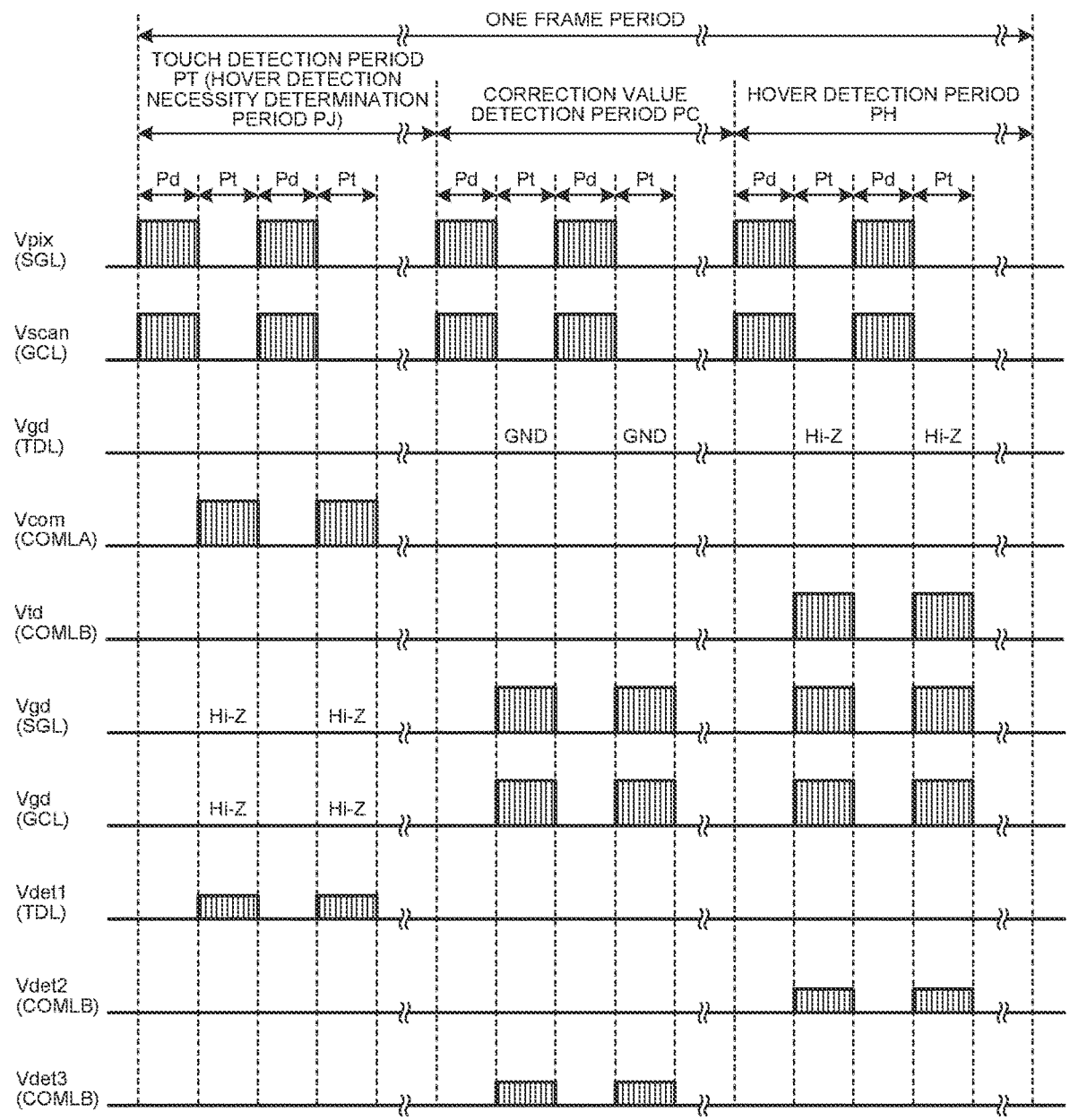
FIG. 63 is a timing waveform diagram illustrating a second example of the basic operation of the display device according to a modification of the second embodiment.
Figure 64:
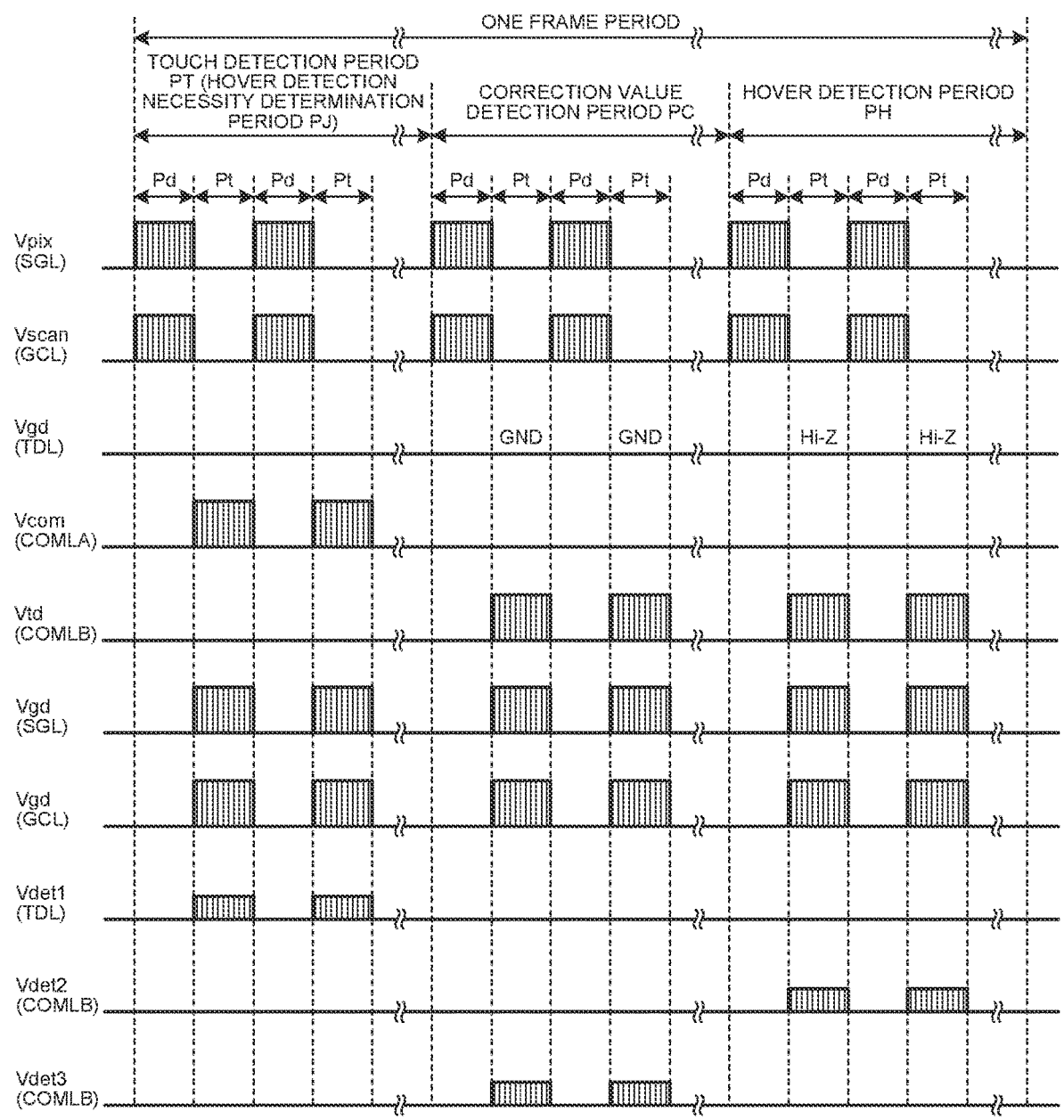
FIG. 64 is a timing waveform diagram illustrating a third example of the basic operation of the display device according to the modification of the second embodiment.
Figure 65:
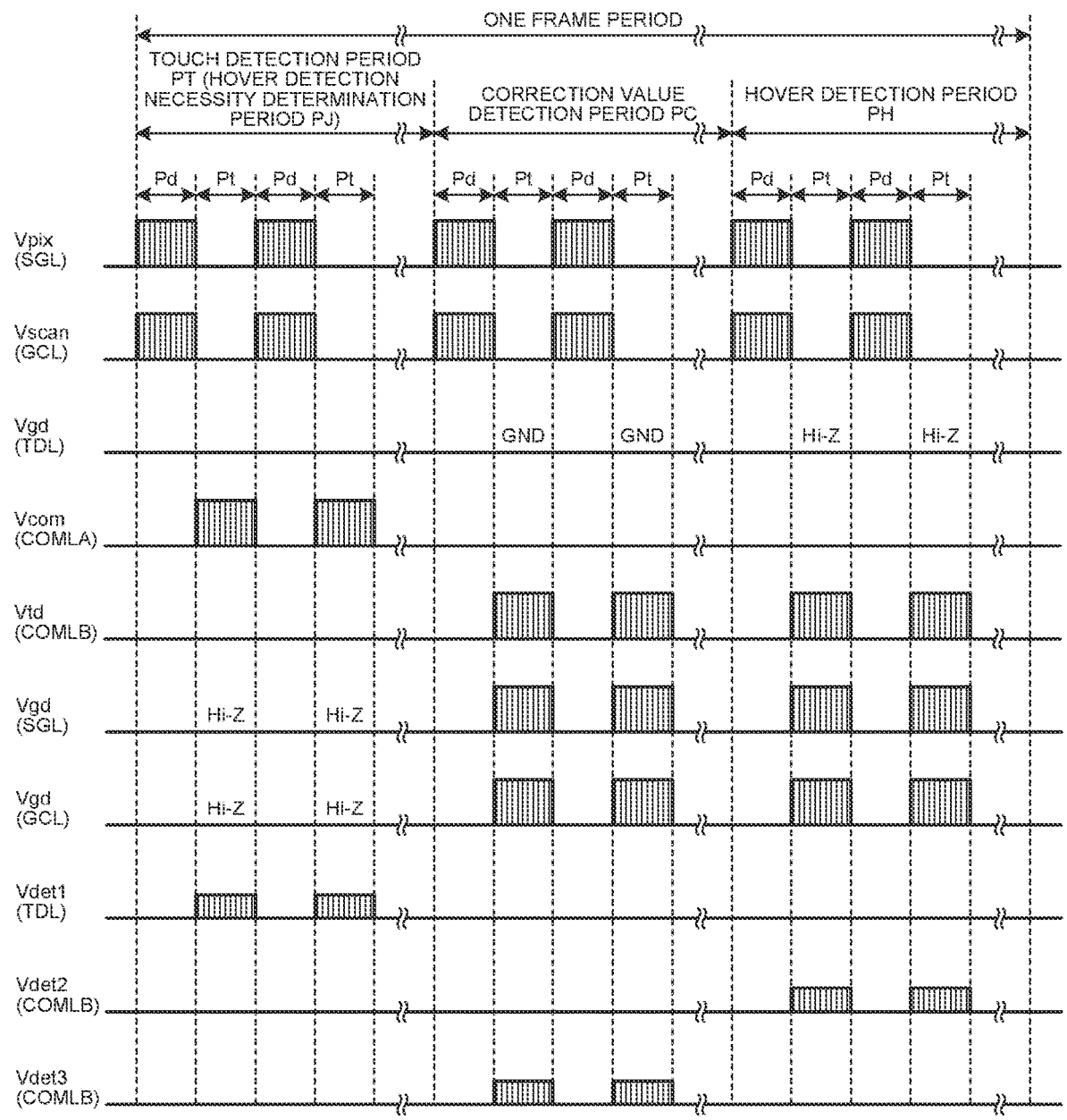
FIG. 65 is a timing waveform diagram illustrating a fourth example of the basic operation of the display device according to the modification of the second embodiment.
Figure 66:
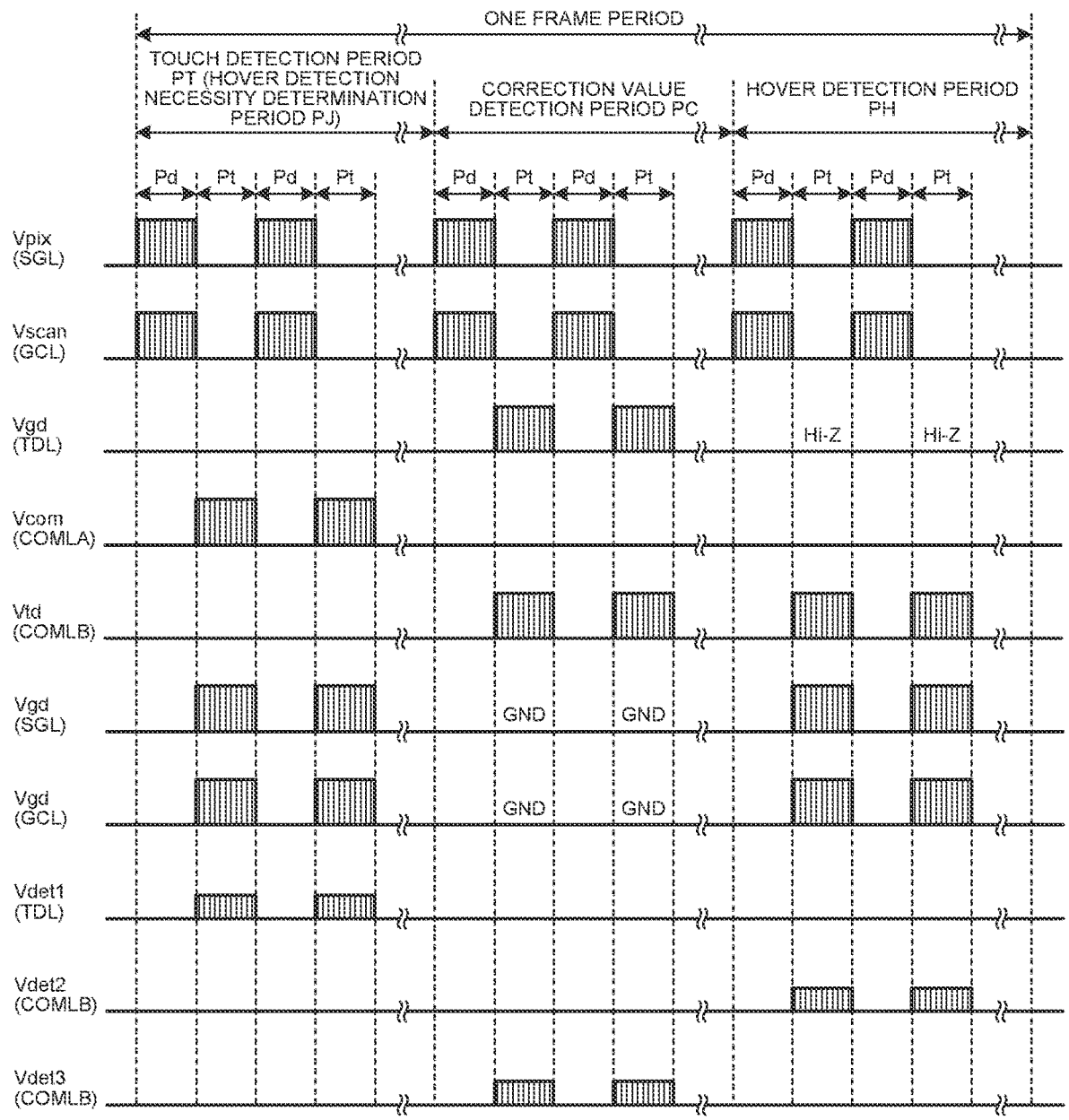
FIG. 66 is a timing waveform diagram illustrating a fifth example of the basic operation of the display device according to the modification of the second embodiment.
Figure 67:
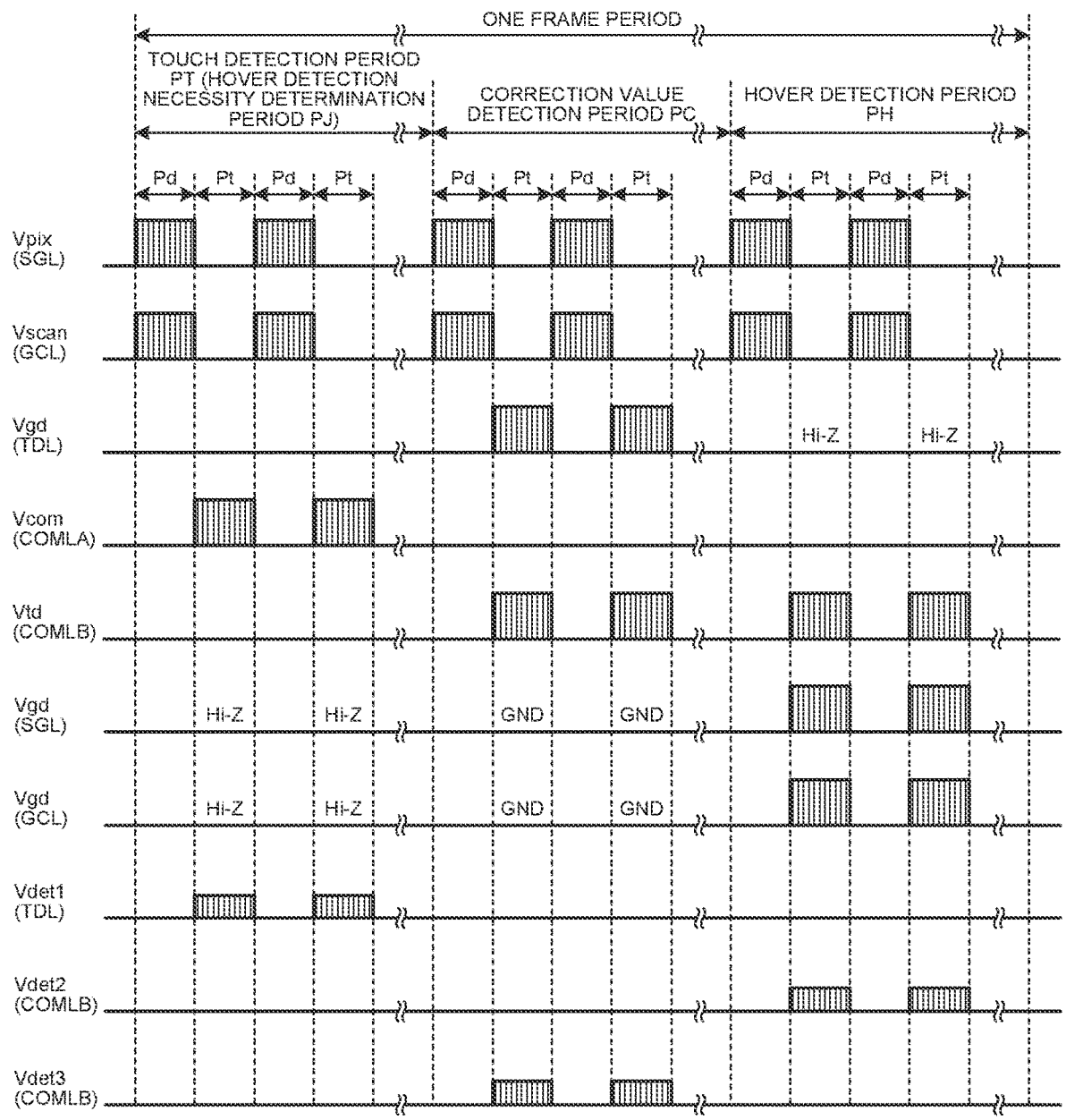
FIG. 67 is a timing waveform diagram illustrating a sixth example of the basic operation of the display device according to the modification of the second embodiment.

FIG. 62 is a timing waveform diagram illustrating a first example of a basic operation of a display device according to a modification of the second embodiment. FIG. 63 is a timing waveform diagram illustrating a second example of the basic operation of the display device according to the modification of the second embodiment. In the examples illustrated in FIGS. 62 and 63, each of the drive electrode blocks COMLB (B11 to B14, B21 to B24, B31 to B34, and B41 to B44) illustrated in FIG. 52 is used as the detection electrode (the detection electrode E2 illustrated in FIG. 5) to perform the correction value detection using the basic principle of the mutual-capacitance method. FIG. 64 is a timing waveform diagram illustrating a third example of the basic operation of the display device according to the modification of the second embodiment. FIG. 65 is a timing waveform diagram illustrating a fourth example of the basic operation of the display device according to the modification of the second embodiment. FIG. 66 is a timing waveform diagram illustrating a fifth example of the basic operation of the display device according to the modification of the second embodiment. FIG. 67 is a timing waveform diagram illustrating a sixth example of the basic operation of the display device according to the modification of the second embodiment. In the examples illustrated in FIGS. 64 to 67, each of the drive electrode blocks COMLB (B11 to B14, B21 to B24, B31 to B34, and B41 to B44) illustrated in FIG. 52 is used as the detection electrode (the detection electrode E1 illustrated in FIGS. 8 to 10) to perform the correction value detection using the basic principle of the self-capacitance method. FIGS. 60 to 63 illustrate the examples of providing the detection periods in the one frame period in the order of the touch detection period PT, the correction value detection period PC, and the hover detection period PH. The details of the detection periods are the same as those in the examples illustrated in FIGS. 56 to 59, and therefore, will not be described herein.

In the present embodiment, the drive electrode block COMLB corresponds to the detection electrode E1 (first drive electrode) described using FIG. 28 and subsequent drawings in the first embodiment, and each of the gate lines GCL, the gate electrodes 64, the data lines SGL, and the pixel electrodes 22 (refer to FIG. 17) corresponds to the peripheral conductor E (second drive electrode). The drive signal Vtd for hover detection and correction value detection supplied to the detection electrodes E1 (drive electrode blocks COMLB) during the hover detection corresponds to the first drive signal. The guard signal Vgd supplied to the peripheral conductors E (the gate lines GCL, the gate electrodes 64, the data lines SGL, and the pixel electrodes 22) corresponds to the second drive signal.

In the configuration described above, by performing the processing described using FIG. 39 in the first embodiment, the influence of the temperature characteristic of each of the operational amplifiers OP of the voltage detectors DET provided for the respective detection electrodes E1 can be reduced during the hover detection, and the hover detection accuracy can be increased. By performing the processing described using FIG. 44 in the first embodiment, the hover detection can be performed using the temperature correction coefficient k calculated in the correction value detection performed immediately before the hover detection is performed. Therefore, the hover detection accuracy can be further increased.

In the second embodiment, the drive electrode COML corresponds to the "first electrode", and each of the peripheral conductors E including the gate lines GCL, the gate electrodes 64, the data lines SGL, and the pixel electrodes 22 corresponds to the "second electrode". The drive electrode driver 14a corresponds to the "first drive circuit", and each of the gate driver 12a and the source driver 13a corresponds to the "second drive circuit". Each of the drive signal Vcom and the drive signal Vtd corresponds to the "first drive signal", and the guard signal Vgd corresponds to the "second drive signal". The drive electrode block COMLA corresponds to the "first electrode block", and the drive electrode block COMLB corresponds to the "second electrode block".

While the preferred embodiments of the present disclosure have been described above, the present disclosure is not limited to the embodiments described above. The content disclosed in the embodiments is merely an example, and can be variously modified within the scope not departing from the gist of the present disclosure. For example, although the liquid crystal display device capable of color display has been described in the first embodiment, the present disclosure is not limited to the liquid crystal display device supporting the color display, and may be applied to a liquid crystal display device supporting monochrome display. Any modifications appropriately made within the scope not departing from the gist of the present disclosure naturally belong to the technical scope of the present disclosure.

The detection device and the display device of the present embodiments can have, for example, the following aspects.

(1) A detection device including:

a plurality of first electrodes;

a plurality of second electrodes facing or being close to the first electrodes;

a first drive circuit configured to supply a first drive signal to the first electrodes;

a second drive circuit configured to supply a second drive signal to the second electrodes, the second drive signal having a same waveform as that of the first drive signal and in synchronization with the first drive signal; and a detector configured to detect a first detection signal output from the first electrodes in response to a supply of the second drive signal to the second electrodes, a second detection signal output from the first electrodes in response to a supply of the first drive signal to the first electrodes and a supply of the second drive signal to the second electrodes, and a third detection signal output from the first electrodes in response to a supply of the second drive signal to the second electrodes, in which the detector is configured to detect the second detection signal and the third detection signal when a detection value of the first detection signal is lower than a threshold, and to correct a detection value of the second detection signal on a basis of the detection value of the third detection signal.

(2) A detection device including:

a plurality of first electrodes;

a plurality of second electrodes disposed facing or being close to the first electrodes;

a first drive circuit that supplies a first drive signal to the first electrodes;

a second drive circuit that supplies a second drive signal to the second electrodes, the second drive signal having a same waveform as that of the first drive signal and in synchronization with the first drive signal; and a detector that detects a first detection signal output from the first electrodes in response to a supply of the second drive signal to the second electrodes, a second detection signal output from the first electrodes in response to a supply of the first drive signal to the first electrodes and a supply of the second drive signal to the second electrodes, and a third detection signal output from the first electrodes in response to a supply of the first drive signal to the first electrodes, in which the detector is configured to detect the second detection signal and the third detection signal when a detection value of the first detection signal is lower than a predetermined threshold, and to correct a detection value of the second detection signal on a basis of the detection value of the third detection signal.

(3) The detection device described in (1) or (2) above, in which the detector holds a reference detection value of the third detection signal detected at a predetermined reference temperature when the detection value of the first detection signal is lower than the threshold, and multiplies the detection value of the first detection signal by a ratio of the reference detection value to the detection value of the third detection signal.

(4) The detection device described in any one of (1) to (3) above, in which the first electrodes are arranged side by side in a first direction and a second direction intersecting the first direction, the second electrodes extend in the second direction, and the detection device further includes a coupling circuit that couples the first electrodes to one another in the first direction to form a first electrode block in a period in which the detector detects the first detection signal, and couples at least two or more of the first electrodes to one another at least in the second direction to form a second electrode block in a period in which the detector detects the second detection signal.

(5) The detection device described in (4) above, in which the coupling circuit couples at least two or more of the first electrodes to one another in the first direction and the second direction to form the second electrode block such that a larger number of the first electrodes are arranged in the second direction than in the first electrode block.

(6) A display device including:

the detection device described in any one of (1) to (5) above;

a substrate having a display region; and a display functional layer for displaying an image in the display region.

(7) The display device described in (6) above, in which the detector:

detects the first detection signal a predetermined number of times in the first period;

detects the second detection signal a predetermined number of times in the second period; and detects the third detection signal a predetermined number of times in the third period.

What is claimed is:

1. A detection device comprising:

a plurality of first electrodes;

a plurality of second electrodes disposed facing or close to the first electrodes;

a first drive circuit configured to supply a first drive signal to the first electrodes;

a second driver circuit configured to supply a second drive signal to the second electrodes; and a detector configured to detect a detection signal output from the first electrodes, wherein the detection device has a first period in which the detector detects a first detection signal output from the first electrodes in response to a supply of the second drive signal to the second electrodes, when the first detection signal detected in the first period is equal to or higher than a predetermined threshold, the detector is configured to output an output signal including panel coordinates generated based on the first detection signal, when the first detection signal detected in the first period is lower than the predetermined threshold, the detection device is transitioned to a second period in which the detector detects a second detection signal output from the first electrodes in response to a supply of the first drive signal to the first electrodes and a supply of a guard signal synchronized with the first drive signal to the second electrodes;

the detector is configured to output an output signal including panel coordinates generated based on the second detection signal, wherein the second detection signal is corrected by a correction value generated based on a third detection signal, the third detection signal being output from the first electrodes in response to a supply of the guard signal to the second electrodes, and wherein the detector is configured to hold, as a reference detection value, the third detection signal detected at a predetermined reference temperature, and a ratio of the reference detection value to a detection value of the third detection signal is regarded as the correction value, and the correction value is multiplied by a detection value of the second detection signal.

2. The detection device according to claim 1, wherein the first electrodes are arranged side by side in a first direction and a second direction intersecting the first direction, the second electrodes extend in the second direction, and the detection device comprises a coupling circuit configured to couple the first electrodes to one another in the first direction to form a first electrode block in the first period, and couple at least two or more of the first electrodes to one another in the second direction to form a second electrode block in the second period.

3. The detection device according to claim 2, wherein the coupling circuit is configured to couple at least two or more of the first electrodes to one another in the first direction and the second direction to form the second electrode block such that a larger number of the first electrodes are arranged in the second direction than in the first electrode block.

4. The detection device according to claim 2, wherein when the third detection signal is output, the second electrode block that is same as in the second period is formed.

* * * * *